(12) United States Patent
Kado et al.

(10) Patent No.: US 10,974,888 B2
(45) Date of Patent: Apr. 13, 2021

(54) LIDDED CONTAINER AND CONTAINER USED THEREFOR

(71) Applicant: DAI NIPPON PRINTING CO., LTD., Tokyo (JP)

(72) Inventors: Takashi Kado, Tokyo (JP); Masako Tsuchida, Tokyo (JP); Katsumi Kameda, Tokyo (JP); Kaoru Watanabe, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 200 days.

(21) Appl. No.: 16/064,833

(22) PCT Filed: Dec. 20, 2016

(86) PCT No.: PCT/JP2016/087983
§ 371 (c)(1),
(2) Date: Jun. 21, 2018

(87) PCT Pub. No.: WO2017/110826
PCT Pub. Date: Jun. 29, 2017

(65) Prior Publication Data
US 2018/0370713 A1     Dec. 27, 2018

(30) Foreign Application Priority Data

Dec. 21, 2015  (JP) .............................. JP2015-248932
Feb. 4, 2016   (JP) .............................. JP2016-019967
(Continued)

(51) Int. Cl.
*B65D 81/34*   (2006.01)
*B65D 77/20*   (2006.01)
*A47J 36/02*   (2006.01)

(52) U.S. Cl.
CPC ........ *B65D 81/3453* (2013.01); *A47J 36/027* (2013.01); *B65D 77/20* (2013.01);
(Continued)

(58) Field of Classification Search
CPC ............... B65D 81/3453; B65D 81/34; B65D 2251/20; B65D 77/20; B65D 77/2028; B65D 77/204; B65D 77/2064
(Continued)

(56) References Cited

U.S. PATENT DOCUMENTS

| 4,834,247 A | 5/1989 | Oshima et al. |
| 7,582,340 B2 * | 9/2009 | Hagino ................. A47J 36/027 220/495.03 |

(Continued)

FOREIGN PATENT DOCUMENTS

| CN | 1368471 | 9/2002 |
| DE | 10211593 | 6/2003 |

(Continued)

OTHER PUBLICATIONS

International Search Report, issued in the corresponding PCT application No. PCT/JP2016/087983, dated Apr. 4, 2017, 5 pages.
(Continued)

*Primary Examiner* — King M Chu
(74) *Attorney, Agent, or Firm* — Hamre, Schumann, Mueller & Larson, P.C.

(57) ABSTRACT

The present invention provides a lidded container which, even when a flange portion of the container warps during microwave heating, can prevent a contact between the flange portion and a lid and allows steam to pass from a steam escape mechanism.
The lidded container is provided with a container having an opening and a lid which covers the opening and is joined to the container. The container is provided with a bottom
(Continued)

portion, a side portion standing upright from the bottom portion, and a flange portion which is continuously connected to an upper portion of the side portion and includes a first plane. A circumferential seal portion is formed between the lid and the first plane of the flange portion. The seal portion is provided with a main seal portion and a protruding seal portion protruding inward with respect to the main seal portion. At least one of the flange portion and the lid is formed with a contact suppression mechanism for suppressing a contact between the flange portion and the lid, which is provided outside the protruding seal portion at a position corresponding to at least the protruding seal portion.

13 Claims, 37 Drawing Sheets

(30) Foreign Application Priority Data

Feb. 25, 2016 (JP) .............................. JP2016-034614
Sep. 30, 2016 (JP) .............................. JP2016-194670

(52) U.S. Cl.
CPC ....... *B65D 77/204* (2013.01); *B65D 77/2028* (2013.01); *B65D 77/2064* (2013.01); *B65D 81/34* (2013.01); *B65D 2251/20* (2013.01); *B65D 2577/2066* (2013.01); *B65D 2581/3455* (2013.01)

(58) Field of Classification Search
USPC ......................................................... 220/740
See application file for complete search history.

(56) References Cited

U.S. PATENT DOCUMENTS

| | | | | |
|---|---|---|---|---|
| 8,686,323 B2* | 4/2014 | Su | ........................ | B32B 27/36 |
| | | | | 219/730 |
| 9,988,200 B2* | 6/2018 | Cichowski | ........... | B65D 81/264 |
| 2004/0149747 A1 | 8/2004 | Hopkins, Sr. | | |
| 2008/0044525 A1 | 2/2008 | Fenn-Barrabass et al. | | |

FOREIGN PATENT DOCUMENTS

| | | |
|---|---|---|
| JP | 62-235080 | 10/1987 |
| JP | 3-87688 | 9/1991 |
| JP | 09-221177 | 8/1997 |
| JP | 11-171261 | 6/1999 |
| JP | 3060599 | 9/1999 |
| JP | 2000-62858 | 2/2000 |
| JP | 2001-315863 | 11/2001 |
| JP | 2005-035567 | 2/2005 |
| JP | 2007-297081 | 11/2007 |
| JP | 2007-308175 | 11/2007 |
| JP | 2009-078865 | 4/2009 |
| JP | 2009-120224 | 6/2009 |
| JP | 2013-147292 | 8/2013 |
| JP | 2016-088593 | 5/2016 |
| WO | 2016/163428 | 10/2016 |

OTHER PUBLICATIONS

Japanese Office Action, issued in the corresponding Japanese patent application No. 2015-248932, dated Apr. 14, 2020, 10 pages.
Japanese Office Action, issued in the corresponding Japanese patent application No. 2015-248932, dated Oct. 8, 2019, 11 pages.
First Office Action, issued in the corresponding Chinese patent application No. 201680073911.4, dated Jun. 3, 2019, 9 pages.
Japanese Office Action, issued in the corresponding Japanese patent application No. 2016-019967, dated Oct. 11, 2019, 11 pages.
Japanese Office Action, issued in the corresponding Japanese patent application No. 2016-034614, dated Oct. 11, 2019, 12 pages.
Japanese Office Action, issued in the corresponding Japanese patent application No. 2016-034614, dated Apr. 3, 2020, 14 pages.
Japanese Office Action, issued in the corresponding Japanese patent application No. 2016-034614, dated Sep. 11, 2020, 10 pages (including translation).
Indian Office Action, issued in the corresponding Indian patent application No. 201817024256, dated Jan. 4, 2021, 7 pages.
Japanese Office Action, issued in the corresponding Japanese patent application No. 2017-088895, dated Feb. 5, 2021, 8 pages.

* cited by examiner

LIDDED CONTAINER AND CONTAINER USED THEREFOR

BACKGROUND OF THE INVENTION

Field of the Invention

The present invention relates to a lidded container for heating cooking, which is heated mainly by a microwave oven or the like, and a container used therefor.

Background Art

Conventionally, a lidded container is known, which includes a plastic container for containing contents, a flange portion formed in the container, and a lid joined to the flange portion with a circumferential seal portion. The contents contained in the lidded container are heated by a microwave oven or the like. The contents are cooked or semi-cooked foods and the like.

When contents contained in a container sealed with a lid are heated using a microwave oven, moisture contained in the contents evaporates caused by the heating, and pressure of a storage portion of the container increases. When the pressure of the storage portion of the container increases, there is a risk that the lid and the container rupture to cause scattering of the contents, and thus to contaminate the inside of the microwave oven. In consideration of such a problem, it has been proposed to provide a steam escape mechanism for communicating the storage portion and the outside when the pressure of the storage portion of the lidded container reaches equal to or higher than a predetermined value, to release the steam inside the storage portion to the outside.

For example, the following Patent Literature 1 discloses a lidded container for heating cooking in which a seal portion is formed around an outer periphery of a flange portion and the entire periphery of a bulging portion, the seal portion is peeled off by the bulging portion, and the expanded air in the container is removed. In this container, the bulging portion is formed not only on the flange portion but also on a side portion of the container.

CITATION LIST

Patent Literature

Patent Literature 1: JP H03-87688U

SUMMARY OF THE INVENTION

When the internal pressure of the lidded container rises, the lid expands from a flat shape to a circular arc shape. As a result, the opposing pair of flange portions is pulled to easily warp upward. The degree of warpage of the flange portion depends on a heating condition of a microwave oven and the thickness and material of the flange.

If the upward warpage of the flange portion occurs at the time of releasing steam later, the lid of the seal portion and the flange portion inevitably come into close contact with each other. For this reason, even if the steam escape mechanism described above is provided in a portion of the seal portion, the lid and the flange portion come into close contact with each other, which causes a problem that steam is difficult to escape.

In this respect, in the above-described Patent Literature 1, since the bulging portion is formed not only on the flange portion but also on the side portion of the container, rigidity is given to the side portion due to the existence of the bulging portion, and, in the first place, the problem that the warpage of the flange portion occurs is unlikely to occur. However, from the viewpoints of storing contents, securing storage capacity, appearance, ease of taking out contents, and the like, it is preferable that a side surface of the container has no extra protrusion such as a bulging portion and is a continuous plane or curved surface. However, in this case, there arises a problem that the flange portion warps to make it difficult for steam to escape, as described above.

It is an object of the present invention to provide a lidded container which can effectively solve such a problem.

The present invention provides a lidded container including a container having an opening and a lid which covers the opening and is joined to the container, wherein the container includes a bottom portion, a side portion standing upright from the bottom portion, and a flange portion which is continuously connected to an upper portion of the side portion and includes a first plane, a circumferential seal portion is formed between the lid and the first plane of the flange portion, the seal portion includes a main seal portion and a protruding seal portion protruding inward with respect to the main seal portion, and at least one of the flange portion and the lid is provided with a contact suppression mechanism for suppressing a contact between the flange portion and the lid, which is provided outside the protruding seal portion at a position corresponding to at least the protruding seal portion.

In the lidded container according to the present invention, the side portion may include a first portion corresponding to the protruding seal portion and second portions located on both sides of the first portion, and the first portion may constitute the same plane or the same curved surface continuous with second portions.

In the lidded container according to the present invention, the contact suppression mechanism may include a cutout portion formed in the flange portion outside the protruding seal portion.

In the lidded container according to the present invention, the protruding seal portion may an outer edge, and the outer edge may be in contact with the cutout portion of the flange portion.

In the lidded container according to the present invention, the contact suppression mechanism may include a stepped portion formed in the flange portion outside the protruding seal portion, and the stepped portion may include at least a flange wall portion which is continuously connected to the first plane and extends downward from the first plane.

In the lidded container according to the present invention, the protruding seal portion may include an outer edge, and the outer edge may be in contact with the stepped portion of the flange portion.

In the lidded container according to the present invention, the contact suppression mechanism may include a protrusion formed on the first plane of the flange portion outside the protruding seal portion and protruding upward from the first plane.

In the lidded container according to the present invention, the contact suppression mechanism may include at least two protrusions arranged with a gap therebetween, and the at least two protrusions may be arranged so as to pass through a center point of the opening and the gap in a plan view and draw a straight line reaching an outer edge of the flange portion without intersecting with the protrusion.

In the lidded container according to the present invention, the contact suppression mechanism may include a cutout portion formed in the lid outside the protruding seal portion.

In the lidded container according to the present invention, when, of a straight line extending to pass through a distal end point of the protruding seal portion and the center point of the opening, a portion connecting two intersection points with an outer edge of the seal portion is referred to as a first line segment and, of a straight line extending to be orthogonal to the first line segment and pass through the center point of the opening, a portion connecting two intersection points with the outer edge of the seal portion is referred to as a second line segment, the first line segment is preferably shorter than the second line segment.

In the lidded container according to the present invention, the protruding seal portions may be formed at two or more positions facing each other in the container.

In the lidded container according to the present invention, the seal portion may include a connection portion where the main seal portion and the protruding seal portion are connected, the connection portion may include an inner edge, and preferably, a first shortest distance from the contact suppression mechanism to the opening in a plan view is shorter than a second shortest distance from the inner edge of the connection portion of the seal portion in a plan view.

The present invention is a container having an opening, and the container includes a bottom portion, a side portion standing upright from the bottom portion, and a flange portion which is continuously connected to an upper portion of the side portion, includes a first plane to which a lid is joined, and defines the opening, wherein the flange portion is formed with a contact suppression mechanism for suppressing a contact between the flange portion and the lid, and the contact suppression mechanism is a container including a cutout portion formed at an outer edge of the flange portion, a stepped portion including a flange wall portion which is continuously connected to the first plane and extends downward from the first plane and a second plane which is continuously connected to the flange portion, or a protrusion protruding upward from the first plane.

In the container according to the present invention, the side portion may include a first portion corresponding to the contact suppression mechanism and second portions located on both sides of the first portion, and the first portion may constitute the same plane or the same curved surface continuous with second portions.

In the container according to the present invention, preferably, the contact suppression mechanism is located on a straight line extending so as to connect an inner edge of the flange portion and the center point of the opening with the shortest distance.

In the lidded container of the present invention, even when the flange portion of the container warps during microwave heating, steam can be passed from the protruding seal portion.

DETAILED DESCRIPTION OF THE INVENTION

Hereinafter, each embodiment of the present invention will be described in detail. The present invention is not limited to the following embodiments at all and can be implemented by appropriately making modifications within the scope of the present invention.

First Embodiment

Lidded Container

Figure 1:
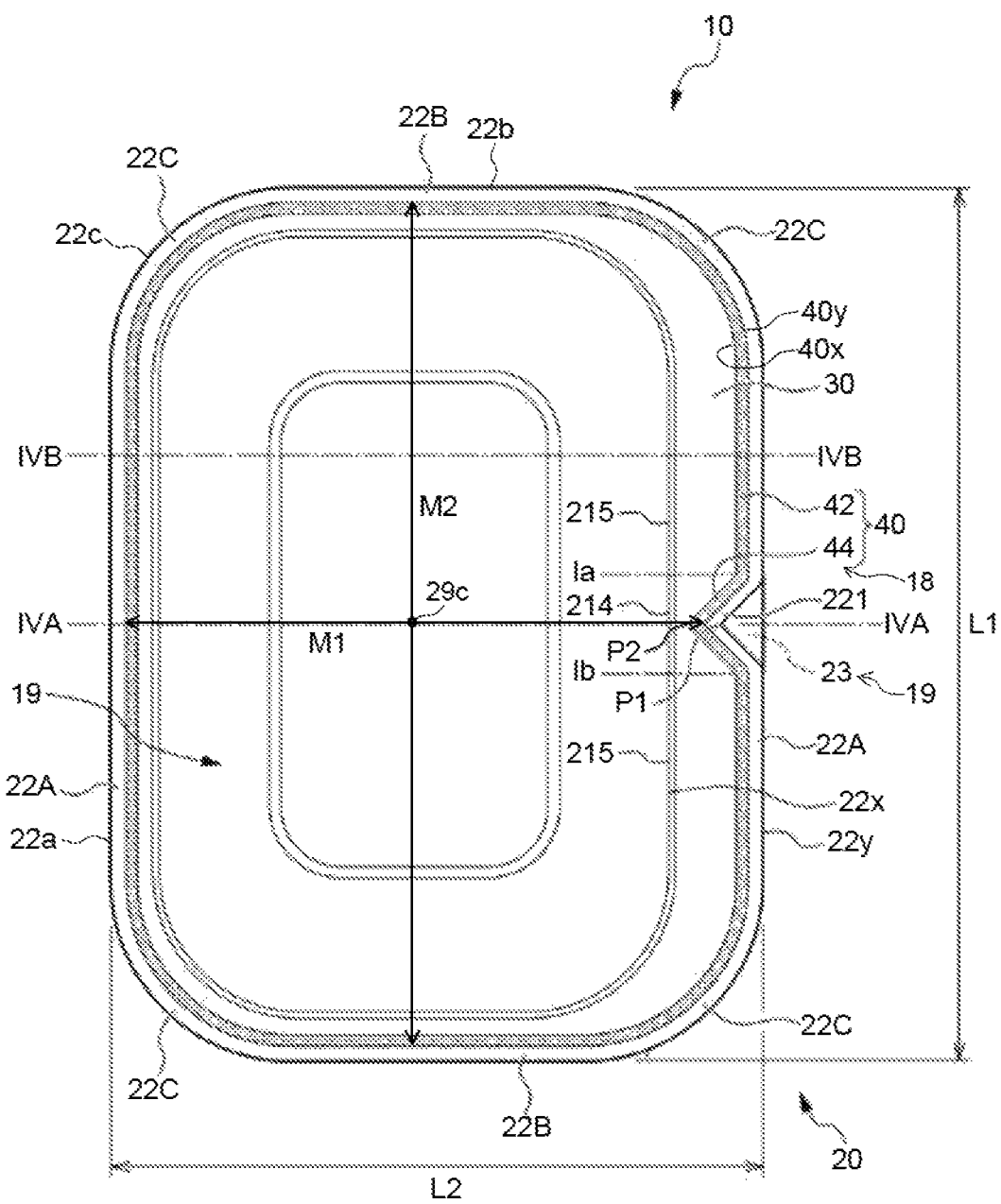
FIG. 1 is a plan view of a lidded container of a first embodiment of the present invention.
Figure 2:
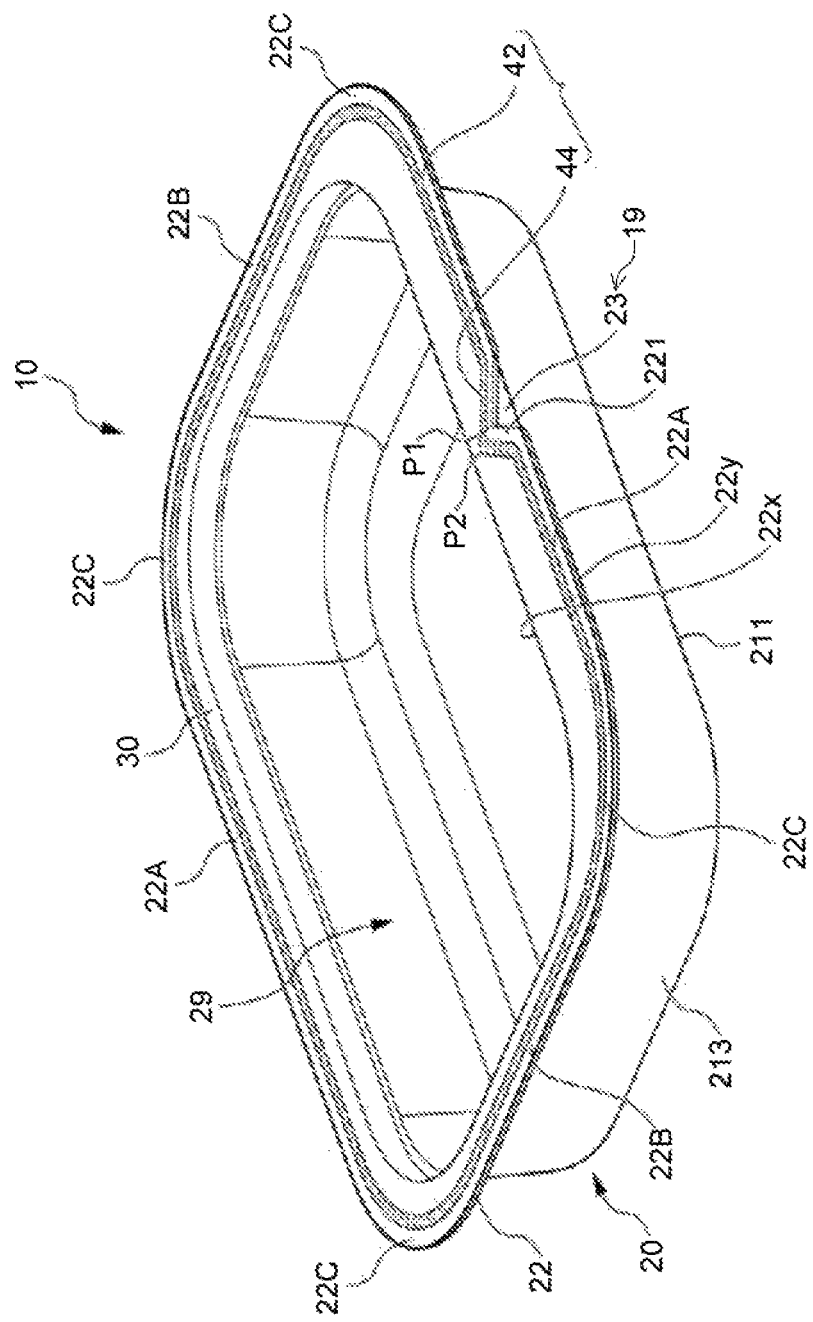
FIG. 2 is a perspective view of the lidded container of the first embodiment of the present invention.
Figure 3:
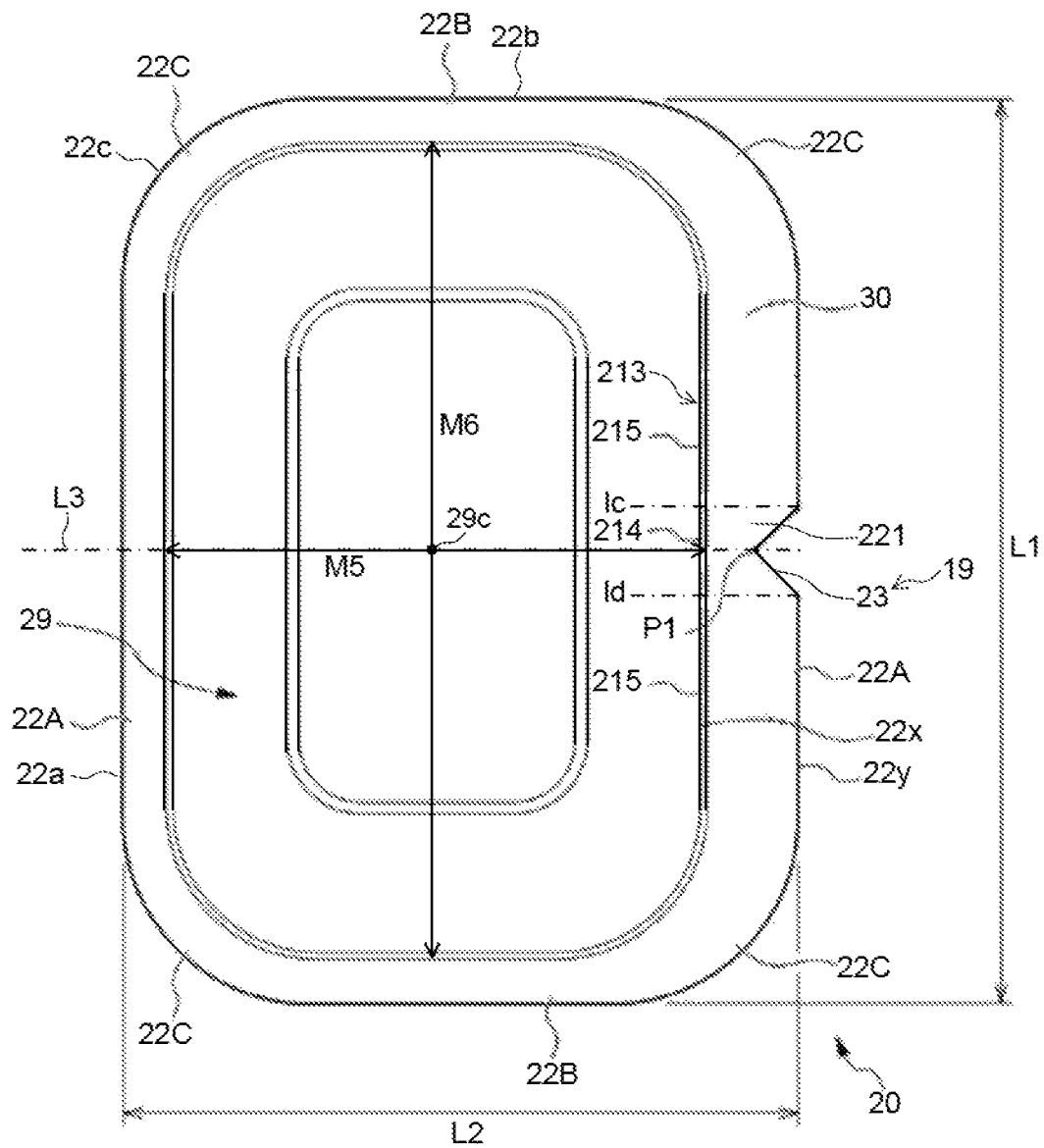
FIG. 3 is a plan view of a container constituting the lidded container of FIG. 1.
Figure 4A:
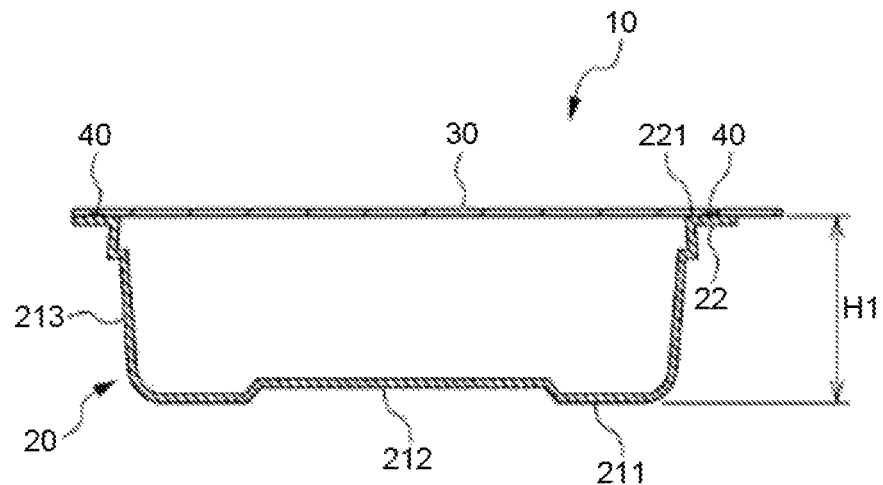
FIG. 4A is a cross-sectional view taken along line IVA-IVA of the lidded container shown in FIG. 1.
Figure 4B:
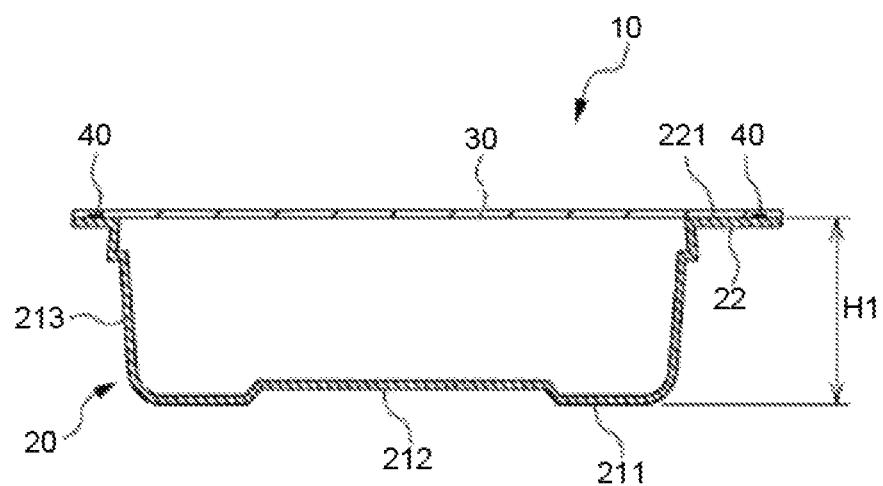
FIG. 4B is a cross-sectional view taken along line IVB-IVB of the lidded container shown in FIG. 1.
Figure 5:
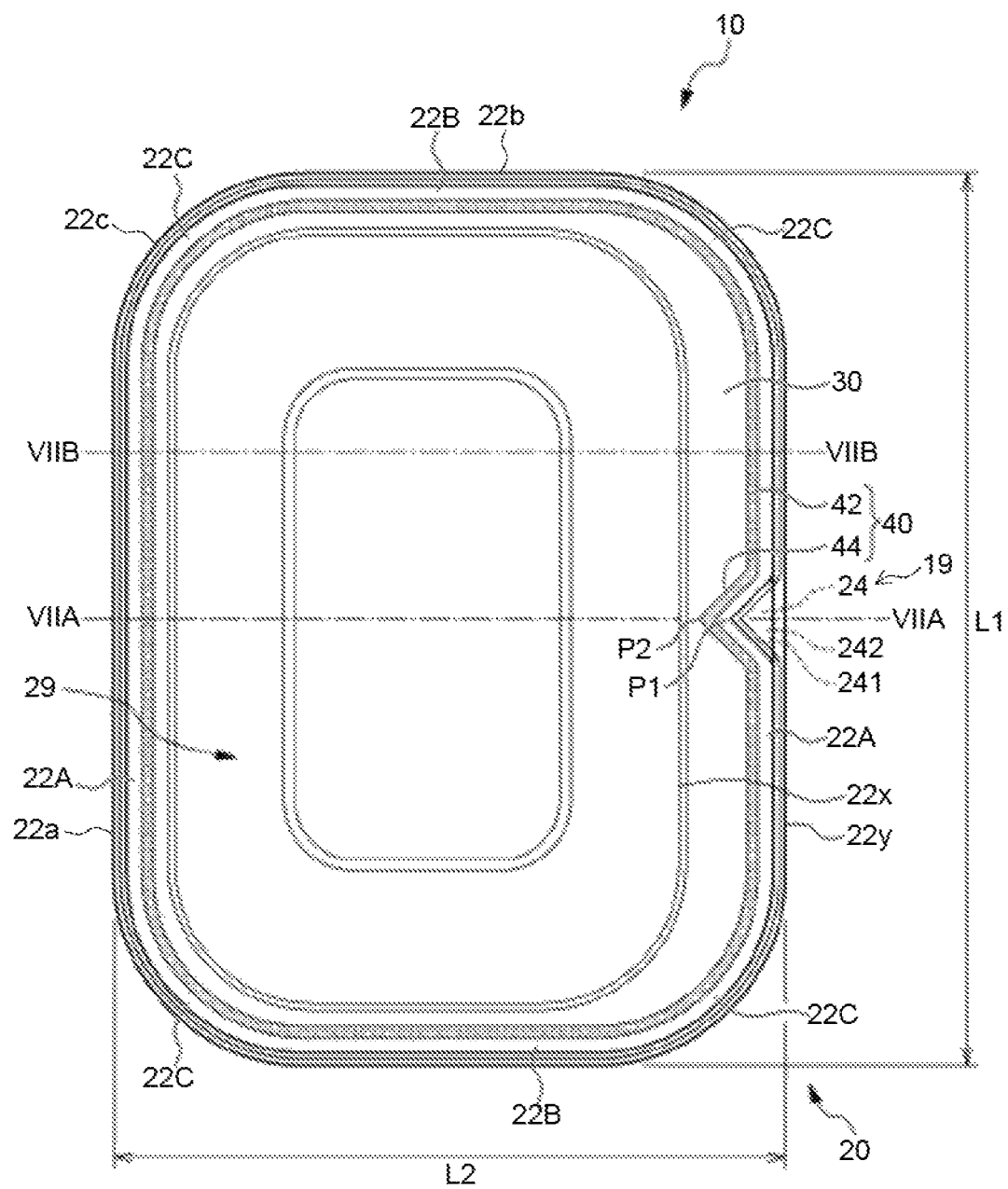
FIG. 5 is a plan view of a lidded container according to a first modification of the first embodiment.

Hereinafter, a lidded container 10 of the first embodiment will be described with reference to FIGS. 1 to 4B. FIG. 1 is a plan view of the lidded container of the first embodiment, and FIG. 2 is a perspective view of the lidded container of the first embodiment. FIG. 3 is a plan view of a container 20 constituting the lidded container 10. FIG. 4A is a cross-sectional view taken along line IVA-IVA of the lidded container 10 shown in FIG. 1, and FIG. 4B is a cross-sectional view taken along line IVB-IVB of the lidded container 10 shown in FIG. 1. For the sake of avoiding complication, in FIG. 1, the configuration located under the lid 30 is indicated by a solid line. In the accompanying drawings of the present description, for the sake of simplicity in drawings and of ease of understanding, the scale, the ratio of height to width, etc., are appropriately modified or enlarged. Shapes and geometrical conditions, and also their degrees used in this specification are defined. For example, the terms such as "parallel", "orthogonal", and "the same", the values of length and angle, etc. are, not to limited to the strict sense of the terms, but interpreted to such an extent that a similar function can be expected.

Lidded Container

The lidded container 10 includes the container 20 and the lid 30 covering an opening 29 of the container 20, and a circumferential seal portion 40 is formed between the container 20 and the lid 30. In FIG. 1, reference numeral 40x denotes an edge portion (hereinafter, also referred to as an inner edge) located on the opening 29 side of the seal portion 40, and reference numeral 40y denotes an outer edge located on the opposite side of the inner edge 40x. The container 20 and the lid 30 are joined via the seal portion 40 to seal contents (not shown) such as foods. In the present invention, the term "circumferential shape" refers to a seal portion formed over one circumference, and the seal portion is not limited to a circumferential shape, but may be a polygonal shape or a combination of a circumferential shape and a polygonal shape.

The content to be contained in the lidded container 10 is not particularly limited, and examples of the contents include retort foods, frozen foods, and refrigerated foods. Examples of foods include curry, porridge, fried noodles, side dishes, and fishes. In these contents, moisture evaporates with heating, and pressure of a storage portion of the lidded container 10 increases; therefore, a steam removal function of releasing steam inside the lidded container 10 to the outside is required for the lidded container 10 for heating cooking.

Container

The container 20 can be molded by, for example, an injection molding method or a sheet forming method. The material constituting the container 20 is not particularly limited, and a plastic such as polypropylene, polystyrene, or polyethylene terephthalate can be used. When the container 20 is manufactured by injection molding, in order to secure moldability, it is preferable that height H1 (see FIGS. 4A and 4B) of the container 20 is set to be not more than length L2 (see FIG. 1) in a lateral direction of a flange portion 22 of the container 20.

In the present invention, refrigerated (chilled) and frozen foods are also assumed as contents to be stored in the lidded container 10. In this case, for example, in a conventional container using homopolypropylene, impact resistance at low temperature is lowered. Thus, by using block polypropylene or the like containing a rubber component or an ethylene component, the impact resistance at low temperature is improved. However, addition of the rubber component and the ethylene component lowers rigidity of a container containing a flange portion, so that the problem of warpage of the flange portion is likely to occur. That is, the lidded container of the present invention is suitably used when block polypropylene containing a rubber component or an ethylene component is used as a container. Alternatively, even a container using homopolyethylene is suitably used when the thickness is small.

Next, the configuration of the container 20 will be described with reference to FIGS. 1 to 4B. The container 20 has a body portion 21, including a bottom portion (bottom wall) 211 and a side portion (side wall) 213, and the flat flange portion 22 continuously connected to an upper edge of the side portion 213 of the body portion 21. An inner edge 22x of the flange portion 22 defines the opening 29 of a storage portion of the container 20. The side portion 213 stands upright from the bottom portion 211 so as to spread over one circumference along an outer edge of the bottom portion 211.

The lid 30 is joined to an upper surface of the flange portion 22 of the container 20 via the seal portion 40. FIGS. 1 and 2 show an example in which the flange portion 22 is continuously connected to the upper edge of the side portion 213 and extends outward horizontally. In the present specification, terms such as "plane", "upward", "downward", "upper edge", "horizontal", and "horizontal direction" indicate the positions and directions of the container 20, the lid 30, and constituent elements thereof based on a state in which the container 20 is placed such that the bottom portion 211 of the container 20 is located below.

The bottom portion 211 may have one or a plurality of protrusions and recesses like a raised portion 212 shown in FIGS. 4A and 4B. According to this constitution, when the contents are heated and cooked by a microwave oven, it is possible to suppress deformation of the lidded container 10 when the pressure inside the lidded container 10 increases.

In the present embodiment, in the side portion 213, a first portion 214 corresponding to a cutout portion 23 to be described later constitutes the same plane or the same curved surface continuous with second portions 215 located on both sides of the first portion 214. In the present embodiment, as shown in FIG. 1, a portion sandwiched between a straight line la corresponding to one end of the cutout portion 23 and a straight line lb corresponding to the other end of the cutout portion 23 corresponds to the first portion 214 of the side portion 213, the second portions 215 of the side portion 213 are located on both sides of the first portion 214, and the first portion 214 and the second portion 215 of the side portion 213 form one continuous plane. In other words, the inner edge 22x of the flange portion 22 corresponding to the first portion 214 and the second portion 215 of the side portion 213 forms a straight line (see FIG. 1). When the first portion 214 of the side portion 213 and the second portion 215 of the side portion 213 form the same curved surface, the first portion 214 and the second portion 215 form one continuous curved surface.

Flange Portion

The contour of the flange portion 22 is formed by an outer edge 22y and has a rectangular contour having a pair of long sides 22a and a pair of short sides 22b. As shown in FIG. 1, in the present embodiment, a rectangular shape includes a shape in which a corner 22c is provided between the long side 22a and the short side 22b. That is, in the present embodiment, the contour of the flange portion 22 is continuously formed in a circumferential shape through the long side 22a, the corner 22c, the short side 22b, the corner 22c, the long side 22a, the corner 22c, the short side 22b, and the corner 22c. In the following description, a portion of the flange portion 22 extending along the long side 22a is also referred to as a long side portion 22A. Further, a portion of the flange portion 22 extending along the short side 22b is also referred to as a short side portion 22B. Furthermore, a portion of the flange portion 22 corresponding to the corner 22c is also referred to as a corner portion 22C.

In FIG. 1, reference numeral L1 denotes length in the longitudinal direction of the flange portion 22 (an interval between one short side 22b and the other short side 22b), reference numeral L2 denotes length in the lateral direction of the flange portion (a distance between one long side 22a and the other long side 22a), and the length L1 is larger than the length L2. In FIGS. 1 and 2, the corner 22c is located between the long side 22a and the short side 22b and formed in a circular arc shape which is an outward convex. The corner 22c is obtained, for example, by chamfering an angular portion of a flange portion having a rectangular contour.

In FIG. 1, reference numeral M1 denotes, of a straight line IVA extending so as to pass through a distal end point P2 of a distal end portion of a protruding seal portion 44 to be described later and a center point 29c of the opening 29, a portion (hereinafter referred to as a first line segment) connecting two intersection points with an outer edge 40y of the circumferential seal portion 40. In the example shown in FIG. 1, one end of a first line segment M1 is located at the outer edge 40y of the protruding seal portion 44 on one long side portion 22A, and the other end of the first line segment M1 is located at the outer edge 40y of a main seal portion 42 on the other long side portion 22A. In FIG. 1, reference numeral M2 denotes, of a straight line that is orthogonal to the first line segment M1 and extends so as to pass through a center point 29c of the opening 29, a portion (hereinafter referred to as a second line segment) connecting two intersection points with the outer edge 40y of the circumferential seal portion 40. In the example shown in FIG. 1, one end of a second line segment M2 is located at the outer edge 40y of the main seal portion 42 on one short side portion 22B, and the other end of the second line segment M2 is located at the outer edge 40y of the main seal portion 42 on the other short side portion 22B. The first line segment M1 is shorter than the second line segment M2. For example, the length of the first line segment M1 is 0.85 or less of the length of the second line segment M2, more preferably 0.75 or less, further preferably 0.70 or less.

By making the length L1 larger than the length L2 or by making the first line segment M1 shorter than the second line segment M2, even if the way in which the lid 30 bulges when contents are heated using a microwave oven varies, the protruding seal portion 44, to be described later, on the long side portion 22A can be peeled off from the lid 30 or the flange portion 22 earlier than other portions of the seal portion 40.

In the present invention, the contour shape of the flange portion 22 is not particularly limited, and may be a circular shape, an elliptic shape, or a polygonal shape as a whole, or a combination thereof. The corner 22c is not limited to a curved portion, and may be constituted of an angular portion. The thickness of the flange portion 22 is set within a range of, for example, 0.5 mm or more and 2.0 mm or less.

Although the flange portion 22 is a ring-shaped portion extending horizontally from the upper edge of the side portion 213, in the present embodiment, as shown in FIGS. 4A and 4B, the flange portion 22 is constituted of a first plane 221. The first plane 221 is a ring-shaped portion extending horizontally from the upper edge of the side portion 213, that is, the inner edge 22x of the flange portion, and is a plane constituting the seal portion 40.

Cutout Portion

The cutout portion 23 formed so as to protrude inside the container 20 is formed at a central portion in the long side direction of one long side portion 22A of the flange portion 22. The cutout portion 23 is a portion having no planar portion extending horizontally in a region where the lid 30 exists, and is shown as a portion where the first plane 221 does not exist in FIGS. 1, 3, and 4A. The cutout portion 23 cuts out an outer edge of one long side portion 22A and is formed to have a tapered shape toward a distal end point (apex) P1 on the opening 29 side, and FIG. 1 shows the example in which the cutout portion 23 is formed into a triangle shape. As will be described later, the cutout portion 23 functions to prevent the upper surface of the flange portion 22 and a lower surface of the lid 30 from closely contacting each other when the contents are heated. In the following description, the constituent elements such as the cutout portion 23 which suppress the close contact between the flange portion 22 and the lid 30 are each also referred to as a contact suppression mechanism 19.

In FIG. 3, a straight line L3 is a straight line extending to connect the inner edge 22x of the flange portion 22 and the center point 29c of the opening 29 by the shortest distance. Preferably, as shown in FIG. 3, the contact suppression mechanism 19 is located on the straight line L3.

Further, in FIG. 3, reference numeral M5 denotes a portion (hereinafter referred to as a fifth line segment) of the straight line L3 overlapping with the opening 29. In FIG. 3, reference numeral M6 denotes, of a straight line that is orthogonal to the fifth line segment M5 and extends so as to pass through the center point 29c of the opening 29, a portion (hereinafter referred to as a sixth line segment) overlapping with the opening 29. The fifth line segment M5 is shorter than the sixth line segment M6. For example, the length of the fifth line segment M5 is 0.85 or less of the length of the sixth line segment M6, more preferably 0.75 or less, further preferably 0.70 or less.

Seal Portion

As shown in FIG. 1, the circumferential seal portion 40 for joining the lid 30 and the flange portion 22 of the container 20 is formed continuously over one circumference between the lid 30 and the flange portion 22. The circumferential seal portion 40 may be formed by at least partially melting at least one of the container 20 and the lid 30 by sealing means such as heat, ultrasonic wave, or high frequency wave. Otherwise, the seal portion 40 may be formed of a separate constituent element from the container 20 and the lid 30, such as an adhesive. By forming the seal portion 40 between the lid 30 and the flange portion 22, the opening 29 of the container 20 can be sealed without a gap.

As shown in FIG. 1, the circumferential seal portion 40 is constituted of the main seal portion 42 extending along the long side 22a, the short side 22b, and the corner 22c, which are the outer edges of the flange portion 22, and the protruding seal portion 44 disposed at a substantially central portion on the long side portion 22A of the flange portion 22 and protruding inward from the main seal portion 42.

The protruding seal portion 44 is formed on the first plane 221 located inside the cutout portion 23 and is provided along the cutout portion 23 so as to have a substantially V shape protruding inside the container 20 and having a distal end point (apex) P2. As will be described later, the protruding seal portion 44 peels off earlier than the main seal portion 42 when the contents are heated, and functions to discharge steam inside the lidded container 10 to the outside. In the following description, a constituent element for discharging the steam inside the lidded container 10 preferentially to the outside, such as the protruding seal portion 44, is also referred to as a steam escape mechanism 18.

In the present invention, the flange portion constituting the circumferential seal portion 40 is not limited to a flat surface. A protrusion may be formed on the flange portion, and the circumferential seal portion 40 may be formed via the protrusion.

Lid

A material constituting the lid 30 to be joined to the container 20 is selected such that the lower surface of the lid 30 can be joined to at least the upper surface of the flange portion 22 of the container 20. For example, the lid 30 includes a base material layer and a sealant layer constituting the lower surface of the lid 30. Although the thickness of the lid 30 is not particularly limited, it can be set within a range of, for example, 20 μm or more and 100 μm or less.

As a material constituting the base material layer, a polyester type resin such as polyethylene terephthalate, a polyamide type resin such as nylon, polypropylene, or the like can be used. As a material constituting the sealant layer, polypropylene, a mixed resin of polypropylene and polyethylene, or the like can be used. When both the base material layer and the sealant layer contain polypropylene, biaxially oriented polypropylene is used in the base material layer, and non-oriented polypropylene is used in the sealant layer.

Operation of Lidded Container

In the lidded container 10 containing contents, when the contents are heated using a microwave oven, the temperature of the contents rises, and accordingly moisture contained in the contents evaporates to increase the pressure inside the lidded container 10. When the pressure inside the lidded container 10 further increases with heating, the lid 30 bulges, and stress is applied to the circumferential seal portion 40. Here, in the lidded container 10, the distal end point P2 of the protruding seal portion 44 is formed on the long side portion 22A of the flange portion 22. Thus, the stress concentrates at the distal end point P2 of the protruding seal portion 44.

At this time, the inner edge 22x of the flange portion 22 at a position corresponding to the protruding seal portion 44 forms a straight line, and the first portion 214 of the side portion 213 and the second portions 215 located on both sides of the first portion 214 constitute the same plane or the same curved surface. Specifically, in this embodiment, the first portion 214 and the second portion 215 are constituted of the same plane.

As a result, in a lidded container in which the cutout portion 23 is not formed, stress concentrates at the distal end point P2 of the protruding seal portion 44, and when the flange portion of the protruding seal portion 44 warps upward, since the first plane 127 exists under the lid 30, the lid 30 and the flange portion 22 come into close contact with each other, making it difficult for steam to escape, so that even if the distal end point P2 preferentially peels off, the steam cannot escape.

However, in the lidded container of the present embodiment, since the cutout portion 23 is formed under the lid 30, even if the flange portion 22 including the protruding seal portion 44 warps, it is possible to facilitate passage of steam.

First Modification of Lidded Container

A first modification of the first embodiment will be described using the lidded container 10 of FIGS. 5 to 7B. In the following description of other embodiments, the same reference numerals as in the above embodiment will be used by referring to the description of the above embodiment, and the description thereof will be omitted. The same applies to the second and subsequent modifications. For the sake of avoiding complication, in FIG. 5, the configuration located under the lid 30 is indicated by a solid line.

The lidded container 10 of FIGS. 5 to 7B is different from the above embodiment in that a stepped portion 24 is formed. In the present modification, the stepped portion 24 functions as the contact suppression mechanism 19 which prevents the upper surface of the flange portion 22 and the lower surface of the lid 30 from closely contacting each other when the contents are heated.

In the first modification, the flange portion 22 includes at least the first plane 221 and a flange wall portion 241 which is continuously connected to an outer edge of the first plane 221 and extends downward. The flange portion 22 may further include a second plane 242 which is continuously connected to a lower portion of the flange wall portion 241 and extends horizontally. In the example shown in FIG. 7A, the stepped portion 24 is formed by the flange wall portion 241 and the second plane 242. In this case, by providing a space between a lower edge of the lid 30 and an upper edge of the second plane 242, even if the flange portion of the protruding seal portion 44 warps upward, it can make it easier for steam to pass. Here, in FIG. 7A, although a distance between the lower edge of the lid 30 and the upper edge of the second plane 242 is indicated by h1, h1 is preferably 1 mm or more, more preferably 2 mm or more and 5 mm or less. To be noted, the shape of the second plane 242 is not limited to a flat shape as long as the lower edge of the lid 30 and the second plane 242 do not come into close contact with each other.

Second Modification of Lidded Container

Figure 8:
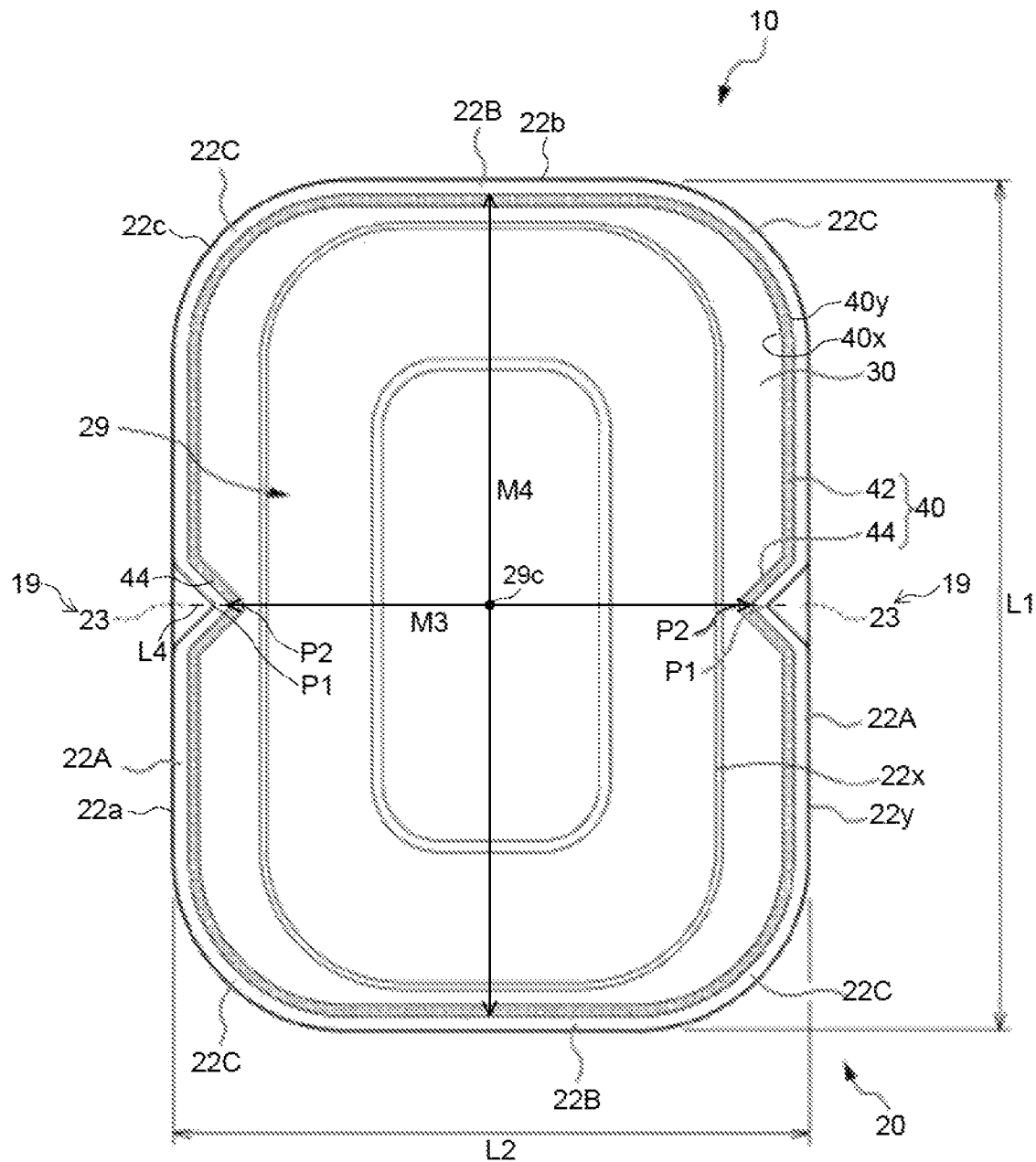
FIG. 8 is a plan view of a lidded container according to a second modification of the first embodiment.
Figure 9:
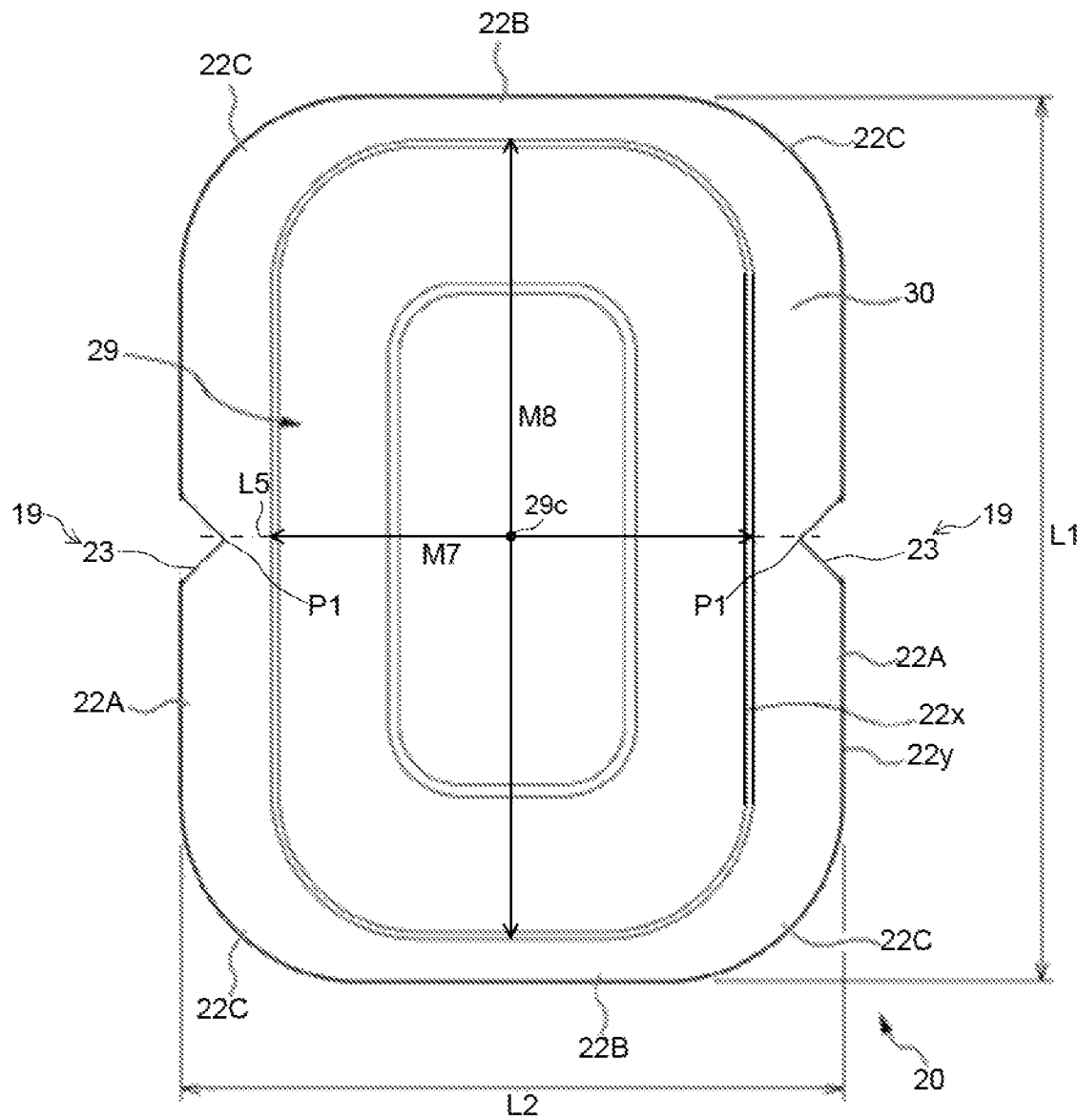
FIG. 9 is a plan view of a container constituting the lidded container of FIG. 8.

A second modification of the first embodiment will be described with reference to FIGS. 8 and 9. FIG. 8 is a plan view of the lidded container 10 according to the present modification, and FIG. 9 is a plan view of the container 20 constituting the lidded container 10 of FIG. 8. For the sake of avoiding complication, in FIG. 8, the configuration located under the lid 30 is indicated by a solid line. The lidded container 10 of FIG. 8 is different from the first embodiment in that cutout portions 23 are formed in two places at opposed positions on a pair of the long sides 22a.

As shown in FIG. 8, the protruding seal portions 44 are also formed in two places on the first plane 221 located inside the cutout portion 23. In FIG. 8, reference numeral M3 denotes, of a straight line L4 extending so as to pass through the distal end point P2 of the two protruding seal portions 44, a portion (hereinafter referred to as a third line segment) connecting two intersection points with the outer edge 40y of the circumferential seal portion 40. In the example shown in FIG. 8, the straight line L4 passes through the center point 29c of the opening 29. In FIG. 8, reference numeral M4 denotes, of a straight line that is orthogonal to the third line segment M3 and extends so as to pass through the center point 29c of the opening 29, a portion (hereinafter referred to as a fourth line segment) connecting two intersection points with the outer edge 40y of the circumferential seal portion 40. The third line segment M3 is shorter than the fourth line segment M4. For example, the length of the third line segment M3 is 0.85 or less of the length of the fourth line segment M4, more preferably 0.75 or less, further preferably 0.70 or less.

In FIG. 9, a straight line L5 is a straight line extending to connect the inner edge 22x of the flange portion 22 and the center point 29c of the opening 29 by the shortest distance. Preferably, as shown in FIG. 9, the two contact suppression mechanisms 19 are both located on the straight line L5. In the example shown in FIG. 9, the straight line L5 passes through distal end points P1 of the two cutout portions 23.

Further, in FIG. 9, reference numeral M7 denotes a portion (referred to as a seventh line segment) of the straight line L5 overlapping with the opening 29. In FIG. 9, reference numeral M8 denotes, of a straight line that is orthogonal to the seventh line segment M7 and extends so as to pass through the center point 29c of the opening 29, a portion (hereinafter referred to as an eighth line segment) overlapping with the opening 29. The seventh line segment M7 is shorter than the eighth line segment M8. For example, the length of the seventh line segment M7 is 0.85 or less of the length of the eighth line segment M8, more preferably 0.75 or less, further preferably 0.70 or less.

In the lidded container 10 of the second modification of the first embodiment, even if the pressure of a sealing head forming the circumferential seal portion 40 becomes uneven in the plane and sealing strength varies, it is possible to allow steam to pass through either one of the two cutout portions 23 formed in the flange portion 22, so that steam can be more reliably passed through.

Third Modification of Lidded Container

Figure 10:
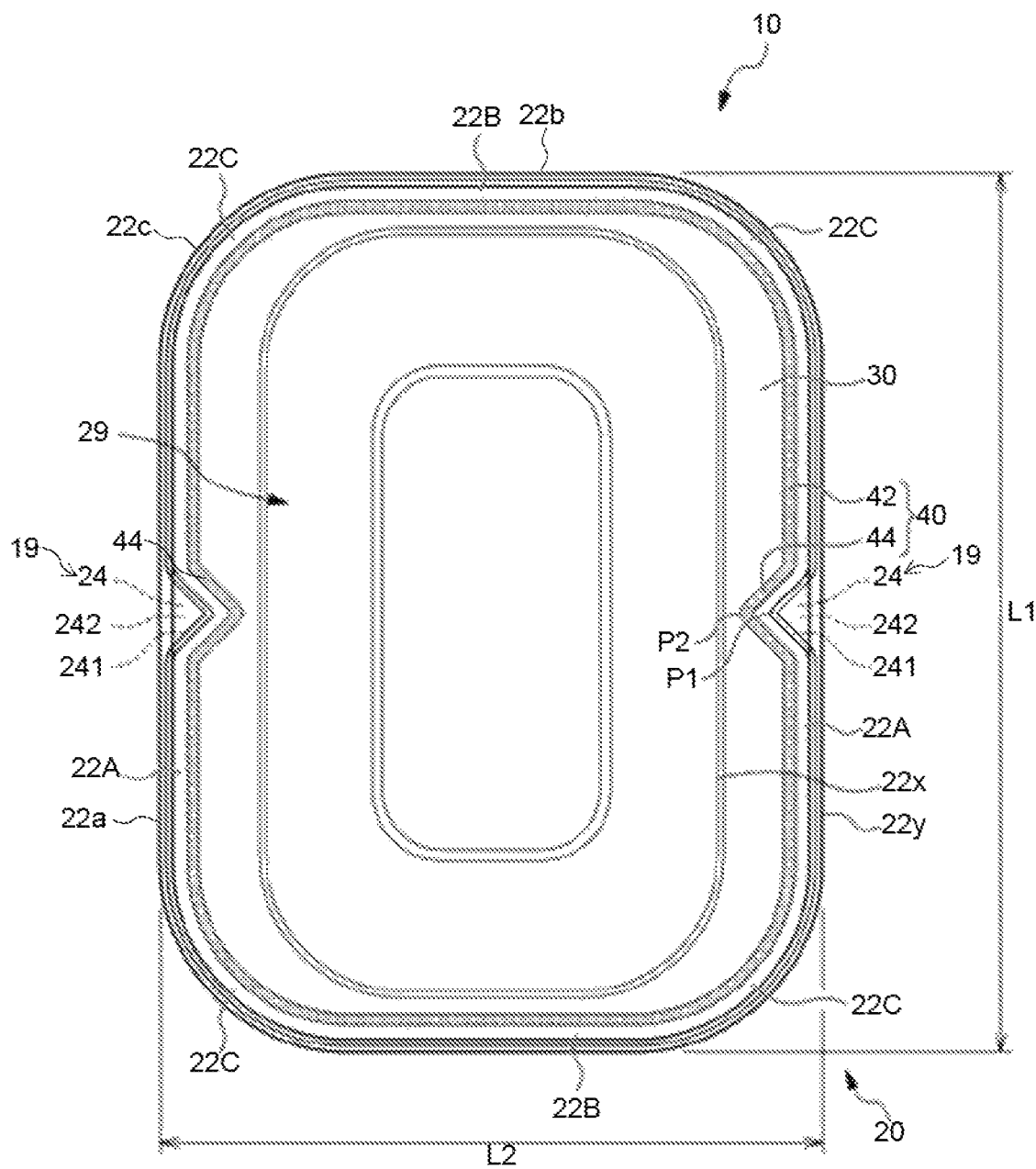
FIG. 10 is a plan view of a lidded container according to a third modification of the first embodiment.

A third modification of the first embodiment will be described using the lidded container 10 of FIG. 10. For the sake of avoiding complication, in FIG. 10, the configuration located under the lid 30 is indicated by a solid line. The lidded container 10 of FIG. 10 is different from the first modification of the first embodiment in that the stepped portions 24 are formed in two places at opposed positions on a pair of the long sides 22a.

Also in the lidded container 10 of the third modification of the first embodiment, even if the pressure of the sealing head forming the circumferential seal portion 40 becomes uneven in the plane and the sealing strength varies, it is possible to allow steam to pass through either one of the two stepped portions 24 formed in the flange portion 22, so that steam can be more reliably passed through.

As described above, in the lidded container of the present embodiment, even in a case where the flange portion warps due to microwave heating, it is possible to release steam suitably from the steam escape mechanism of the seal portion.

Second Embodiment

Next, a second embodiment of the present invention will be described. First, problems to be solved by the second embodiment will be described.

In the above-described Patent Literature 1, a protrusion protruding toward the storage portion is formed at a portion located inside a protruding line of a heat seal line in the flange portion, and a recess recessed toward the storage portion is formed at a portion located outside the protruding line in the flange portion. In other words, the protruding line of the heat seal line is formed between the protrusion on the inner edge side of the flange portion and the recess on the outer edge side. In this case, in a process of heat-sealing the lid to the flange portion using a hot plate, it is necessary to dispose a portion of the hot plate having a pattern corresponding to the protruding line between the protrusion and the recess of the flange portion. Thus, positioning accuracy of the hot plate required in the heat-sealing process is increased. As a result, time and cost required for the heat-sealing process increase. It is an object of the present embodiment to provide a lidded container which can effectively solve such a problem.

Hereinafter, a lidded container 10 of the second embodiment will be described with reference to FIGS. 11 to 20. In the second embodiment, the same parts as those of the first embodiment are denoted with the same reference numerals, and the detailed descriptions may be omitted. When it is obvious that the operations and effects obtained in the first embodiment can also be obtained in the second embodiment, its description may be omitted.

Lidded Container

Figure 11:
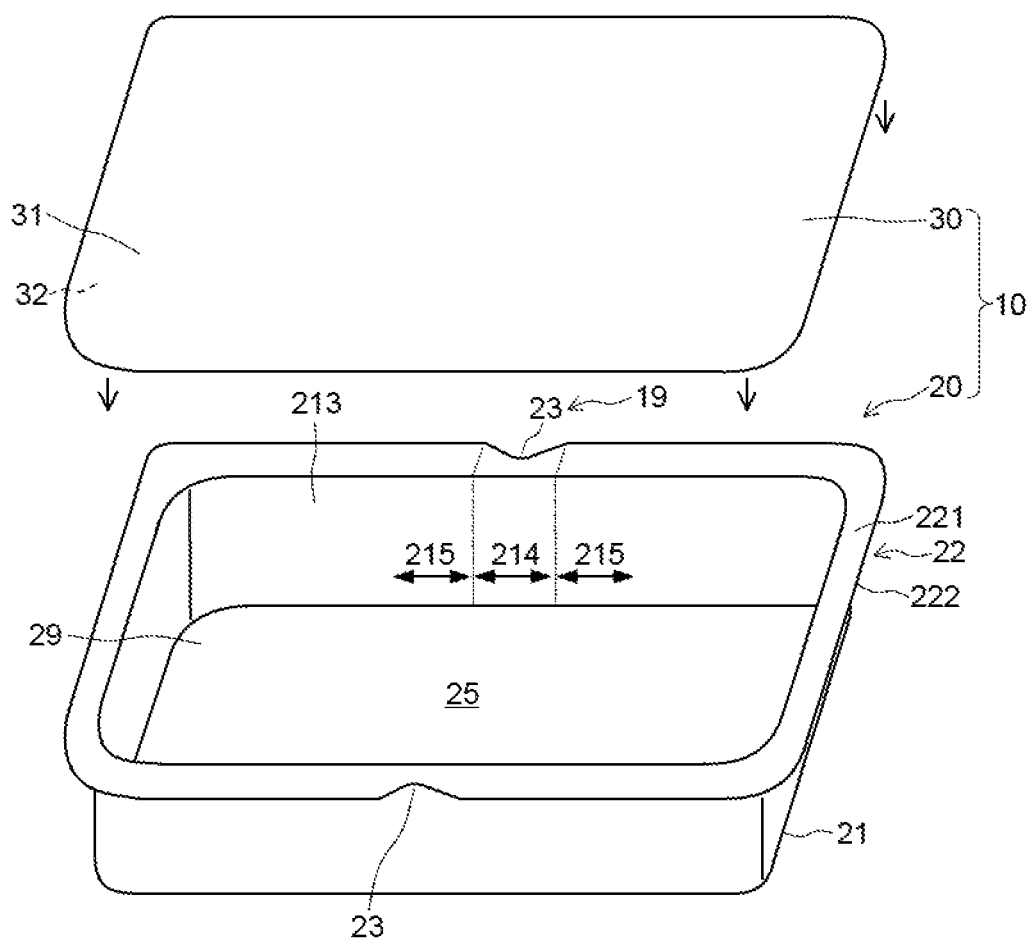
FIG. 11 is an exploded view of members constituting a lidded container of a second embodiment of the present invention.
Figure 12:
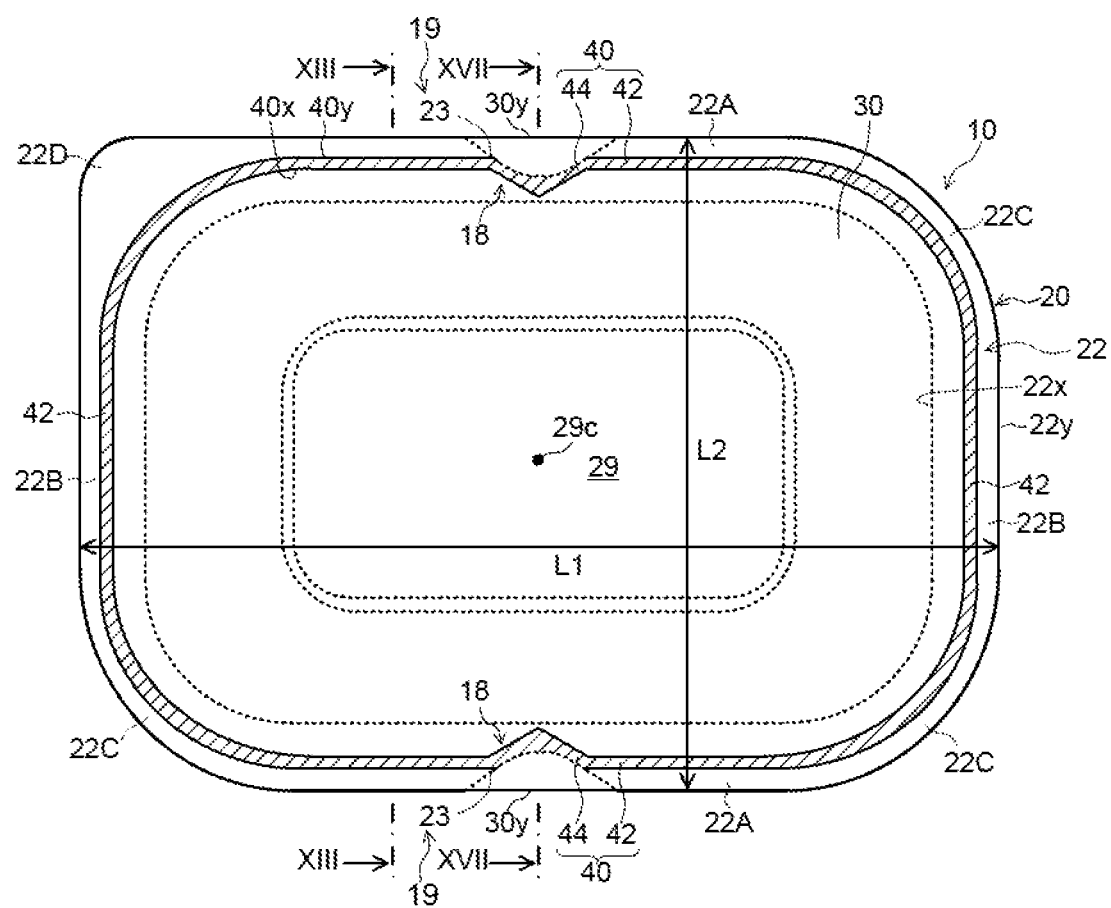
FIG. 12 is a plan view showing the lidded container of the second embodiment of the present invention.
Figure 13:
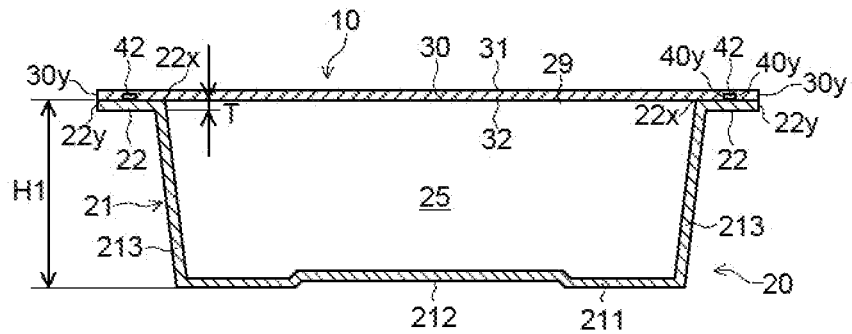
FIG. 13 is a cross-sectional view taken along line XIII-XIII of the lidded container shown in FIG. 12.

First, with reference to FIGS. 11 to 13, the outline of the lidded container 10 will be described. FIG. 11 is an exploded view of members constituting the lidded container 10, and FIG. 12 is a plan view of the lidded container 10. FIG. 13 is a cross-sectional view of the lidded container shown in FIG. 12 as viewed along line XIII-XIII.

The lidded container 10 includes a container 20 in which a storage portion 25 for storing contents is formed, a lid 30 for covering the opening 29 of the storage portion 25 of the container 20, and a seal portion (joint portion) 40 for joining the lid 30 to the container 20. The lidded container 10 further includes a steam escape mechanism 18 which discharges steam, which is generated in the storage portion 25 as the contents are heated, to the outside of the storage portion 25. In this specification, the term "joining" is a concept including both welding and bonding. The term "welding" means that the lid 30 is attached to the container 20 by at least partially melting at least one of the container 20 and the lid 30. The term "adhesion" means that the lid 30 is attached to the container 20 using a separate constituent element from the container 20 and the lid 30, such as an adhesive.

The contents contained in the container 20 contain at least water. Examples of the contents include retort foods, frozen foods, and refrigerated foods. Examples of foods include curry, porridge, fried noodles, side dishes, and fishes. In these contents, moisture evaporates with heating, and the pressure of the storage portion 25 of the container 20 increases; therefore, the steam escape mechanism 18 which releases the steam inside the storage portion 25 to the outside is required for the lidded container 10.

Hereinafter, the container 20, the lid 30, the seal portion 40, and the steam escape mechanism 18 will be described.

Container

As shown in FIGS. 11 to 13, the container 20 includes a body portion 21 which defines the storage portion 25, and a flange portion 22 which is continuously connected to an upper portion of the body portion 21 over one circumference. As in the case of the first embodiment, the body portion 21 includes, for example, a bottom portion 211 and a side portion 213 which stands upright from the bottom portion 211 so as to spread over one circumference along an outer edge of the bottom portion 211. As shown in FIG. 13, the bottom portion 211 may be formed with a raised portion 212 raised upward. The flange portion 22 is continuously connected to an upper edge of the side portion 213 of the body portion 21 and extends outward horizontally. In this specification, the term "outside" is a side away from a center point 29c of the opening 29 of the container 20 in a plan view. The term "inside" is a side approaching the center point 29c of the opening 29 of the container 20.

In the present embodiment, the flange portion 22 has a substantially square (substantially rectangular) contour. For example, the flange portion 22 has a pair of long side portions 22A, a pair of short side portions 22B, and a corner portion 22C located between the long side portion 22A and the short side portion 22B. A direction in which the long side portion 22A extends and a direction in which the short side portion 22B extends are orthogonal to each other. In FIG. 12, reference numeral L1 denotes a distance between an outer edge of one short side portion 22B and an outer edge of the other short side portion 22B, and reference numeral L2 denotes a distance between an outer edge of one long side portion 22A and an outer edge of the other long side portion 22A. The length L1 is larger than the length L2.

As shown in FIG. 12, the corner portion 22C may have a curved shape that protrudes outward. The corner portion 22C is obtained, for example, by chamfering an angular portion of a flange portion having a rectangular contour. Although not shown, the corner portion 22C may have an angulated shape. Some of the corner portions 22C may be tabs 22D protruding more outward than the other corner portions 22C.

Although FIG. 12 shows an example in which a pair of the long side portions 22A is parallel to each other, a pair of the short side portions 22B is parallel to each other, and the long side portion 22A and the short side portion 22B are orthogonal to each other, the present invention is not limited to this example. For example, the pair of long side portions 22A may be nonparallel to each other, and the pair of short side portions 22B may be nonparallel to each other. An angle formed between the long side portion 22A and the short side portion 22B may deviate from 90 degrees.

As shown in FIGS. 11 and 12, a cutout portion 23 recessed inward is formed in a portion of an outer edge 22y of the flange portion 22. The cutout portion 23 is one of the elements constituting the above-described steam escape mechanism 18. Details of the cutout portion 23 will be described later.

Figure 14:
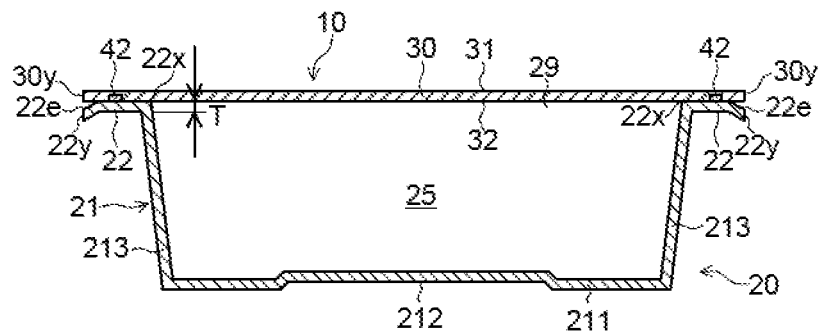
FIG. 14 is a cross-sectional view showing a modification of the lidded container.

FIG. 13 is a cross-sectional view of the lidded container 10 of FIG. 12 as viewed along line XIII-XIII which does not pass through the cutout portion 23. In the example shown in FIG. 13, the flange portion 22 includes a first plane 221 which spreads flat from an inner edge 22x to the outer edge 22y. However, the present invention is not limited thereto, and the flange portion 22 may include an inclined surface, a non-flat surface, or the like. For example, as shown in FIG. 14, the flange portion 22 may include an inclined surface 22e inclined downward to reach the outer edge 22y. In this case, the lid 30 needs not be joined to the inclined surface 22e.

In FIG. 13, reference numeral T denotes thickness of the container 20. The thickness T of the container 20 is, for example, 0.1 mm or more and 1.0 mm or less. As the thickness T of the container 20 decreases, for example, when the thickness T of the container 20 is 100 μm or more and 300 μm or less, the side portion 213 and the flange portion 22 of the container 20 are likely to deform, and when the thickness T is 200 μm or less, deformation is more likely to occur.

Also when the container 20 contains a rubber component or an ethylene component, deformation of the container 20 is likely to occur. When the container 20 is formed of, for example, block polypropylene containing a rubber component or an ethylene component, the rigidity and the heat resistance are lowered as compared with homopolypropylene not containing a rubber component or an ethylene component.

As a method of producing the container 20, an injection molding method and a sheet forming method can be adopted. When the container 20 is produced by injection molding, in order to ensure moldability, height H1 of the container 20 is preferably the above-described distance L2 or less. The sheet forming method is a method of pressing a mold against a plastic sheet to form a desired shape on the sheet. Examples of the material constituting the container 20 include plastics such as polystyrene, polypropylene, and polyethylene terephthalate.

When the container 20 is produced by processing a plastic sheet by a deep draw forming method as one type of the sheet forming method, a sheet having a thickness of 100 μm or more and 300 μm or less can be used. Examples of a laminate constituting the sheet include CPP/CNy/CPP and LLDPE/CNy/LLDPE. Here, "CPP" is a non-oriented polypropylene, "CNy" is a non-oriented nylon, and "LLDPE" is a linear low density polyethylene.

Lid

Figure 15:
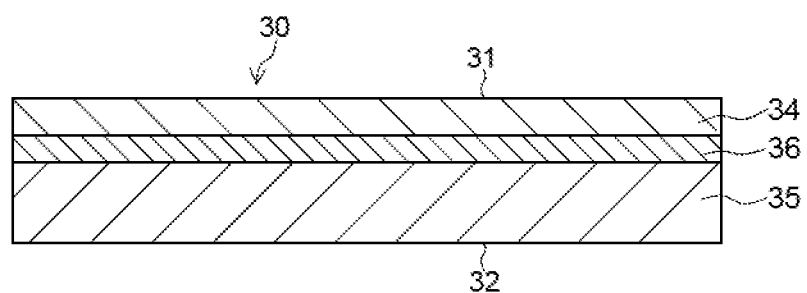
FIG. 15 is a cross-sectional view showing an example of a layer configuration of the lid.

The lid 30 is disposed on the first plane 221 of an upper surface of the flange portion 22 so as to cover the opening 29 of the storage portion 25 of the container 20 and joined to the first plane 221 of the flange portion 22 by the seal portion 40. The lower surface 32 of the lid 30 is configured to be capable of being joined to the first plane 221 of the flange portion 22. FIG. 15 is a cross-sectional view showing an example of a layer configuration of the lid 30. As shown in FIG. 15, the lid 30 includes at least a sealant layer 35 constituting the lower surface 32 of the lid 30 and a base material 34 stacked on the sealant layer 35.

As the material constituting the base material 34, a polyester type resin such as polyethylene terephthalate (PET), a polyamide type resin such as nylon (Ny), or a polyolefin type resin such as polypropylene (PP) can be used. The base material 34 may be constituted of a film stretched uniaxially or biaxially. The thickness of the base material 34 is, for example, 5 μm or more and 50 μm or less.

As the material constituting the sealant layer 35, one or two or more resins selected from polyethylene (PE) such as low density polyethylene (LDPE) and linear low density polyethylene (LLDPE) and polypropylene (PP) are usable. The sealant layer 35 may be a single layer or a multilayer. The sealant layer 35 is preferably non-oriented.

The sealant layer 35 preferably has an easy peel property. The easy peel property is such a property that when the lid 30 is peeled off from the flange portion 22 of the container 20, the lid 30 tends to peel off from the first plane 221 of the flange portion 22 at the lower surface 32 thereof, that is, at the interface of the sealant layer 35. The easy peel property can be expressed, for example, by constituting the sealant layer 35 with two or more kinds of resins and making one resin incompatible with the other resin. Examples of a resin capable of exhibiting the easy peeling property include a mixed resin of polyethylene (PE) and polypropylene (PP).

To be noted, the mode of peeling the lid 30 from the flange portion 22 of the container 20 is not limited to peeling at the interface of the sealant layer 35 (peeling between the first plane 221 of the flange portion 22 and a surface of the sealant layer 35). For example, the lid 30 may be peeled off from the flange portion 22 by cohesive failure of the sealant layer 35, or the lid 30 may be peeled off from the flange portion 22 by delamination between one layer constituting the lid 30 and another layer adjacent thereto.

The thickness of the sealant layer 35 is preferably 20 μm or more and 100 μm or less, more preferably 30 μm or more and 80 μm or less.

The lid 30 may further include other layers. As other layers, an appropriate layer can be selected according to required performance such as water vapor or other gas barrier properties, light shielding properties, and various mechanical strengths. For example, as a gas barrier layer, a metal layer such as an aluminum foil, a vapor deposited layer of metal such as aluminum, a metal oxide such as aluminum oxide, or an inorganic oxide such as silicon oxide, or aliphatic polyamide such as an ethylene-vinyl alcohol copolymer (EVOH), a polyvinylidene chloride resin (PVDC), or nylon MXD 6 may be provided. By providing such a gas barrier layer, entry of oxygen or water vapor into the interior of the lidded container 10 can be suppressed. In order to impart mechanical strength to a lid member, a support may be provided. As the support, the same material as that constituting the base material 34 can be used. The gas barrier layer and the support may be provided between the base material 34 and the sealant layer 35 or may be provided on a surface of the base material 34 on the side opposite to the sealant layer 35.

Examples of a method of stacking the base material 34 and the sealant layer 35 include a melt extrusion method and a dry lamination method. In the melt extrusion method, the material constituting the sealant layer 35 is extruded onto a film including the base material 34. In the dry lamination method, the sealant layer 35 formed of a film formed in advance and the film containing the base material 34 are bonded together using an adhesive. In the case of using the dry lamination method, as shown in FIG. 15, the lid 30 is located between the base material 34 and the sealant layer 35 and further includes an adhesive layer 36 formed of an adhesive.

When the lid 30 is produced by the melt extrusion method, the adhesive layer 36 containing an anchor coating agent used in the melt extrusion method sometimes exists in the lid 30.

Examples of the material constituting the adhesive layer 36 include a urethane-based resin and an epoxy-based resin of a two-component curable resin composed of a main agent and a curing agent. The thickness of the adhesive layer 36 is, for example, 1 µm or more and 6 µm or less.

Seal Portion

The seal portion 40 joins the first plane 221 of the flange portion 22 and the lower surface 32 of the lid 30 to seal the storage portion 25 of the container 20 from the outside. As shown in FIG. 12, the seal portion 40 is formed continuously over one circumference between the first plane 221 of the flange portion 22 and the lower surface 32 of the lid 30 so as to surround the opening 29 in a plan view. The seal portion 40 may be formed by at least partially melting at least one of the container 20 and the lid 30. Otherwise, the seal portion 40 may be formed of a separate constituent element from the container 20 and the lid 30, such as an adhesive. By forming the seal portion 40 between the lid 30 and the flange portion 22, the storage portion 25 of the container 20 can be sealed from the outside.

As shown in FIG. 12, the seal portion 40 has a main seal portion (main line) 42 extending along the flange portion 22, and a protruding seal portion (protruding line) 44 disposed at the long side portion 22A of the flange portion 22 and protruding inward from the main seal portion 42. In the example shown in FIG. 12, the main seal portion 42 extends in parallel with the inner edge 22x of the flange portion 22. The protruding seal portion 44 is located inside the above-described cutout portion 23 of the flange portion 22. Reference numeral 40x denotes an inner edge of the seal portion 40, and reference numeral 40y denotes an outer edge of the seal portion 40.

Figure 16:
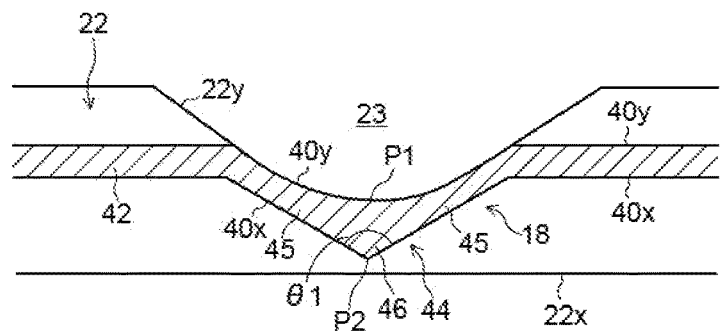
FIG. 16 is an enlarged plan view of a protruding seal portion shown in FIG. 12.
Figure 18:
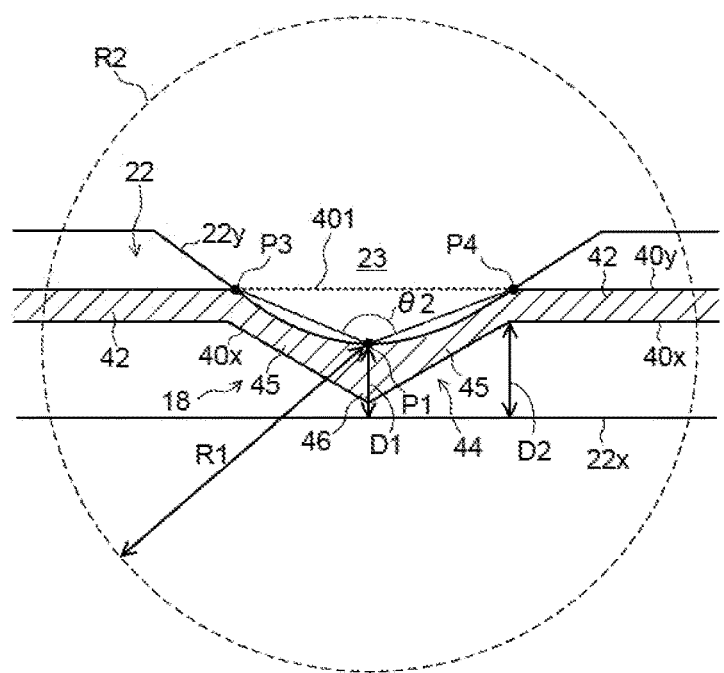
FIG. 18 is an enlarged plan view of a cutout portion of a flange portion.

FIG. 16 is an enlarged view of the protruding seal portion 44 of the seal portion 40 of the lidded container 10 shown in FIG. 12. In FIG. 16 and FIG. 18 to be described later, illustration of an outer edge 30y of the lid 30 is omitted in order to prevent the figure from becoming complicated.

As shown in FIG. 16, the protruding seal portion 44 of the seal portion 40 includes a pair of first portions 45 extending inward from the main seal portion 42. The pair of first portions 45 intersects at a distal end portion 46 located closest to the opening 29 side in the protruding seal portion 44. In other words, the protruding seal portion 44 has a substantially triangular shape protruding inward. In this case, when the pressure of the storage portion 25 of the container 20 increases with heating, the distal end portion 46 of the protruding seal portion 44 is peeled off first, the first portion 45 of the protruding seal portion 44 is subsequently peeled off, and a steam hole is formed between the lid 30 and the flange portion 22.

Figure 6:
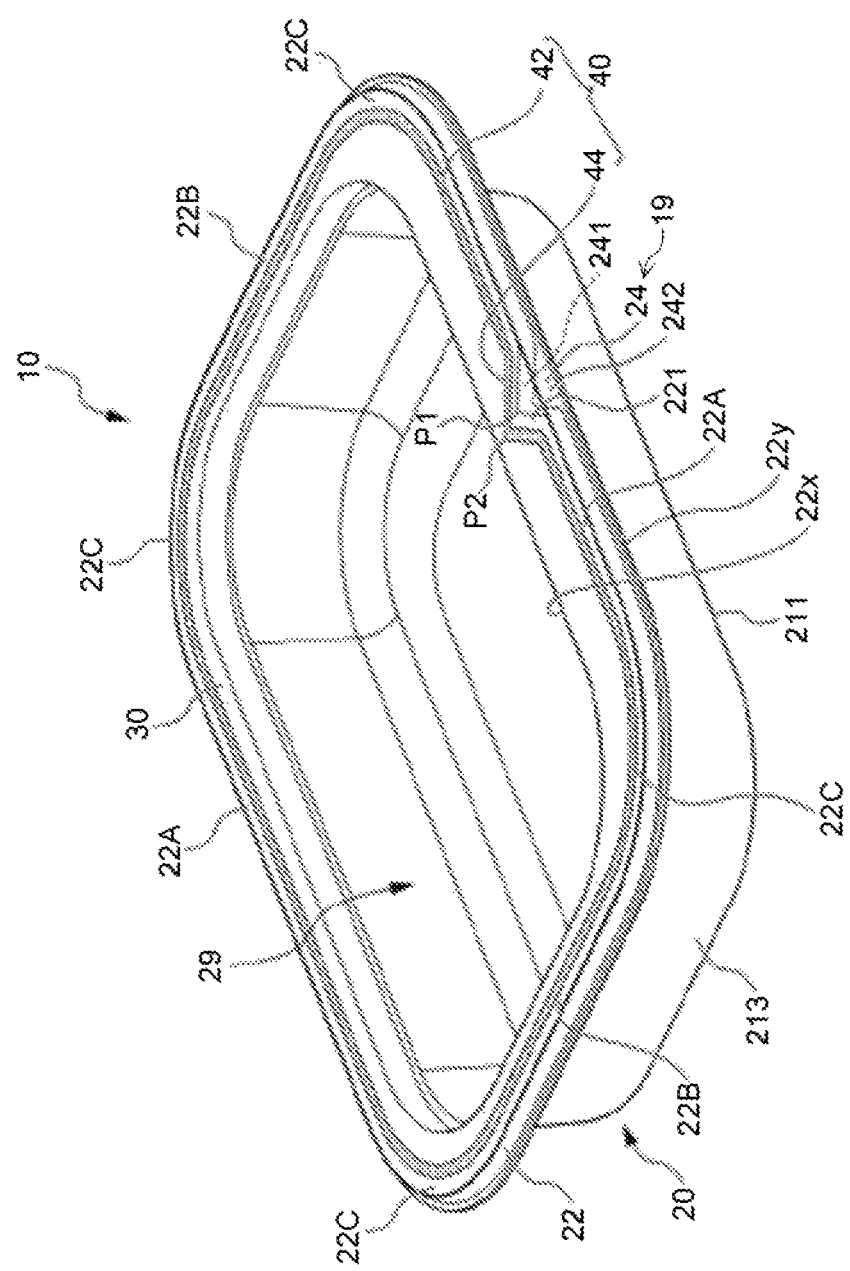
FIG. 6 is a perspective view of the lidded container according to the first modification of the first embodiment.
Figure 7A:
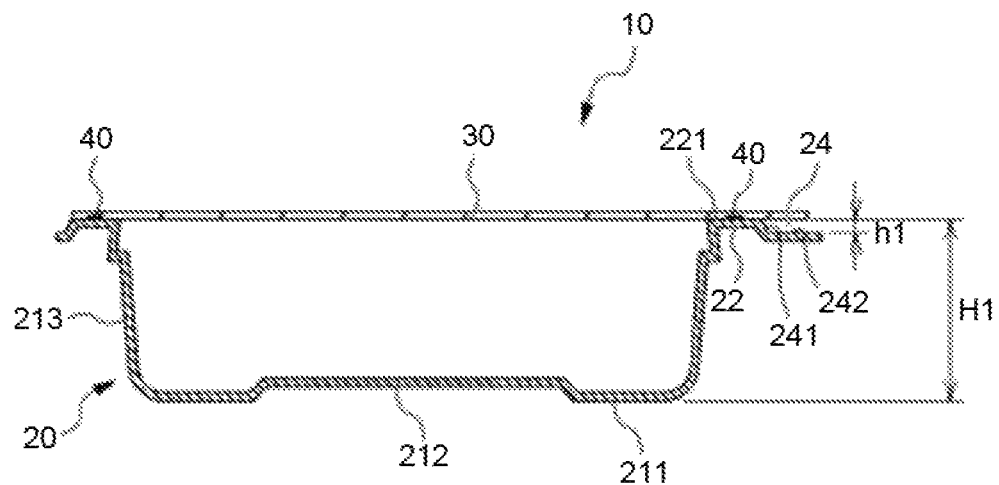
FIG. 7A is a cross-sectional view taken along line VIIA-VIIA of the lidded container shown in FIG. 5.
Figure 7B:
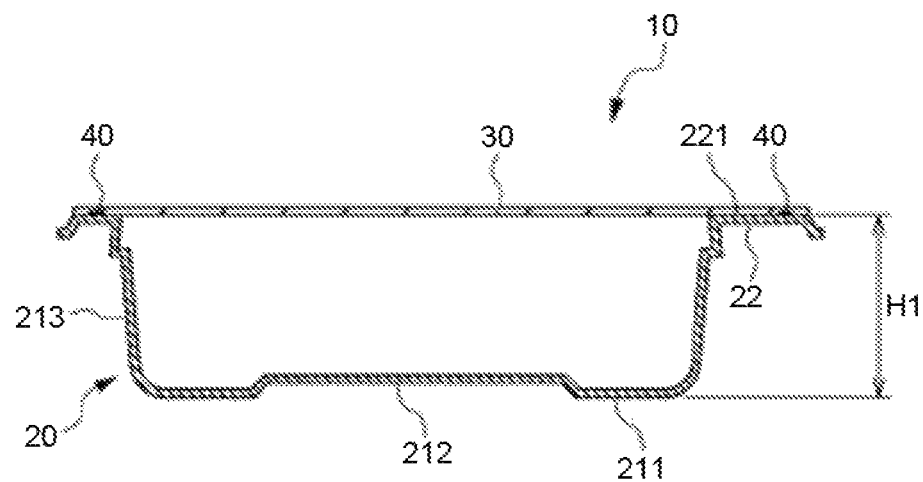
FIG. 7B is a cross-sectional view taken along line VIIB-VIIB of the lidded container shown in FIG. 5.

In FIG. 6, reference numeral θ1 denotes an angle formed by a direction in which an inner edge 40x of one of the pair of first portions 45 extends and a direction in which the inner edge 40x of the other first portion 45 extends (this angle is hereinafter also referred to as the first distal end angle). The first distal end angle θ1 between the pair of first portions 45 is less than 180°. For example, the first distal end angle θ1 is 60° or more and 150° or less. When the first distal end angle θ1 is 60° or more, it is possible to suppress peeling of the distal end portion 46 of the protruding seal portion 44 due to force applied to the lidded container 10 except for the heating time. On the other hand, when the first distal end angle θ1 is 150° or less, the pressure applied to the seal portion 40 at the time of heating can be effectively concentrated on the distal end portion 46 of the protruding seal portion 44.

To be noted, a specific shape of the protruding seal portion 44 is not limited as long as the protruding seal portion 44 can be peeled off from the flange portion 22 earlier than the main seal portion 42 when the contents are heated. For example, although not shown, the protruding seal portion 44 may further include a portion other than the above-described first portion 45. For example, the protruding seal portion 44 may include a second portion located between the main seal portion 42 and the first portion 45 and extending in a direction different from that of the first portion 45.

Steam Escape Mechanism

When the protruding seal portion 44 is peeled off, the steam hole is formed between the lid 30 and the flange portion 22, and the steam in the storage portion 25 escapes to the outside through the steam hole. As described above, the protruding seal portion 44 is one of the elements constituting the steam escape mechanism 18 for discharging the steam generated in the storage portion 25 to the outside of the storage portion 25.

The steam escape mechanism 18 is preferably provided such that a distance from the protruding seal portion 44 of the steam escape mechanism 18 to the center point 29c of the opening 29 is shorter than a distance from the main seal portion 42 to the center point 29c. For example, when the contour of the flange portion 22 is substantially rectangular, the protruding seal portion 44 of the flange portion 22 is preferably located in the middle of the long side portion 22A of the flange portion 22 in a direction in which the long side portion 22A extends. As a result, a distance between the center point 29c of the opening 29 and the inner edge 40x of the protruding seal portion 44 can be made the shortest, so that it is possible to further enhance the force acting on the protruding seal portion 44 due to pressure generated when the contents are heated.

As shown in FIGS. 12 and 16, the above-described cutout portion 23 of the flange portion 22, which is another element constituting the steam escape mechanism 18, is located outside the protruding seal portion 44. Thus, a distance from an outer edge 40y of the protruding seal portion 44 to the outer edge 22y of the flange portion 22 can be shorten as compared with the case where the cutout portion 23 is not provided. Thereby, after the protruding seal portion 44 is peeled off from the flange portion 22, the steam passes through a gap between the lid 30 and the flange portion 22 and easily escapes to the outside through the outer edge 22y of the flange portion 22.

Cutout Portion

Figure 17:
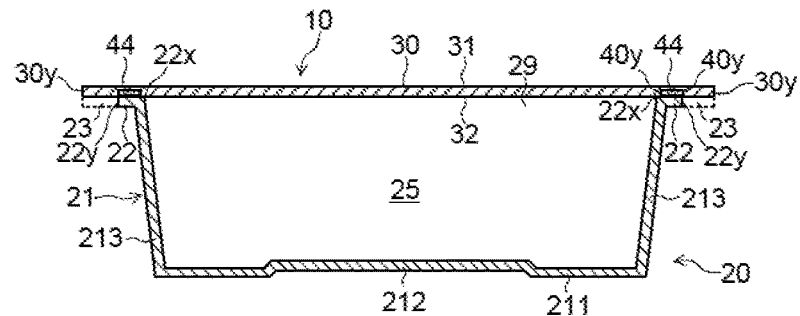
FIG. 17 is a cross-sectional view taken along line XVII-XVII of the lidded container shown in FIG. 12.

Hereinafter, the cutout portion 23 of the flange portion 22 will be described in detail. FIG. 17 is a cross-sectional view of the lidded container 10 shown in FIG. 12 as viewed along line XVII-XVII passing through the cutout portion 23. FIG. 18 is an enlarged plan view of the cutout portion 23 for explaining the cutout portion 23 of the flange portion 22. In FIG. 17, a dotted line drawn at a position denoted by reference numeral 23 indicates an example of a cutout region in the case of cutting out a portion of the outer edge 22y of the flange portion 22 to form the cutout portion 23. In the cross-sectional view shown in FIG. 17, nothing exists in a region surrounded by the dotted line, and the cutout portion 23 is formed.

As shown in FIGS. 17 and 18, the cutout portion 23 of the flange portion 22 is at least partially in contact with the outer edge 40y of the protruding seal portion 44 of the seal portion 40. In other words, in the horizontal direction, the position of the outer edge 22y of the flange portion 22 in the cutout portion 23 and the position of the outer edge 40y of the protruding seal portion 44 of the seal portion 40 at least partially coincide. Thereby, as will be described later, in a process of heat-sealing the lid 30 to the flange portion 22 using a hot plate, it is possible to alleviate accuracy required in aligning the hot plate with respect to the flange portion 22. This makes it possible to reduce the time and cost required for the heat-sealing process. As shown in FIG. 18, a portion of the cutout portion 23 of the flange portion 22 is also in contact with the outer edge 40y of the main seal portion 42 extending along the long side portion 22A.

In the example shown in FIG. 17, the lid 30 is configured so as to cover the cutout portion 23 of the flange portion 22. However, the present invention is not limited thereto, and although not shown, a cutout portion overlapping with the cutout portion 23 of the flange portion 22 may be formed in the outer edge 30y of the lid 30. In other words, the position of the cutout portion 23 of the flange portion 22 may coincide with the position of the outer edge 30y of a portion corresponding to the cutout portion 23 of the flange portion 22 of the lid 30. The lidded container 10 constituted as described above can be produced by, for example, joining the lid 30 to the flange portion 22 of the container 20 and then punching out the flange portion 22 and the lid 30 with a predetermined mold to form a cutout portion in the outer edge 22y of the flange portion 22 and the outer edge 30y of the lid 30.

The pressure generated in the storage portion 25 at the time of heating not only acts as force for peeling off the protruding seal portion 44 but also acts as stress for deforming the container 20. In the case where the cutout portion 23 is provided in the flange portion 22, stress generated in the flange portion 22 due to the pressure of the storage portion 25 tends to concentrate on the cutout portion 23. In this case, it is feared that the container 20 is likely to deform starting from the cutout portion 23.

On the other hand, in the above-described Patent Literature 1, the flange portion 22 and the side portion 213 of the container 20 are formed with protrusions protruding inward. It is considered that the protrusion acts to suppress the deformation of the container 20. On the other hand, when the protrusion is provided on the side portion 213 of the container 20, the volume of the opening 29 decreases by the amount of the protrusion. It is also conceivable that the protrusion hinders the use of the container 20. For example, when food is contained in the container 20, it is conceivable that the protrusion hinders eating operation.

In consideration of such a problem, as shown in FIG. 18, it is preferable that near the cutout portion 23, the side portion 213 of the container 20 does not have a protrusion as in Patent Literature 1. In other words, it is preferable that a portion (a first portion 214) of the side portion 213 of the container 20, which corresponds to the cutout portion 23, and portions (a pair of second portions 215) of the side portion 213 located on both sides with the first portion 214 provided in between constitute the same plane or the same curved surface (see FIG. 11). Since the side portion 213 has no protrusion, it is possible to secure a larger volume of the storage portion 25. In addition, usability of the container 20 can be improved.

On the other hand, in the present embodiment, since no protrusion or recess exists in the portion corresponding to the cutout portion 23 of the side portion 213, it is considered that the container 20 is likely to deform as compared with the case of Patent Literature 1. In consideration of such a problem, in the present embodiment, it is proposed to set a second distal end angle θ2 at a distal end portion of the cutout portion 23 shown in FIG. 18 to be relatively large. For example, it is proposed to make the second distal end angle θ2 larger than the above-described first distal end angle θ1 of the protruding seal portion 44.

First, the definition of the second distal end angle θ2 will be described. In FIG. 18, reference numerals P3 and P4 denote a first contact point and a second contact point where the cutout portion 23 of the flange portion 22 and the outer edge 40y of the main seal portion 42 of the seal portion 40 are in contact. Reference numeral P1 denotes a point (hereinafter, also referred to as a distal end point) of the cutout portion 23, which is located closest to the opening 29 (storage portion 25) side. The second distal end angle θ2 is defined as a corner formed by a straight line connecting the first contact point P3 and the distal end point P1 and a straight line connecting the second contact point P4 and the distal end point P1. To be noted, the first contact point P3 and the second contact point P4 are also points where the outer edge 40y of the main seal portion 42 and the outer edge 40y of the protruding seal portion 44 are connected.

When the second distal end angle θ2 at the distal end portion of the cutout portion 23 is larger than the first distal end angle θ1 of the protruding seal portion 44, it is possible to suppress concentration of stress on the cutout portion 23 at the time of heating. This makes it possible to prevent the container 20 from deforming starting from the cutout portion 23 at the time of heating. The second distal end angle θ2 is, for example, 65° or more and 160° or less. Preferably, the second distal end angle θ2 is larger by at least 5° or more than the first distal end angle θ1.

Preferably, the cutout portion 23 is curved with a predetermined radius of curvature at the distal end point P1. As a result, it is possible to suppress the concentration of stress on the distal end point P1 of the cutout portion 23 at the time of heating. The radius of curvature of the cutout portion 23 at the distal end point P1 is, for example, 2 mm or more and 30 mm or less.

In FIG. 18, reference numeral D1 denotes a shortest distance (hereinafter, also referred to as the first shortest distance) between the distal end point P1 of the cutout portion 23 of the flange portion 22 and the inner edge 22x of the flange portion 22. Reference numeral D2 denotes a shortest distance (hereinafter, also referred to as the second shortest distance) between the inner edge 40x of the main seal portion 42 of the seal portion 40 and the inner edge 22x of the flange portion 22 at a position where the main seal portion 42 and the protruding seal portion 44 are connected. The first shortest distance D1 corresponds to the shortest distance in a plan view from a contact suppression mechanism 19 such as the cutout portion 23 to the opening 29. Further, the second shortest distance D2 corresponds to the shortest distance in a plan view from the inner edge 40x of a connection portion (corresponding to the point P3 or the point P4) of the seal portion 40 where the main seal portion 42 and the protruding seal portion 44 are connected to the opening 29.

Preferably, the first shortest distance D1 between the cutout portion 23 and the inner edge 22x of the flange portion 22 is smaller than the second shortest distance D2 between the main seal portion 42 and the inner edge 22x of the flange portion 22. As a result, when peeling of the protruding seal portion 44 progresses to the connection point between the inner edge 40x of the main seal portion 42 and the inner edge 40x of the protruding seal portion at the time of heating, the steam in the storage portion 25 can be discharged to the outside. This makes it possible to reduce the pressure in the storage portion 25, so that further progression of peeling of the seal portion 40 can be suppressed. Thus, peeling of the main seal portion 42 at the time of heating can be suppressed. A difference between the second shortest distance D2 and the first shortest distance D1 is preferably 1 mm or more.

To be noted, the first shortest distance D1 and the second shortest distance D2 can also be defined in embodiments other than the second embodiment. Also, preferably, the relationship that the first shortest distance D1 is smaller than the second shortest distance D2 is established in embodiments other than the second embodiment.

To be noted, the fact that the first shortest distance D1 is smaller than the second shortest distance D2 means that the distal end portion P1 of the contact suppression mechanism 19, such as the cutout portion 23 or a stepped portion 24 or a cutout portion 39 to be described later, is located more inside (the opening 29 side) than a line 401 shown in FIG. 18. The line 401 is a line obtained by virtually extending the inner edge 40x of the main seal portion 42 to a region outside the protruding seal portion 44. When the inner edge 40x of the main seal portion 42 is not a straight line but a curved line, the virtually extended line 401 is also a curved line having the same curvature as the inner edge 40x.

Method of Manufacturing Lidded Container

Next, an example of a method of manufacturing the lidded container 10 will be described.

Figure 19:
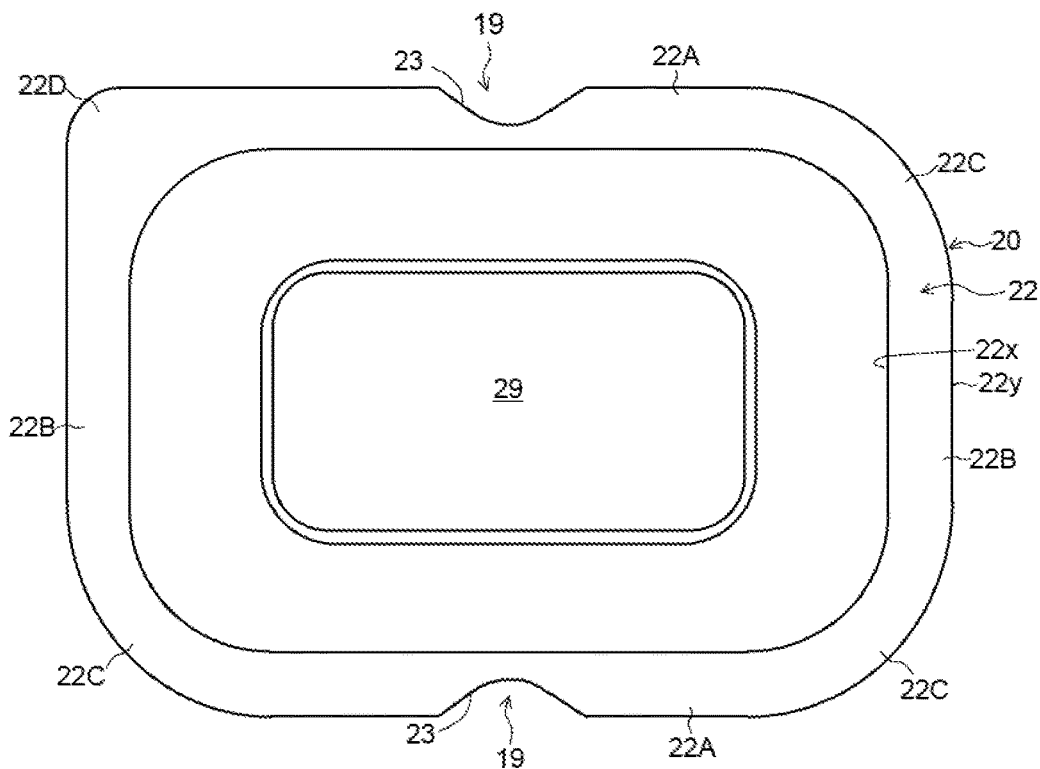
FIG. 19 is a plan view showing a process of producing a container in which a cutout portion is formed in a portion of an outer edge of the flange portion.

First, the container 20 having the body portion 21 and the flange portion 22 integrally formed is produced by an injection molding method using a thermoplastic resin such as polypropylene. Subsequently, a portion of the outer edge 22y of the flange portion 22 is cut out to form the cutout portion 23 in the flange portion 22. In this way, as shown in FIG. 19, it is possible to obtain the container 20 in which the cutout portion 23 is formed in a portion of the flange portion 22. To be noted, a mold used for injection molding may have a shape corresponding to the cutout portion 23. In this case, it is unnecessary to cut out a portion of the outer edge 22y of the flange portion 22.

Figure 20:
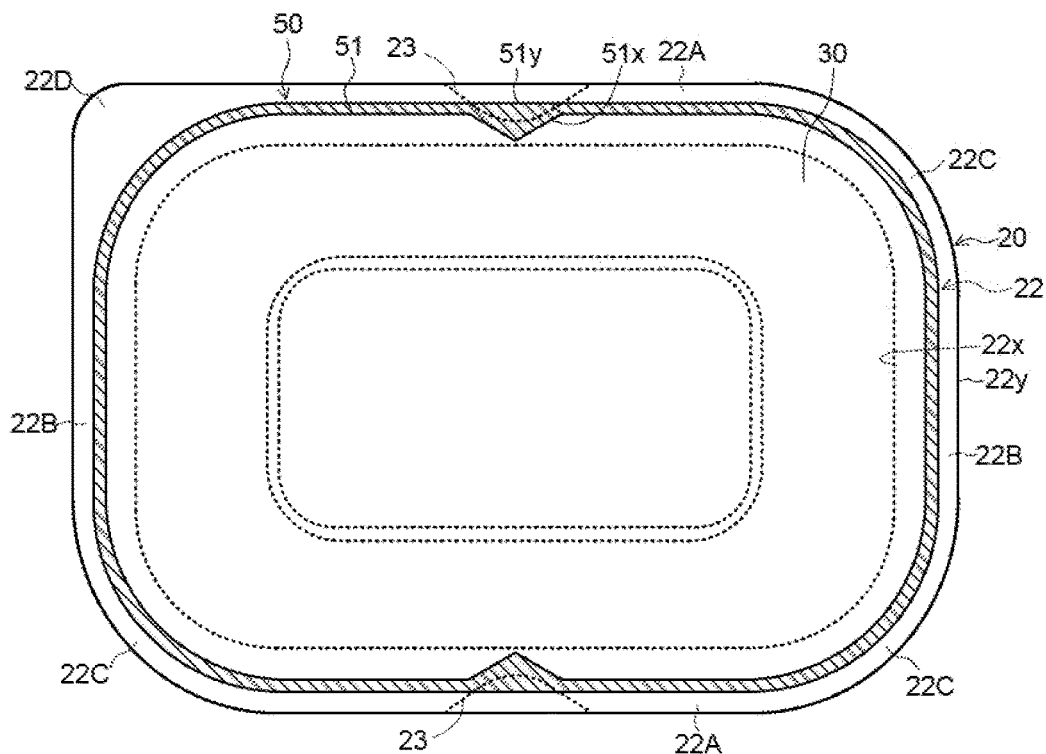
FIG. 20 is a plan view showing a process of heat-sealing the lid to the flange portion of the container.

Subsequently, contents are filled in the storage portion 25 of the container 20. In addition, the lid 30 is prepared. Thereafter, the lid 30 is placed on the upper surface of the flange portion 22 of the container 20. Then, a portion of the lid 30 where the seal portion 40 is to be formed is heated from an upper surface 31 side using a hot plate to melt the sealant layer 35 of the lid 30, and the lid 30 is heat sealed to the flange portion 22. FIG. 20 is a plan view showing an example of the process of heat-sealing the lid 30 to the flange portion 22. In FIG. 20, a heating portion 51 of the hot plate which is in contact with an upper surface of the lid 30 to heat the lid 30 is shown as a hatched region.

As can be seen from comparison between FIG. 12 and FIG. 20, an inner edge 51x of the heating portion 51 has the same contour as the inner edge 40x of the protruding seal portion 44 of the seal portion 40. A portion of an outer edge 51y of the heating portion 51, which corresponds to the main seal portion 42, also has the same contour as the outer edge 40y of the main seal portion 42. On the other hand, a portion of the outer edge 51y of the heating portion 51, which corresponds to the protruding seal portion 44, extends so as to overlap with the cutout portion 23 of the container 20. That is, the portion of the outer edge 51y of the heating portion 51, which corresponds to the protruding seal portion 44, does not have the same contour as the outer edge 40y of the protruding seal portion 44. For example, the portion of the outer edge 51y of the heating portion 51, which corresponds to the protruding seal portion 44, extends on the same straight line as the portion of the outer edge 51y of the heating portion 51, which corresponds to the main seal portion 42.

Thus, even when the position of the heating portion 51 of the hot plate with respect to the outer edge 22y of the flange portion 22 is displaced from a predetermined position in the heat-sealing process, there increases a possibility that a suitable protruding seal portion 44 can be obtained. This makes it possible to reduce the time and cost required for the heat-sealing process.

Since a portion of the outer edge 51y of the heating portion 51 extends so as to overlap with the cutout portion 23 of the container 20, the protruding seal portion 44 can be formed such that the outer edge 40y is in contact with the cutout portion 23. In other words, the position of the outer edge 40y of the protruding seal portion 44 coincides with the position of the cutout portion 23. Thereby, after the protruding seal portion 44 is peeled off, the steam passes through the gap between the lid 30 and the flange portion 22 and easily escapes to the outside through the outer edge 22y of the flange portion 22 in the cutout portion 23. That is, steam permeability of the lidded container 10 can be enhanced.

In the present embodiment, near the cutout portion 23, the side portion 213 of the container 20 has no protrusion and recess. Thereby, it is possible to secure a larger volume of the storage portion 25 and to improve the usability of the container 20. Further, in the present embodiment, since the second distal end angle θ2 at the distal end portion of the cutout portion 23 is larger than the first distal end angle θ1 of the protruding seal portion 44, it is possible to suppress concentration of stress on the cutout portion 23 at the time of heating. Thus, even when no protrusion and recess exists in the portion of the side portion 213 of the container 20, which corresponds to the cutout portion 23, deformation of the container 20 at the time of heating can be suppressed.

To be noted, various modifications can be made to the above embodiments. Hereinafter, modifications will be described with reference to the drawings as necessary. In the below description and the drawings used in the below description, a component that can be configured similarly to the above embodiment is indicated by the same reference number as that of the above embodiment, and overlapped description is omitted. When it is obvious that the operations and effects obtained in the above embodiments can also be obtained in the modifications, its description may be omitted.

Modification of Recess of Flange Portion

Figure 21:
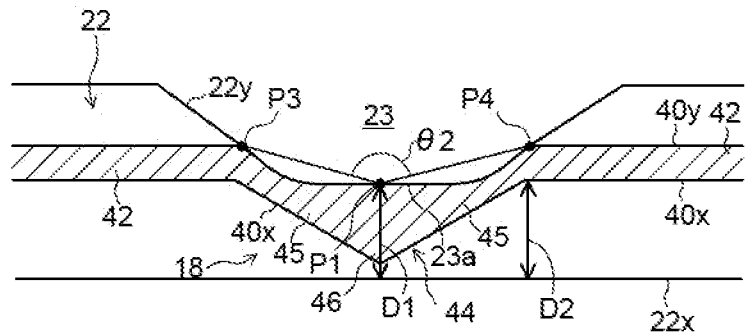
FIG. 21 is a plan view showing a modification of the cutout portion of the flange portion.

In the above embodiment, the cutout portion 23 of the flange portion 22 has a substantially triangular shape in a plan view. However, the present invention is not limited thereto, and as shown in FIG. 21, the cutout portion 23 may have a trapezoidal shape in a plan view. In this case, the contour of the cutout portion 23 may include a linear portion 23a extending parallel to the inner edge 22x of the flange portion 22. The linear portion 23a is a set of points at which a distance between the linear portion 23a and the inner edge 22x of the flange portion 22 is shortest. In this case, as shown in FIG. 21, the above-described distal end point P1 is defined as a midpoint of the linear portion 23a.

In the example shown in FIG. 21, preferably, the second distal end angle θ2 formed by the straight line connecting the first contact point P3 and the distal end point P1 and the straight line connecting the second contact point P4 and the distal end point P1 is larger than the first distal end angle θ1 of the protruding seal portion 44. As a result, it is possible to suppress the concentration of stress on the cutout portion 23 at the time of heating.

Modification of Container

Figure 22:
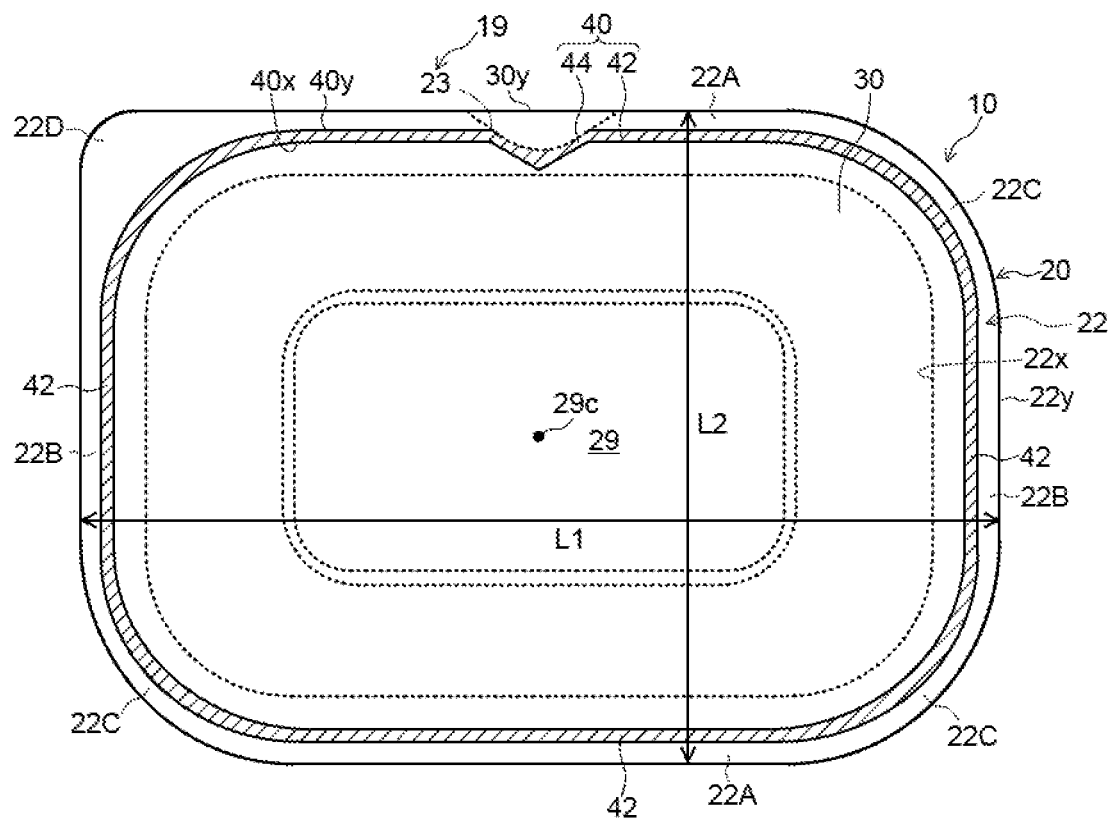
FIG. 22 is a plan view showing a modification of the lidded container.

In the above embodiment, each of the pair of long side portions 22A of the flange portion 22 has the cutout portion 23. However, the present invention is not limited thereto, and as shown in FIG. 22, only one of the pair of long side portions 22A of the flange portion 22 may have the cutout portion 23.

Modification of Container

Figure 23:
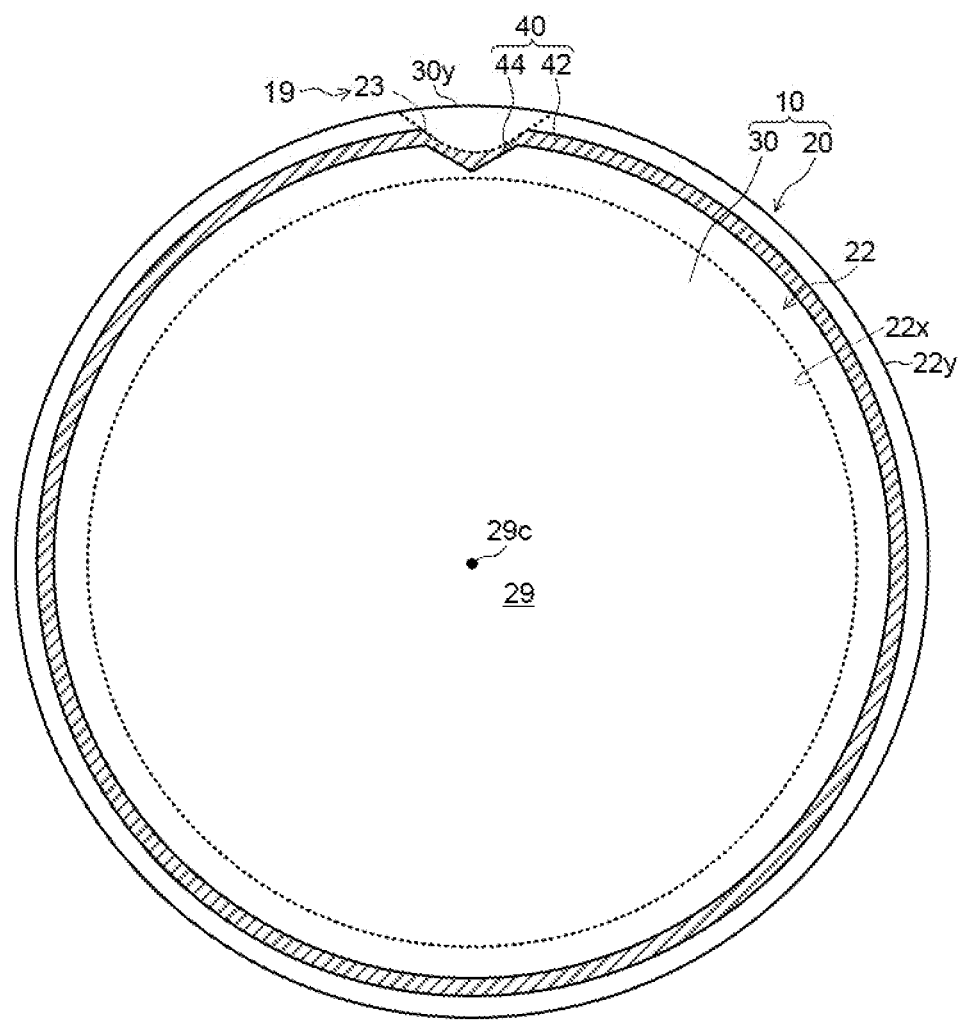
FIG. 23 is a plan view showing a modification of the lidded container.

In the above embodiment, the flange portion 22 of the container 20 has a substantially square (substantially rectangular) contour. However, the present invention is not limited thereto, and as shown in FIG. 23, the flange portion 22 may have a circular contour. In the present modification as well, the cutout portion 23 in contact with the outer edge 40y of the protruding seal portion 44 is formed in a portion of the outer edge 22y of the flange portion 22, which is located outside the protruding seal portion 44 of the seal portion 40. Consequently, it is possible to alleviate the accuracy required in aligning the hot plate with respect to the flange portion 22. In addition, the steam permeability of the lidded container 10 can be enhanced.

Figure 24:
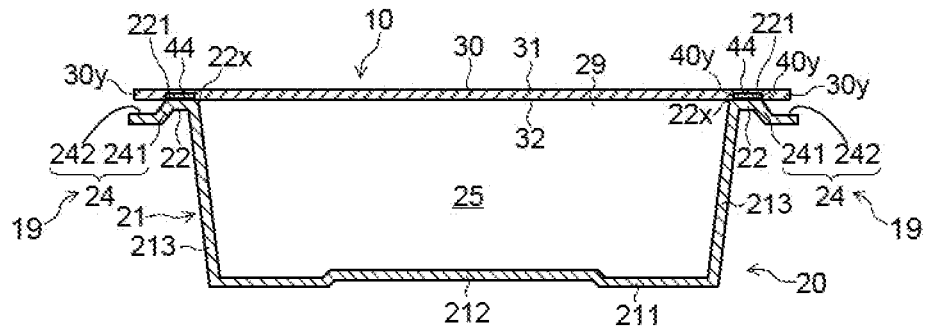
FIG. 24 is a cross-sectional view showing a modification of a contact suppression mechanism formed in the flange portion of the container.

In the above embodiment, the contact suppression mechanism 19 formed in the flange portion 22 includes the cutout portion 23 formed in the outer edge 22y of the flange portion 22. However, the present invention is not limited thereto. In the second embodiment as well, as in the case of the first modification or the third modification of the first embodiment, as shown in FIG. 24, the contact suppression mechanism 19 may include the stepped portion 24. The stepped portion 24 is continuously connected to an outer edge of the first plane 221 of the flange portion 22 and includes a flange wall portion 241 extending downward and a second plane 242 continuously connected to a lower portion of the flange wall portion 241 and extending horizontally.

As shown in FIG. 24, the stepped portion 24 of the flange portion 22 is at least partially in contact with the outer edge 40y of the protruding seal portion 44 of the seal portion 40. In other words, in the horizontal direction, a position where the stepped portion 24 is connected to the first plane 221 and the position of the outer edge 40y of the protruding seal portion 44 of the seal portion 40 at least partially coincide. Thereby, similarly to the case where the contact suppression mechanism 19 includes the cutout portion 23, in the process of heat-sealing the lid 30 to the flange portion 22 using a hot plate, it is possible to alleviate the accuracy required in aligning the hot plate with respect to the flange portion 22. This makes it possible to reduce the time and cost required for the heat-sealing process.

Modification of Protruding Seal Portion

Figure 25:
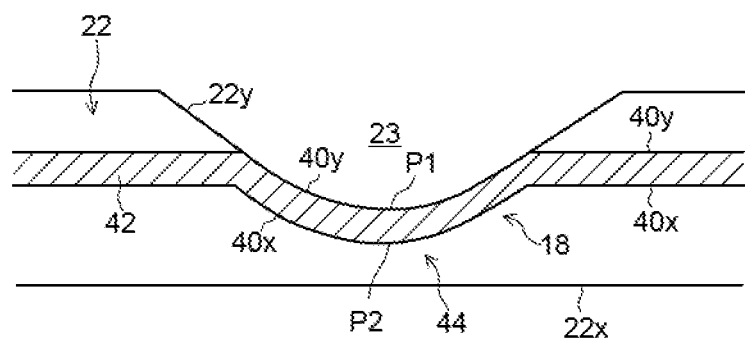
FIG. 25 is a plan view showing a modification of the protruding seal portion.
Figure 26:
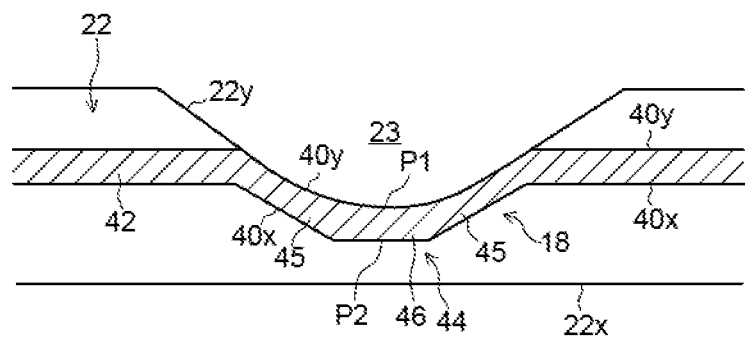
FIG. 26 is a plan view showing a modification of the protruding seal portion.

In the above embodiment, the protruding seal portion 44 includes the pair of first portions 45 extending inward from the main seal portion 42, and the pair of first portions 45 intersects at the distal end portion 46 located closest to the opening 29 side in the protruding seal portion 44. However, the present invention is not limited thereto, and as shown in FIG. 25, the protruding seal portion 44 may have a curved shape so as to protrude inward. As shown in FIG. 26, the protruding seal portion 44 may have the distal end portion 46 connected to an end of the pair of first portions 45 on the opening 29 side and extending parallel to the inner edge 22x of the flange portion 22. In this case, the distal end point P2 of the distal end portion 46 is defined as a midpoint of an inner edge of the distal end portion 46 extending parallel to the inner edge 22x.

To be noted, the modifications described hereinabove may also be made in an appropriate combination to the above embodiments.

Third Embodiment

Next, a third embodiment of the present invention will be described. The third embodiment also aims to solve the problem that a flange portion warps to make it difficult for steam to escape like the first embodiment described above.

Hereinafter, a lidded container 10 of the third embodiment will be described. In the third embodiment, the same parts as those of the first or second embodiment are denoted with the same reference numerals, and the detailed descriptions may be omitted. When it is obvious that the operations and effects obtained in the first or second embodiment can also be obtained in the third embodiment, its description may be omitted.

Lidded Container

Figure 27:
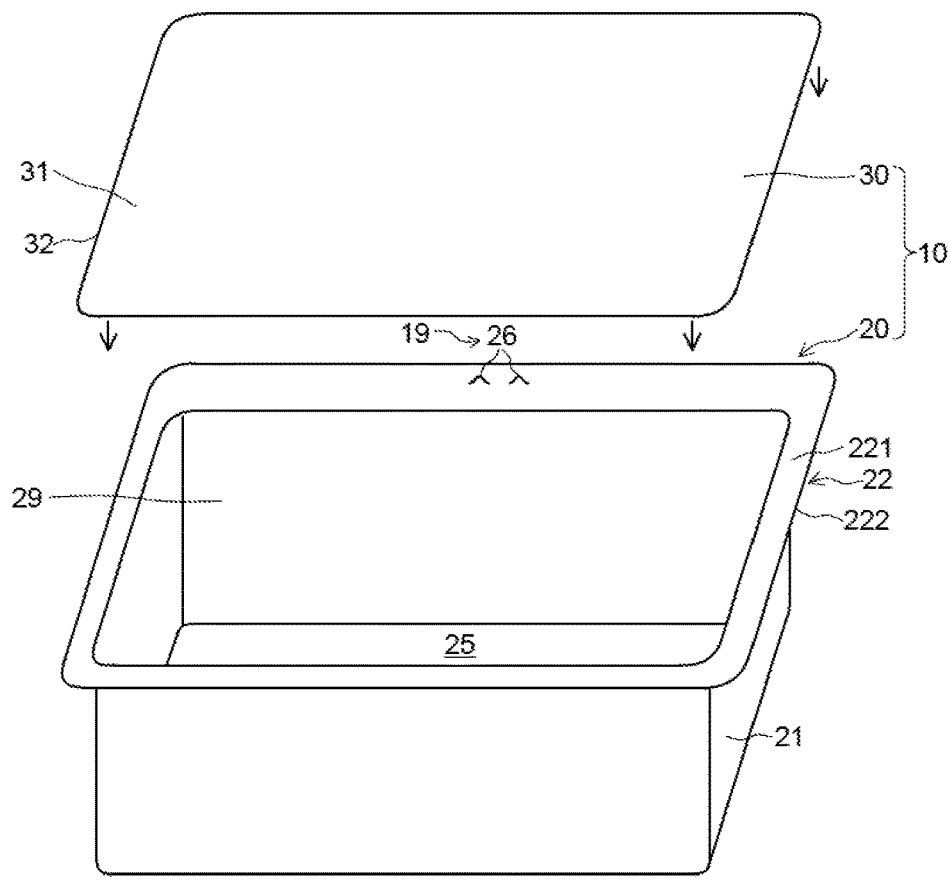
FIG. 27 is an exploded view of members constituting a lidded container of a third embodiment of the present invention.
Figure 28A:
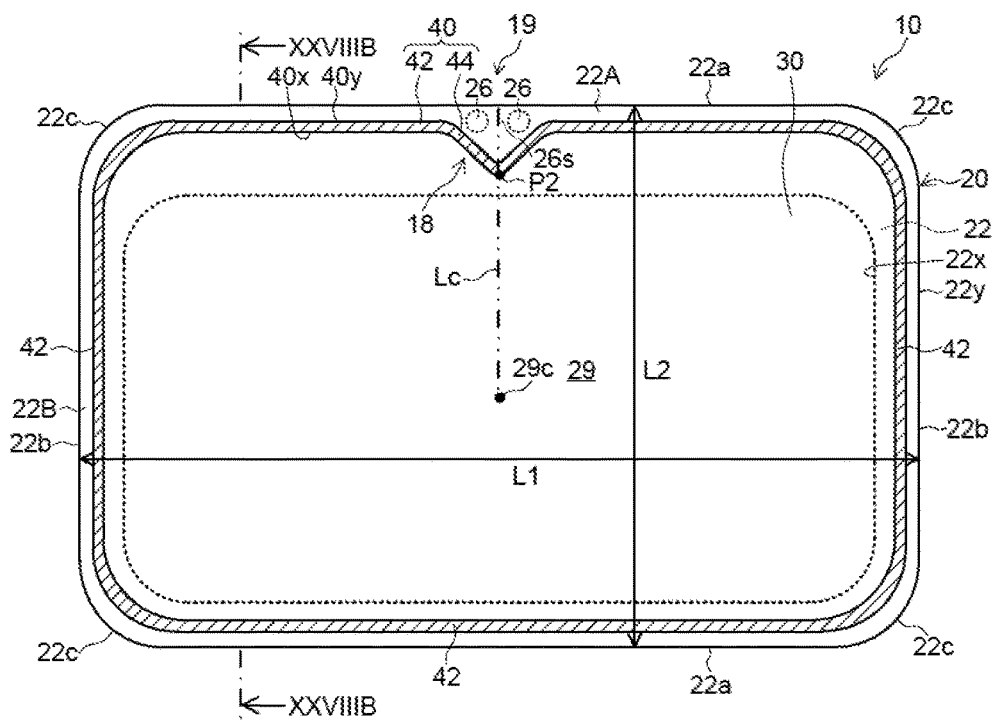
FIG. 28A is a plan view showing the lidded container of the third embodiment of the present invention.
Figure 28B:
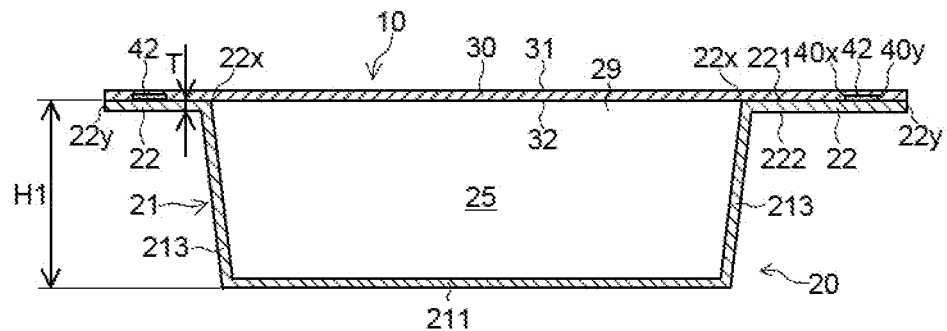
FIG. 28B is a cross-sectional view of the lidded container shown in FIG. 28A as viewed along line XXVIIIB-XXVIIIB.

First, with reference to FIGS. 27 to 28B, the outline of the lidded container 10 will be described. FIG. 27 is an exploded view of members constituting the lidded container 10, and FIG. 28A is a plan view of the lidded container 10. FIG. 28B is a cross-sectional view of the lidded container shown in FIG. 28A as viewed along line XXVIIIB-XXVIIIB. As with the first and second embodiments, the lidded container 10 includes a container 20 in which a storage portion 25 for storing contents is formed, a lid 30 for covering the storage portion 25 of the container 20, and a seal portion (joint portion) 40 for joining the lid 30 to the container 20.

Container

As with the first and second embodiments, the container 20 includes a body portion 21 which defines the storage portion 25, and a flange portion 22 which is continuously connected to an upper portion of the body portion 21 over one circumference. Although FIG. 28A shows an example in which a pair of long sides 22a is parallel to each other, a pair of short sides 22b is parallel to each other, and the long side 22a and the short side 22b are orthogonal to each other, the present invention is not limited to this example. For example, the pair of long sides 22a may be nonparallel to each other, and the pair of short sides 22b may be nonparallel to each other. An angle formed between the long side 22a and the short side 22b may deviate from 90 degrees.

Although FIG. 28A shows an example in which an inner edge 22x and an outer edge 22y of the flange portion 22 each linearly extend from one corner 22c to the other corner 22c, the present invention is not limited to this example. Although not shown, a depression, a protrusion, or the like may be partially formed in the inner edge 22x and the outer edge 22y of the flange portion 22 in a plan view.

Lid

The lid 30 is disposed on the first plane 221 of an upper surface of the flange portion 22 so as to cover the opening 29 of the storage portion 25 of the container 20 and joined to the first plane 221 of the flange portion 22 by the seal portion 40. In the present embodiment, the contour of the lid 30 is the same as the contour of the flange portion 22, and the lid 30 is formed in a substantially rectangular shape. The lower surface 32 of the lid 30 is configured to be capable of being joined to the first plane 221 of the flange portion 22.

The melting point of the material constituting a sealant layer 35 is preferably 120° C. or more, more preferably 130° C. or more. When the lid 30 further includes a heat softenable resin layer 37 to be described later, the melting point of the material constituting the sealant layer 35 is preferably higher than the softening temperature of the resin constituting the heat softenable resin layer 37. To be noted, the melting point of the material constituting the sealant layer 35 is lower than the melting point of the resin constituting the base material 34.

Seal Portion

The seal portion 40 joins the first plane 221 of the flange portion 22 and the lower surface 32 of the lid 30 to seal the storage portion 25 of the container 20 from the outside. As shown in FIG. 28A, the seal portion 40 is formed continuously over one circumference between the first plane 221 of the flange portion 22 and the lower surface 32 of the lid 30 so as to surround the storage portion 25 in a plan view. The seal portion 40 may be formed by at least partially melting at least one of the container 20 and the lid 30. Otherwise, the seal portion 40 may be formed of a separate constituent element from the container 20 and the lid 30, such as an adhesive. By forming the seal portion 40 between the lid 30 and the flange portion 22, the storage portion 25 of the container 20 can be sealed from the outside. Although FIG. 28B shows an example in which the seal portion 40 is formed on the lid 30 side, the present invention is not limited to this example. For example, the seal portion 40 may straddle both the lid 30 and the flange portion 22 and may be formed on the flange portion 22 side.

As shown in FIG. 28A, the seal portion 40 has a main seal portion (main line) 42 extending along the inner edge 22$x$ or the outer edge 22$y$ of the flange portion 22, and a protruding seal portion (protruding line) 44 disposed at the long side portion 22A of the flange portion 22 and protruding inward from the main seal portion 42. To be noted, the long side portion is a portion extending along the long side 22$a$ of the flange portion 22. Further, a portion of the flange portion 22 extending along the short side 22$b$ is also referred to as a short side portion 22B.

Figure 29:
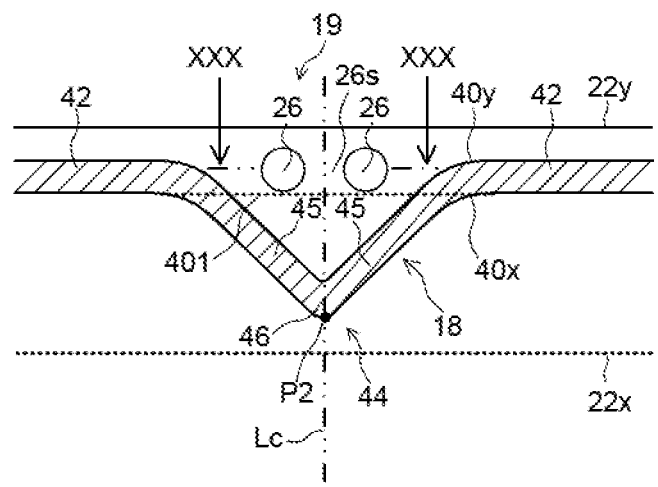
FIG. 29 is an enlarged plan view of a protruding seal portion shown in FIG. 28A.

FIG. 29 is an enlarged view of the protruding seal portion 44 of the seal portion 40 of the lidded container 10 shown in FIG. 28A. As shown in FIG. 29, the protruding seal portion 44 of the seal portion 40 includes a pair of first portions 45 extending inward from the main seal portion 42, and a distal end portion (second portion) 46 connecting the pair of first portions 45. Thus, the protruding seal portion 44 has a substantially triangular shape protruding inward. In this case, when the pressure in the storage portion 25 of the container 20 increases with heating, a substantially triangular distal end portion of the protruding seal portion 44, which protrudes inward, that is, the distal end portion 46 is peeled off, and at the position of the distal end portion, the lid 30 is peeled off from the first plane 221 of the flange portion 22.

To be noted, a specific shape of the protruding seal portion 44 is not limited as long as the protruding seal portion 44 can be peeled off from the flange portion 22 earlier than the main seal portion 42 when the contents are heated. For example, although not shown, the protruding seal portion 44 may further include a portion other than the first portion 45 and the distal end portion.

Steam Escape Mechanism

When the protruding seal portion 44 is peeled off from the flange portion 22, a steam hole is formed between the lid 30 and the flange portion 22, and the steam in the storage portion 25 escapes to the outside through the steam hole. Thus, in the present embodiment, the protruding seal portion 44 constitutes a steam escape mechanism 18 for discharging the steam generated in the storage portion 25 to the outside of the storage portion 25.

The steam escape mechanism 18 is preferably provided such that a distance from the center point 29$c$ of the opening 29 is the shortest distance. For example, when the contour of the flange portion 22 is substantially rectangular, the protruding seal portion 44 of the flange portion 22 is preferably located in the middle of the long side portion 22A of the flange portion 22 in a direction in which the long side 22$a$ extends. As a result, a distance between the center point 29$c$ of the opening 29 and the inner edge 40$x$ of the protruding seal portion 44 can be made the shortest, so that it is possible to further enhance force acting on the protruding seal portion 44 due to pressure generated when the contents are heated.

When the contents are heated by a microwave oven or the like, the temperature of the container 20 increases together with the temperature of the contents, so that the container 20 may deform and the flange portion 22 may warp upward or may be bent. Alternatively, if the rigidity of the container 20 is low, when the lid 30 is joined to the container 20, the container 20 may deform, and the flange portion 22 may warp upward or may be bent. When such deformation occurs, the steam hole formed between the lid 30 and the flange portion 22 is likely to be blocked. In consideration of such a problem, in the present embodiment, it is proposed to form a protrusion 26 on the first plane 221 of the flange portion 22. In the present embodiment, the protrusion 26 functions as a contact suppression mechanism 19 which prevents the upper surface of the flange portion 22 and the lower surface of the lid 30 from closely contacting each other when the contents are heated.

Protrusion

Figure 30:
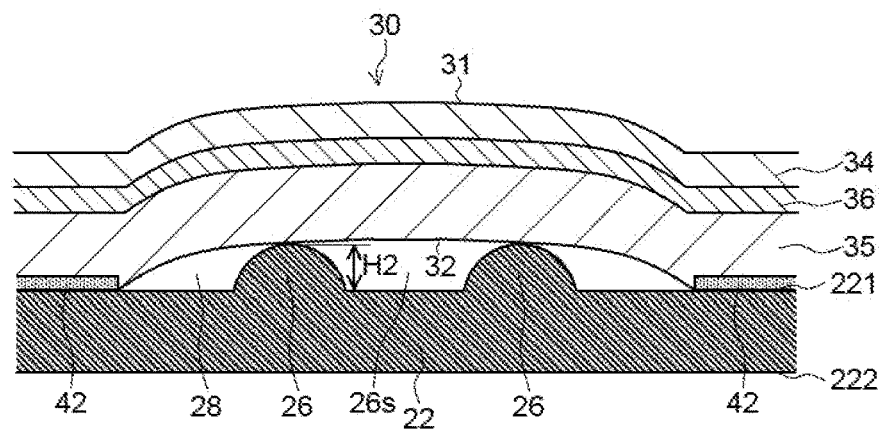
FIG. 30 is a cross-sectional view of the lidded container shown in FIG. 29 as viewed along line XXX-XXX.

Hereinafter, the protrusion 26 will be described with reference to FIGS. 29 and 30. FIG. 30 is a cross-sectional view of the lidded container shown in FIG. 29 as viewed along line XXX-XXX passing through the protrusion 26. The XXX-XXX line is parallel to a direction in which a side (long side 22$a$ in this case) of the flange portion 22 where the protrusion 26 is formed extends.

As shown in FIG. 30, the protrusion 26 is a portion protruding upward from the first plane 221 of the flange portion 22. As shown in FIGS. 29 and 30, the protrusion 26 is formed on a portion of the first plane 221 of the flange portion 22, which is outside the protruding seal portion 44 and overlaps with the lid 30. Specifically, as viewed along a direction orthogonal to a direction in which a side (long side 22$a$ in this case) of the flange in which the protruding seal portion 44 is formed extends, the protrusion 26 is disposed such that the protrusion 26 and the protruding seal portion 44 overlap with each other. That is, the apex of the protrusion 26 and the lower surface 32 of the lid 30 are in contact with each other. Thus, as shown in FIG. 30, a gap 28 can be formed between the lower surface 32 of the lid 30 and the first plane 221 of the flange portion 22 around the protrusion 26.

As shown in FIG. 29, the protrusion 26 is formed on a portion of the first plane 221 of the flange portion 22, which is close to the outer edge 22y of the flange portion 22. The term "close to the outer edge" means that in a direction orthogonal to a direction in which a side of the flange portion 22 formed with the protrusion 26 extends, a distance from the protrusion 26 to the outer edge 22y is smaller than a distance from the protrusion 26 to the inner edge 22x.

The protrusion 26 is preferably configured such that the gap 28 can be formed between the lid 30 and the flange portion 22 at a position of a line (a dotted line denoted by reference numeral 401 in FIG. 29) obtained by virtually extending the inner edge 40x of the main seal portion 42 to a region outside the protruding seal portion 44. As a result, when peeling of the protruding seal portion 44 progresses to a connection point between the inner edge 40x of the main seal portion 42 and the inner edge 40x of the protruding seal portion at the time of heating, the steam in the storage portion 25 can be discharged to the outside. This makes it possible to reduce the pressure in the storage portion 25, so that further progression of peeling of the seal portion 40 can be suppressed. Thus, peeling of the main seal portion 42 at the time of heating can be suppressed. When the inner edge 40x of the main seal portion 42 is not a straight line but a curved line, the virtually extended line 401 is also a curved line having the same curvature as the inner edge 40x.

In FIG. 30, reference numeral H2 denotes the height of the protrusion 26. The height H2 is a distance in a normal direction of the flange portion 22 from the first plane 221 of the flange portion 22 to the distal end point of the protrusion 26. The position of the first plane 221 of the flange portion 22 is defined as the position of a surface of the flange portion 22, which is joined to the lower surface 32 of the lid 30 by the seal portion 40. The distal end point of the protrusion 26 is defined as a point of the protrusion 26, which is farthest from the first plane 221 of the flange portion 22 in the normal direction of the flange portion 22. The height H2 is, for example, 0.5 mm or more and 5.0 mm or less.

Figure 31:
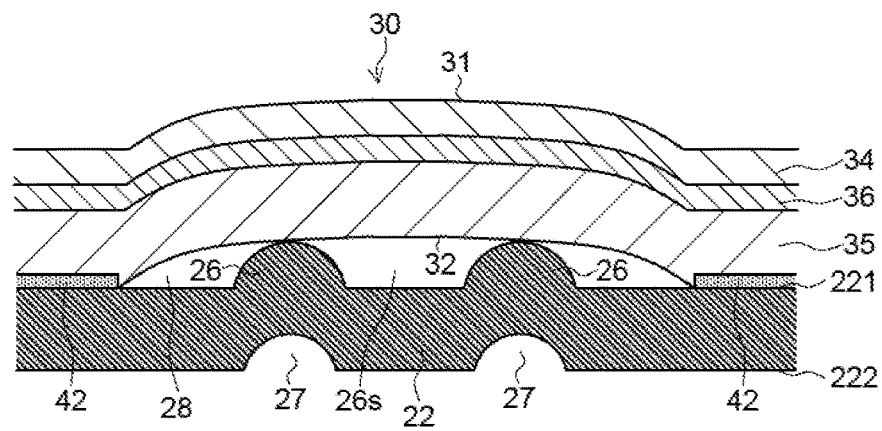
FIG. 31 is a cross-sectional view showing a modification of the flange portion.

FIG. 31 is a cross-sectional view showing a modification of the flange portion. As shown in FIG. 31, a recess 27 may be formed in a portion of a lower surface 222 of the flange portion 22, which corresponds to the protrusion 26. When the protrusion 26 is formed on the first plane 221 of the flange portion 22 by embossing processing, the recess 27 shown in FIG. 31 is formed in the lower surface 222 of the flange portion 22. On the other hand, when the protrusion 26 of the flange portion 22 is formed by an injection molding method, as shown in FIG. 30, the protrusion 26 can be obtained without forming the recess 27 in the lower surface 222 of the flange portion 22.

Preferably, as shown in FIGS. 29 and 30, when the protrusion 26 is viewed along the direction in which the side of the flange portion 22 formed with the protrusion 26 extends, the protrusion 26 is disposed such that the protrusion 26 and the main seal portion 42 at least partially overlap with each other. Thereby, it is possible to prevent the lid 30 from turning up due to the influence of the protrusion 26 at a position away from the protruding seal portion 44.

As shown in FIGS. 28A, 29, and 30, the flange portion 22 may include the two protrusions 26 described above arranged with a gap 26s therebetween. In this case, preferably, the two protrusions 26 are arranged so as to draw a straight line passing through the center point 29c of the opening 29 (storage portion 25) and the gap 26s in a plan view and reaching the outer edge 22y of the flange portion 22 without intersecting with the two protrusions 26. A straight line Lc of FIGS. 28A and 29 is an example of the straight line thus drawn. As a result, the steam in the storage portion 25 is effectively allowed to escape to the outside through the gap 26s between the two protrusions 26. In this case, since the close contact between the flange portion 22 and the lid 30 is suppressed also in the gap 26s, it can be considered that the gap 26s is a constituent element of the contact suppression mechanism 19.

The straight line Lc of FIGS. 28A and 29 will be described. The straight line Lc is a straight line passing through the center point 29c of the opening 29 (storage portion 25) and the distal end point 44c of the protruding seal portion 44. Preferably, the two protrusions 26 are arranged such that the straight line Lc thus drawn passes through the gap 26s and reaches the outer edge 22y of the flange portion 22 without intersecting with the two protrusions 26.

Figure 32:
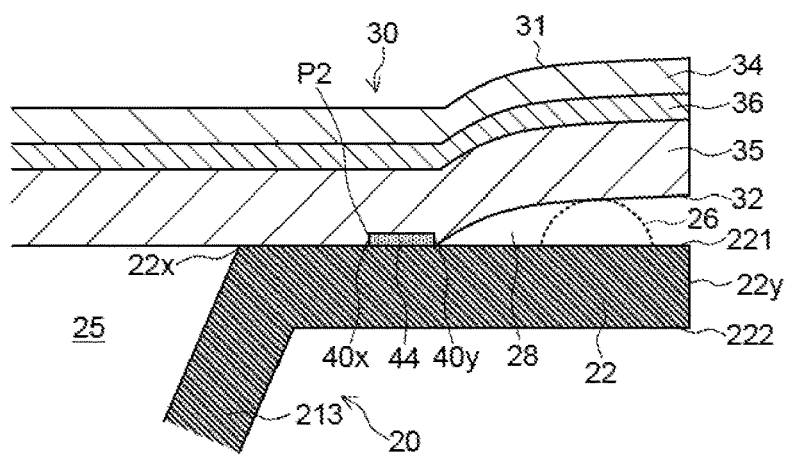
FIG. 32 is a cross-sectional view of the lidded container shown in FIG. 29 as viewed along a straight line Lc.
Figure 33A:
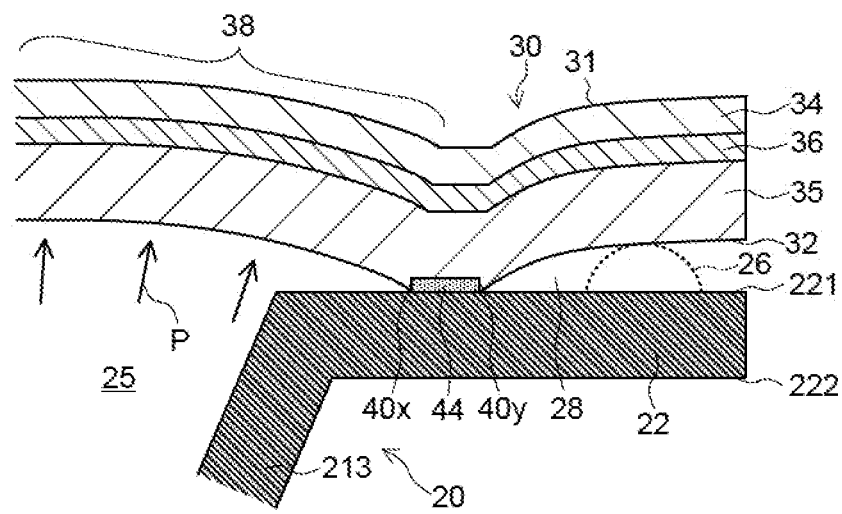
FIG. 33A is a view showing a state in which the lid bulges.
Figure 33B:
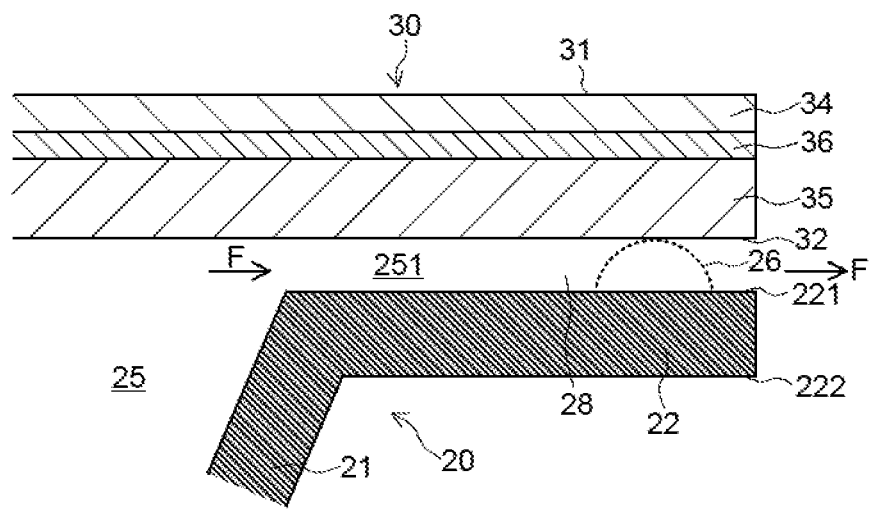
FIG. 33B is a view showing a state in which the lid peels off from the flange portion and steam escapes to the outside.

FIG. 32 is a cross-sectional view of the lidded container 10 shown in FIG. 29 as viewed along the line Lc. In FIG. 32 and FIGS. 33A and 33B to be described later, for the sake of reference, the protrusion 26 existing on the depth side of the drawing sheet is indicated by a dotted line. According to the present embodiment, by forming the two protrusions 26 on the first plane 221 of the flange portion 22, as shown in FIG. 32, around the outer edge 40y of the protruding seal portion 44 located on the opposite side of the distal end point 44c, the gap 28 communicating with the outside of the lidded container 10 can be formed between the lower surface 32 of the lid 30 and the first plane 221 of the flange portion 22.

Although not shown, three or more protrusions 26 may be formed on the first plane 221 of the flange portion 22.

Although FIG. 30 shows the example in which the cross-sectional shape of the protrusion 26 is semicircular, the cross-sectional shape of the protrusion 26 is not particularly limited as long as the gap 28 can be formed between the lower surface 32 of the lid 30 and the first plane 221 of the flange portion 22.

Method of Manufacturing Lidded Container

Next, an example of a method of manufacturing the lidded container 10 will be described.

First, the container 20 having the body portion 21, the flange portion 22, and the protrusion 26 integrally formed is produced by an injection molding method using a thermoplastic resin such as polypropylene. In addition, the lid 30 having a contour corresponding to the flange portion 22 of the container 20 is prepared. Then, contents are filled in the storage portion 25 of the container 20. Thereafter, the lid 30 is placed on the upper surface of the flange portion 22 of the container 20. Then, a portion of the lid 30 where the seal portion 40 is to be formed is heated from an upper surface 31 side using a hot plate or the like to melt the sealant layer 35 of the lid 30. Thereby, it is possible to form the seal portion 40 which fixes the lower surface 32 of the lid 30 to the first plane 221 of the flange portion 22 of the container 20. In this way, it is possible to obtain the lidded container 10 including the container 20 and the lid 30 joined to the first plane 221 of the flange portion 22 of the container 20 through the seal portion 40.

Method of Heating Contents

Next, an example of a method of heating the contents stored in the storage portion 25 of the container 20 of the lidded container 10 will be described with reference to FIGS. 33A and 33B. FIGS. 33A and 33B are both cross-sectional views of the lidded container 10 when the contents are being heated as viewed along the straight line Lc shown in FIG. 28A.

First, the lidded container 10 with a bottom portion 211 of the container 20 facing downward is placed inside a microwave oven. Then, the contents are heated using the microwave oven. As a result, the temperature of the contents rises, and accordingly moisture contained in the contents evaporates to increase the pressure in the storage portion 25. Thus, as shown in FIG. 33A, a portion of the lower surface 32 of the lid 30, which is in contact with the storage portion 25, is pushed by pressure P of the steam, and a bulging portion 38 bulging upward is formed in the lid 30.

When the pressure in the storage portion 25 further increases with heating, the bulging portion 38 of the lid 30 further extends and reaches the protruding seal portion 44 of the seal portion 40 as shown in FIG. 33A. When the force with which the lid 30 is pulled upward becomes larger than the joining force of the protruding seal portion 44 at a place where the protruding seal portion 44 is formed, the lid 30 is peeled off from the flange portion 22.

When the lid 30 is peeled off from the flange portion 22, a steam hole 251 is formed between the lower surface 32 of the lid 30 and the first plane 221 of the flange portion 22 as shown in FIG. 33B. Here, according to the present embodiment, the protrusion 26 is formed on the first plane 221 of the flange portion 22 outside the protruding seal portion 44. Thus, even when the flange portion 22 deforms upward, it is possible to secure the gap 28 between the lower surface 32 of the lid 30 and the first plane 221 of the flange portion 22, whereby the steam hole 251 can be prevented from being blocked. Thus, the steam in the storage portion 25 can be caused to stably escape to the outside through the steam hole 251. This makes it possible to lower the pressure in the storage portion 25. This makes it possible to heat the contents using a microwave oven while suppressing rupture or the like of the lid 30.

First Modification

Next, a first modification of the present embodiment will be described with reference to FIGS. 34 to 35E. In the first modification, the container 20 of the lidded container 10 is produced by a sheet forming method. In the first modification, the same parts as those of the above embodiments are denoted with the same reference numerals, and the detailed descriptions are omitted. When it is obvious that the operations and effects obtained in the above embodiments can also be obtained in the present modification, its description may be omitted.

Figure 34:
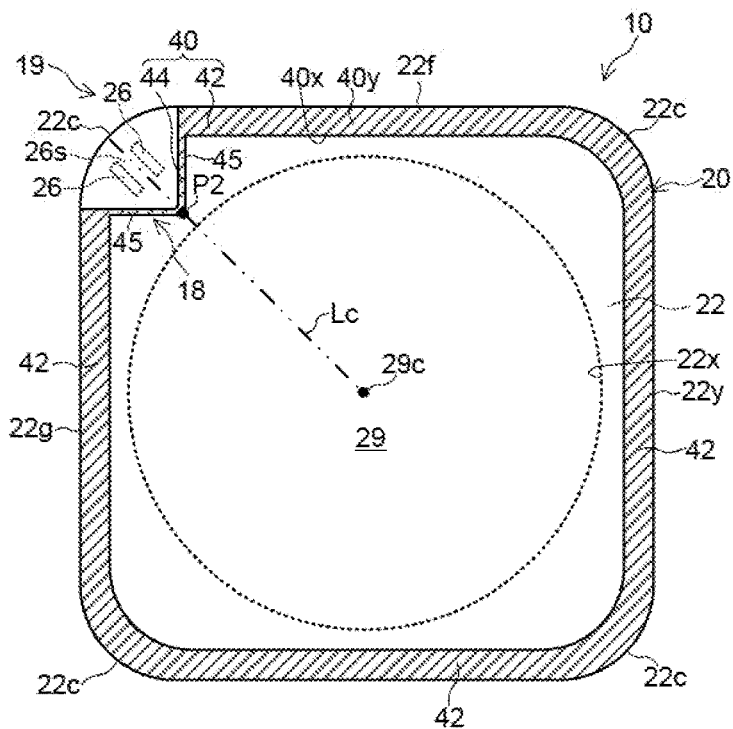
FIG. 34 is a plan view showing a lidded container according to a first modification of the third embodiment.

FIG. 34 is a plan view showing the lidded container 10 according to a first modification. In the first modification, the flange portion 22 of the container 20 has a substantially square contour including four sides of equal length. In the present embodiment, the protruding seal portion 44 of the seal portion 40 is formed at the corner 22c of the flange portion 22. For example, the protruding seal portion 44 includes one first portion 45 which is connected to the main seal portion 42 extending along a first side 22f of the flange portion 22, and the other first portion 45 which is connected to the main seal portion 42 extending along a second side 22g connected to the first side 22f of the flange portion 22. An angle formed by one first portion 45 and the other first portion 45 is, for example, 90°.

In the present embodiment as well, preferably, the two protrusions 26 are formed on the first plane 221 of the flange portion 22. In the present embodiment as well, preferably, the two protrusions 26 are arranged so as to draw a straight line passing through the center point 29c of the opening 29 (storage portion 25) and the gap 26s in a plan view and reaching the outer edge 22y of the flange portion 22 without intersecting with the two protrusions 26. For example, the two protrusions 26 are arranged such that the straight line Lc passing through the center point 29c of the opening 29 (storage portion 25) and the distal end point P2 of the protruding seal portion 44 passes through the gap 26s and reaches the outer edge 22y of the flange portion 22 without intersecting with the two protrusions 26.

Method of Manufacturing Lidded Container

Next, an example of a method of manufacturing the lidded container 10 will be described. Here, a method of simultaneously manufacturing a plurality of the lidded containers 10 by allocating a plurality of the containers 20 on one sheet 15 will be described. To be noted, each process described below may be performed on the sheet 15 conveyed in a predetermined direction.

Figure 35A:
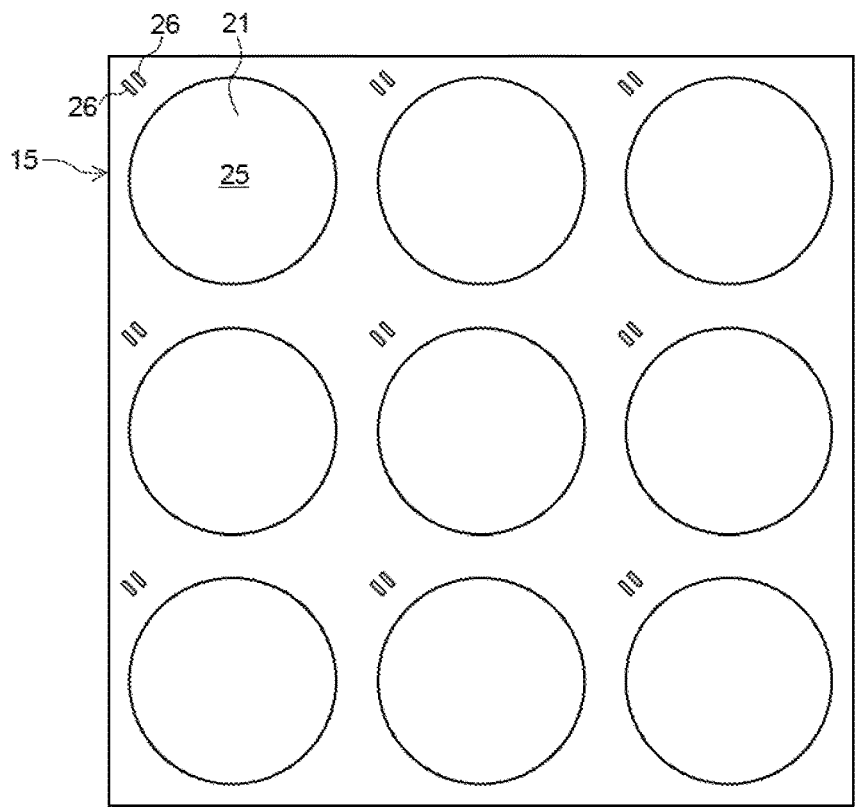
FIG. 35A is a view showing a process of forming a body portion and a protrusion on a sheet.

First, the sheet 15 made of plastic is prepared. Next, as shown in FIG. 35A, a plurality of the body portions 21 defining the storage portion 25 are formed on the sheet 15 by the sheet forming method. In addition, the protrusion 26 is formed on the sheet 15 by embossing processing. The body portion 21 protrudes toward a lower surface side of the sheet 15. The protrusion 26 protrudes toward an upper surface side of the sheet 15.

Figure 35B:
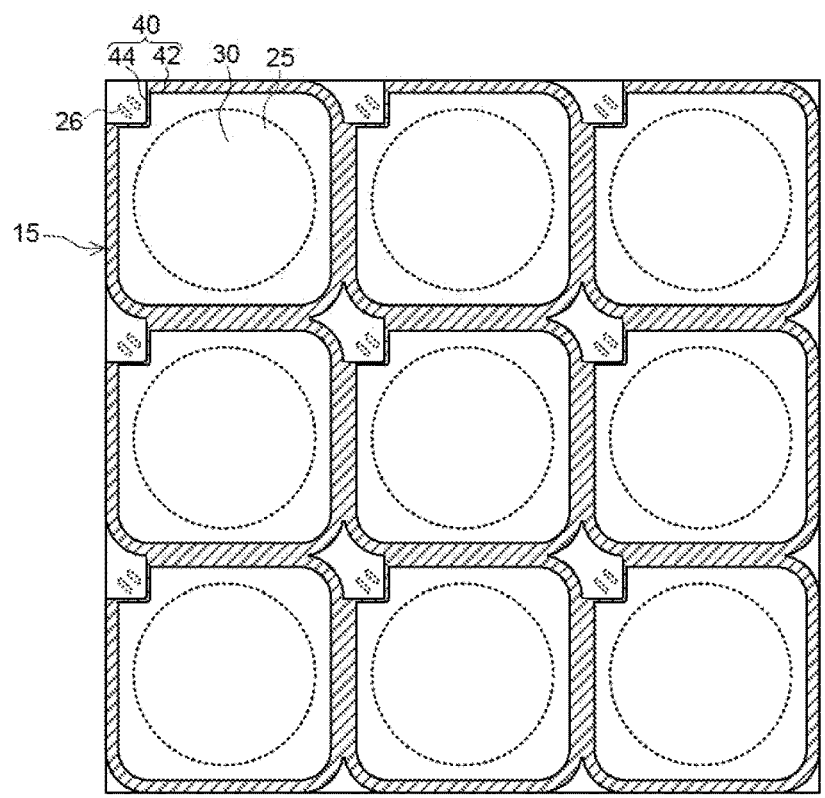
FIG. 35B is a view showing a process of joining the lid to the sheet.

Then, contents are filled in each of the storage portions 25. Thereafter, the lid 30 is placed on the upper surface of the sheet 15. Then, the lid 30 is heated from the upper surface 31 side to form the seal portion 40 including the main seal portion 42 and the protruding seal portion 44, as shown in FIG. 35B.

Figure 35C:
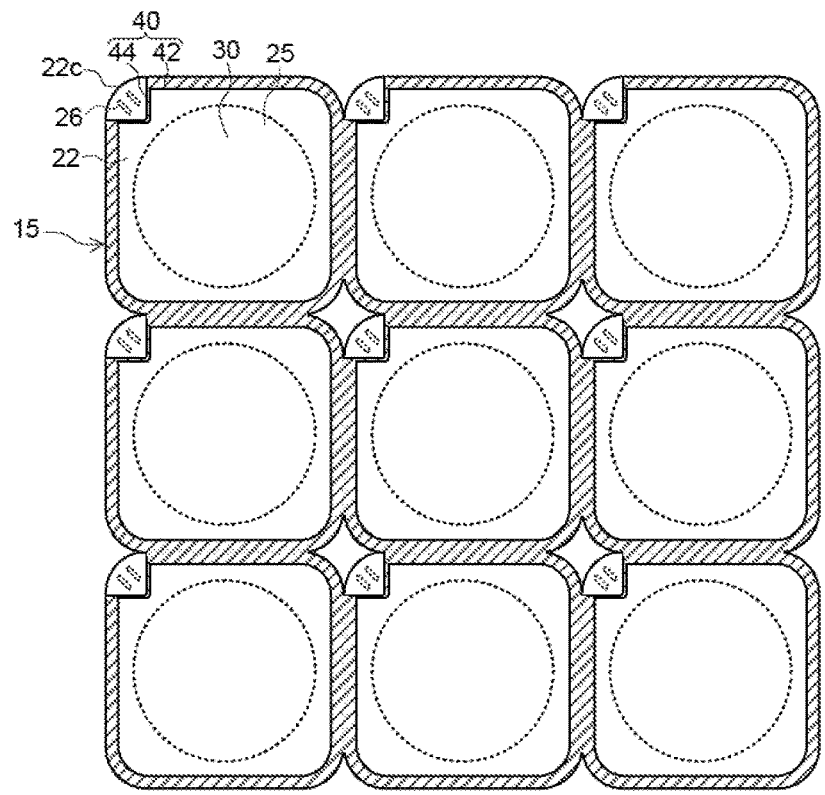
FIG. 35C is a view showing a process of punching the sheet to form a corner portion.

Thereafter, a laminate of the sheet 15 and the lid 30 is punched by a mold having a shape corresponding to the corner 22c of the flange portion 22. As a result, as shown in FIG. 35C, the chamfered corner 22c can be obtained. In the case of forming the flange portion 22 having an angular corner portion, it is not necessary to perform such a punching process.

Figure 35D:
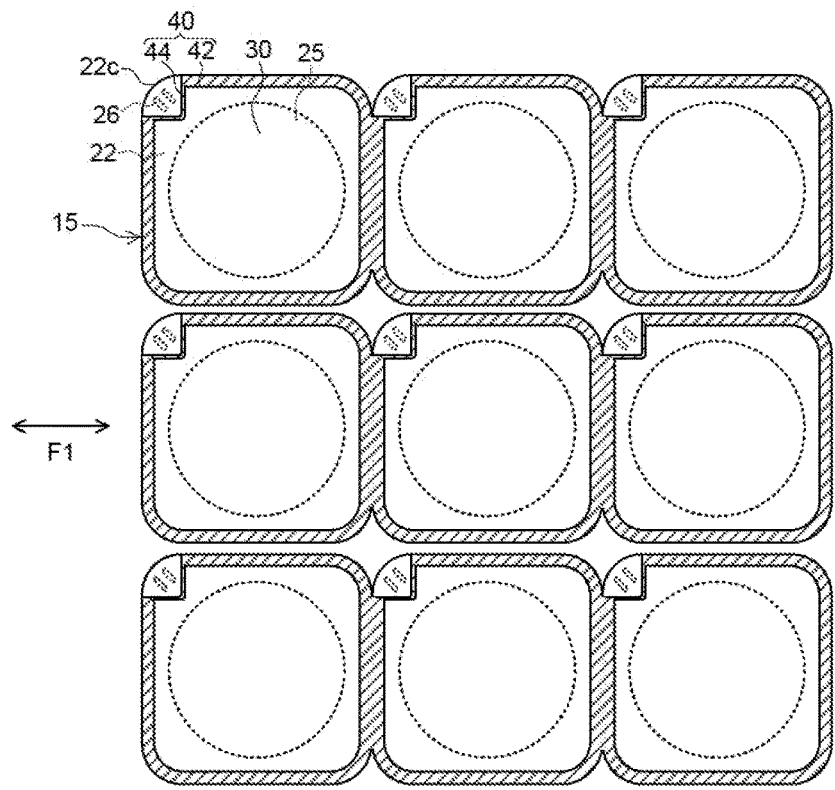
FIG. 35D is a view showing a process of cutting the sheet along a conveying direction.
Figure 35E:
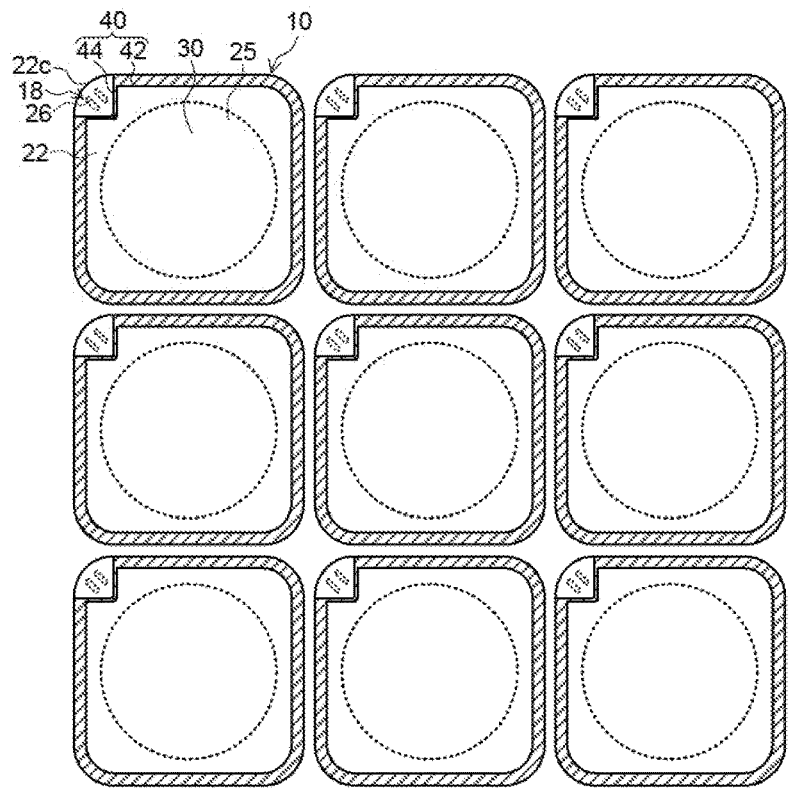
FIG. 35E is a view showing a process of cutting the sheet along a direction orthogonal to the conveying direction.

Then, the laminate of the sheet 15 and the lid 30 is separated for each section surrounded by the seal portion 40. For example, first, as shown in FIG. 35D, the laminate of the sheet 15 and the lid 30 is cut along a conveying direction F1 of the sheet 15. Then, as shown in FIG. 35E, the laminate of the sheet 15 and the lid 30 is cut in a direction orthogonal to the conveying direction F1 of the sheet 15. In this way, the plurality of lidded containers 10 can be manufactured simultaneously.

In the present modification as well, when the protrusion 26 is formed on the first plane 221 of the flange portion 22 on the outside of the protruding seal portion 44 constituting the steam escape mechanism 18, the gap 28 can be secured between the lower surface 32 of the lid 30 and the first plane 221 of the flange portion 22, whereby the steam hole 251 can be prevented from being blocked. Thus, the steam in the storage portion 25 can be caused to stably escape to the outside through the steam hole 251.

In the present modification, in the lidded container 10 provided with the container 20 produced by the sheet forming method, although the protruding seal portion 44 and the protrusion 26 are arranged at the corner 22c of the container 20, the present invention is not limited to this example. Also in the lidded container 10 provided with the container 20 produced by the sheet forming method, as in the case of the above embodiment, the protruding seal portion 44 and the protrusion 26 may be arranged in the middle of a side of the flange portion 22 in a direction in which the side extends. On the contrary, also in the lidded container 10 provided with the container 20 produced by the injection molding method, the protruding seal portion 44 and the protrusion 26 may be arranged at the corner 22*c* of the container 20.

The rigidity of the flange portion 22 at the corner 22*c* of the flange portion 22 is generally higher than the rigidity of a middle portion of a side of the flange portion 22 in the direction in which the side extends. The thickness of the flange portion 22 of the container 20 produced by the sheet forming method is generally smaller than the thickness of the flange portion 22 of the container 20 produced by the injection molding method. Taking these points into consideration, in the lidded container 10 provided with the container 20 produced by the sheet forming method, it is preferable that the protruding seal portion 44 and the protrusion 26 are arranged at the corner 22*c* of the container 20 having a higher rigidity.

Second Modification

Next, a second modification of the present embodiment will be described with reference to FIGS. 36 to 38C. In the second modification, the steam escape mechanism 18 is configured by providing the heat softenable resin layer 37 in the lid 30. In the second modification, the same parts as those of the above embodiments are denoted with the same reference numerals, and the detailed descriptions are omitted. When it is obvious that the operations and effects obtained in the above embodiments can also be obtained in the present modification, its description may be omitted.

Figure 36:
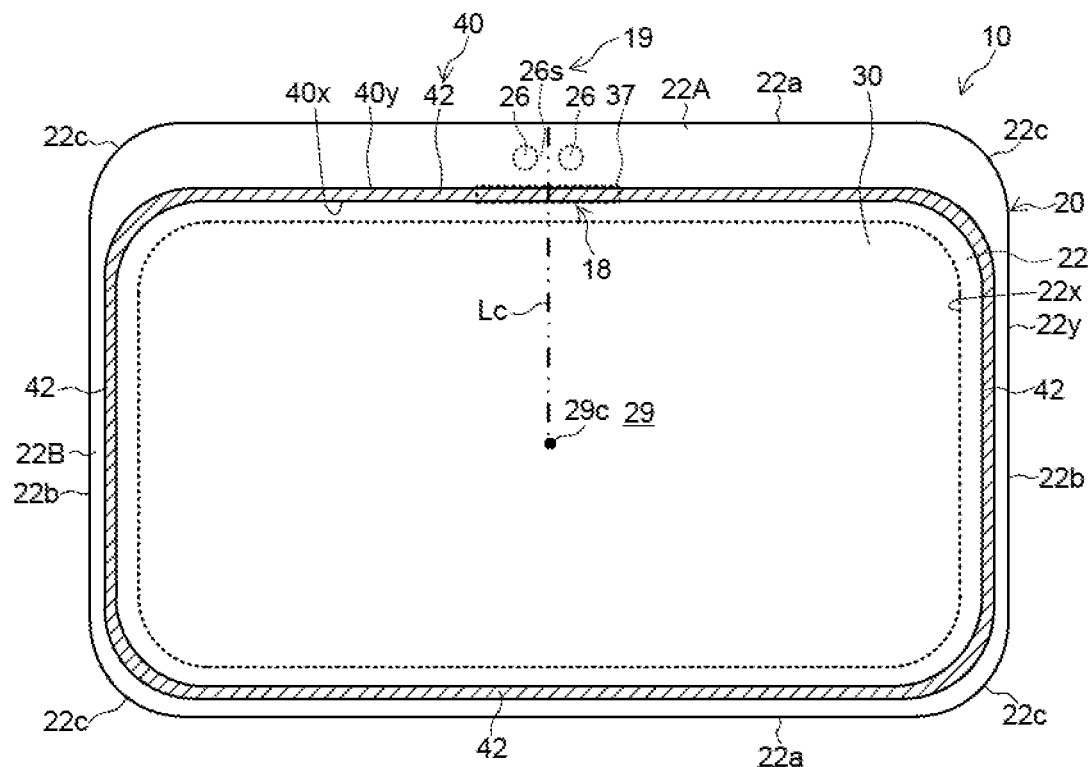
FIG. 36 is a plan view showing a lidded container according to a second modification of the third embodiment.
Figure 37:
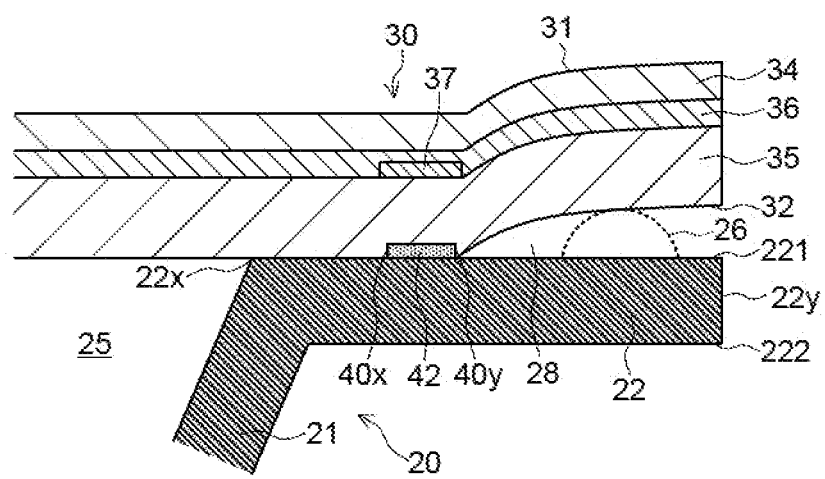
FIG. 37 is a cross-sectional view of the lidded container shown in FIG. 36 as viewed along a straight line Lc.

FIG. 36 is a plan view showing the lidded container 10 according to the present modification. FIG. 37 is a cross-sectional view of the lidded container 10 shown in FIG. 36 as viewed along the straight line Lc. In the present modification, the straight line Lc is a straight line passing through the center point 29*c* of the opening 29 (storage portion 25) and extending in a direction orthogonal to a direction in which a side of the flange portion 22 where the steam escape mechanism 18 is formed extends.

As shown in FIG. 37, the lid 30 further includes the heat softenable resin layer 37 located between the base material 34 and the sealant layer 35, in addition to the base material 34, the sealant layer 35, and an adhesive layer 36. The heat softenable resin layer 37 is located between the adhesive layer 36 in contact with the base material 34 and the sealant layer 35. Although not shown, the heat softenable resin layer 37 may be located between the adhesive layer 36 in contact with the sealant layer 35 and the base material 34. When the lid 30 includes a support, the heat softenable resin layer 37 may be located between the support and the sealant layer 35.

As shown in FIGS. 36 and 37, the heat softenable resin layer 37 spreads so as to reach at least the outer edge 40*y* of the main seal portion 42 from the inner edge 40*x* of the main seal portion 42 of the seal portion 40. When the heat softenable resin layer 37 is thus provided, as will be described later, softening of the heat softenable resin layer 37 can promote peeling off of the main seal portion 42 by utilizing voids 37*a* generated in the lid 30. In the present modification, a portion of the lid 30 overlapping with the heat softenable resin layer 37 constitutes the steam escape mechanism 18.

In the present modification as well, preferably, the steam escape mechanism 18 is provided such that the distance from the center point 29*c* of the opening 29 (storage portion 25) is the shortest distance. For example, when the contour of the flange portion 22 is substantially rectangular, the heat softenable resin layer 37 is provided so as to include a middle of the long side portion 22A of the flange portion 22 in the direction in which the long side 22*a* extends.

In the present modification as well, as shown in FIG. 36, the protrusion 26 protruding upward from the first plane 221 is formed on a portion of the first plane 221 of the flange portion 22, which is outside the heat softenable resin layer 37 constituting the steam escape mechanism 18 and overlaps with the lid 30.

The heat softenable resin layer 37 is formed of a resin or a resin composition having a softening temperature of 60° C. or more and 110° C. or less. Examples of the resin constituting the heat softenable resin layer 37 include an ethylene-vinyl acetate copolymer and a resin containing polyamide, nitrocellulose, and polyethylene wax. As a resin containing polyamide, nitrocellulose, and polyethylene wax, MWOP varnish (softening temperature: 105° C.) manufactured by DIC Graphics Corporation, or the like can be used.

The thickness of the heat softenable resin layer 37 is preferably 1 μm or more and 5 μm or less. If the thickness of the heat softenable resin layer is less than 1 μm, when the lidded container 10 is heated by a microwave oven, the void 37*a* is unlikely to be generated between the base material 34 and the sealant layer 35. If the thickness of the heat softenable resin layer 37 exceeds 5 μm, depending on the pattern of the heat softenable resin layer 37, there occurs a disadvantage that when a laminated film constituting the lid 30 is wound in a roll shape, it partially swells, the film at that portion stretches.

Preferably, adhesive strength of a portion of the lid 30 in which the heat softenable resin layer 37 is provided is 700 (g/15 mm) or more in a first temperature range of 25° C. or less, and is 300 (g/15 mm) or less in a second temperature range of 80° C. or more. This can suppress peeling off between the heat softenable resin layer 37 and the base material 34 or between the adhesive layer 36 and the sealant layer 35 due to handling, transportation, storage, etc. at room temperature or during freezing. Upon heating with a microwave oven, voids 37*a* are likely to be generated between the base material 34 and the sealant layer 35. To be noted, sealing strength is an average value when measured by peeling at 180° with a tensile rate of 300 mm/min using a Tensilon tensile tester (RTC-1310A, manufactured by Orientec Corporation).

The heat softenable resin layer 37 can be formed by a coating method such as a gravure printing method.

Method of Heating Contents

Figure 38A:
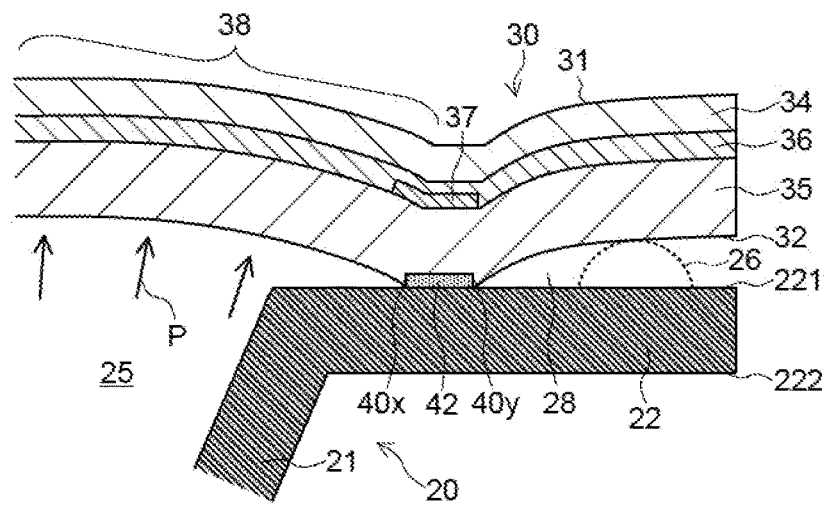
FIG. 38A is a view showing a state in which the lid bulges.
Figure 38B:
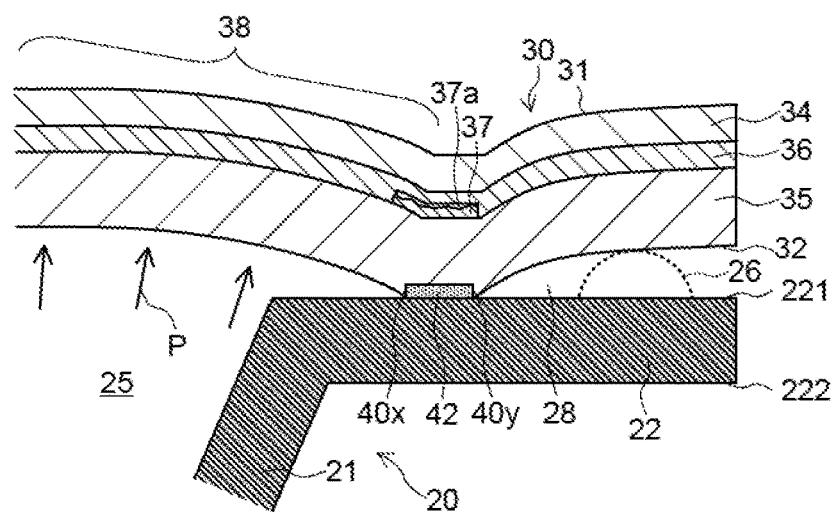
FIG. 38B is a view showing a state in which a heat softenable resin layer softens.
Figure 38C:
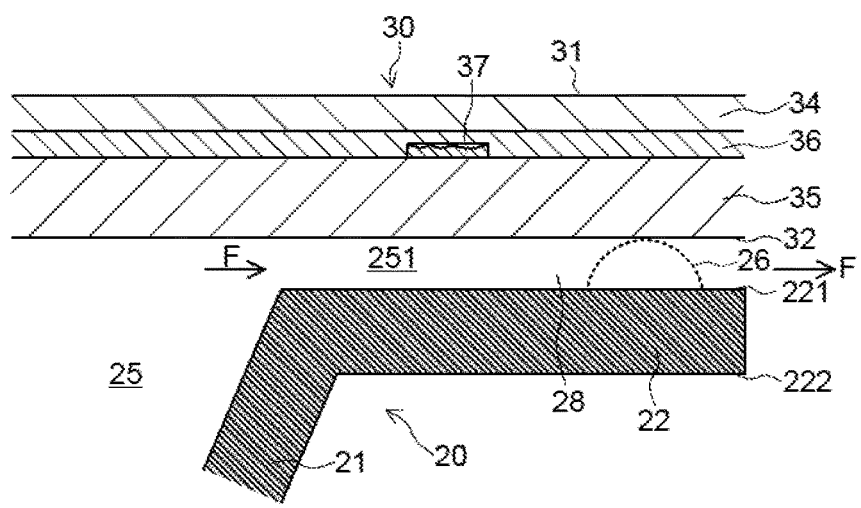
FIG. 38C is a view showing a state in which the lid peels off from the flange portion and steam escapes to the outside.

Next, an example of a method of heating the contents stored in the storage portion 25 of the container 20 of the lidded container 10 will be described with reference to FIGS. 38A to 38C. FIGS. 38A to 38C are each cross-sectional views of the lidded container 10 when the contents are being heated as viewed along the straight line Lc shown in FIG. 36.

As moisture contained in the contents evaporates and the pressure in the storage portion 25 increases, as shown in FIG. 38A, a portion of the lower surface 32 of the lid 30, which is in contact with the storage portion 25, is pushed by the pressure P of the steam, and the bulging portion 38 bulging upward is formed in the lid 30. In addition, the lid 30 is heated, and the temperature of each layer of the lid 30 rises.

Here, in the present modification, the lid 30 includes the heat softenable resin layer 37. For this reason, as shown in FIG. 38B, the heat softenable resin layer 37 softens and deforms, so that the voids 37*a* are generated between the base material 34 and the sealant layer 35. As a result, the sealant layer 35 tends to stretch easily at a portion where the heat softenable resin layer 37 is provided, and the lid 30 tends to swell upward easily. Thus, to a portion of the main seal portion 42 of the seal portion 40, which overlaps with the heat softenable resin layer 37, a force pulling the lid 30 upward is applied more strongly as compared with other portions of the main seal portion 42 of the seal portion 40. When the force pulling the lid 30 upward becomes larger than the joining force of the protruding seal portion 44, the lid 30 is peeled off from the flange portion 22 to form the steam hole 251, as shown in FIG. 38C.

In the present modification as well, when the contact suppression mechanism 19 like the protrusion 26 is formed on the first plane 221 of the flange portion 22 on the outside of the heat softenable resin layer 37 constituting the steam escape mechanism 18, the gap 28 can be secured between the lower surface 32 of the lid 30 and the first plane 221 of the flange portion 22, whereby the steam hole 251 can be prevented from being blocked. Thus, the steam in the storage portion 25 can be caused to stably escape to the outside through the steam hole 251.

Although not shown, the steam escape mechanism 18 of the type constituted by the heat softenable resin layer 37 shown in the present modification may be combined with the contact suppression mechanism 19 of the type such as the cutout portion 23 or the stepped portion 24 shown in the first or second embodiment.

Fourth Embodiment

Next, a fourth embodiment of the present invention will be described. The fourth embodiment also aims to solve the problem that a flange portion warps to make it difficult for steam to escape like the first embodiment described above. Hereinafter, a lidded container 10 of the fourth embodiment will be described. In the fourth embodiment, the same parts as those of the first to third embodiments are denoted with the same reference numerals, and the detailed descriptions may be omitted. When it is obvious that the operations and effects obtained in the first to third embodiments can also be obtained in the fourth embodiment, its description may be omitted.

Lidded Container

Figure 39:
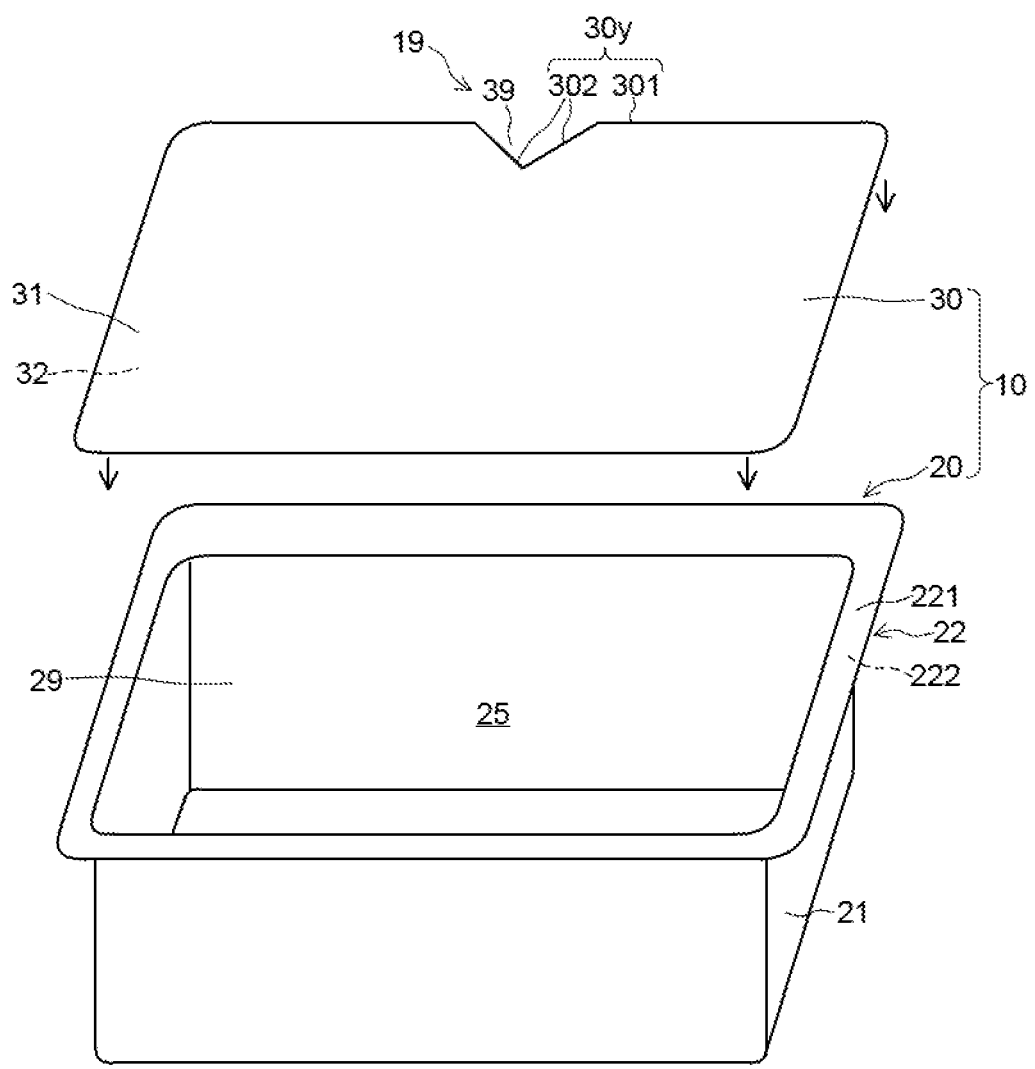
FIG. 39 is an exploded view of members constituting a lidded container of a fourth embodiment of the present invention.
Figure 40A:
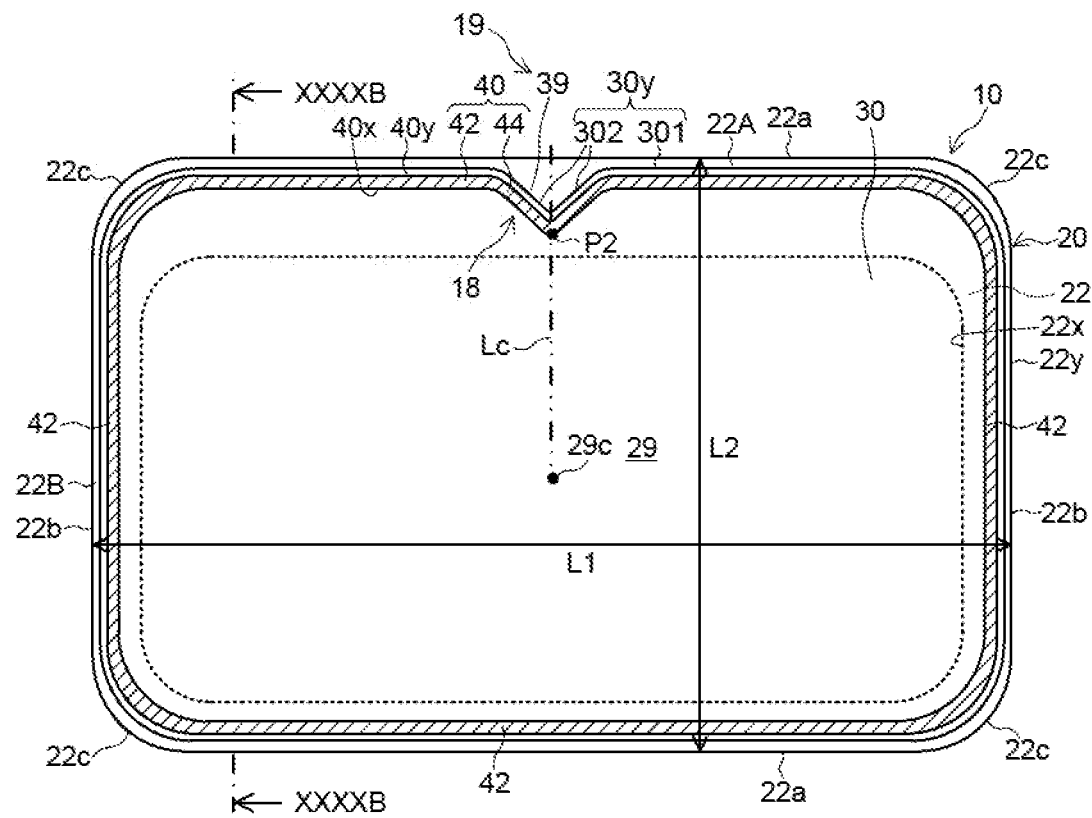
FIG. 40A is a plan view showing the lidded container of the fourth embodiment of the present invention.
Figure 40B:
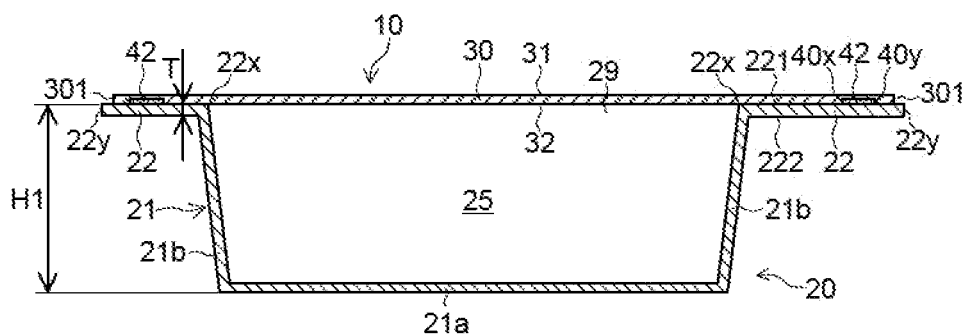
FIG. 40B is a cross-sectional view of the lidded container shown in FIG. 40A as viewed along line XXXXB-XXXXB.

First, with reference to FIGS. 39 to 40B, the outline of the lidded container 10 will be described. FIG. 39 is an exploded view of members constituting the lidded container 10, and FIG. 40A is a plan view of the lidded container 10. FIG. 40B is a cross-sectional view of the lidded container shown in FIG. 40A as viewed along line XXXXB-XXXXB. As with the first to third embodiments, the lidded container 10 includes a container 20 in which a storage portion 25 for storing contents is formed, a lid 30 for covering the storage portion 25 of the container 20, and a seal portion (joint portion) 40 for joining the lid 30 to the container 20.

Container

As with the first to third embodiments, the container 20 includes a body portion 21 which defines the storage portion 25, and a flange portion 22 which is continuously connected to an upper portion of the body portion 21 over one circumference.

Although FIG. 40A shows an example in which a pair of long sides 22*a* is parallel to each other, a pair of short sides 22*b* is parallel to each other, and the long side 22*a* and the short side 22*b* are orthogonal to each other, the present invention is not limited to this example. For example, the pair of long sides 22*a* may be nonparallel to each other, and the pair of short sides 22*b* may be nonparallel to each other. An angle formed between the long side 22*a* and the short side 22*b* may deviate from 90 degrees.

Although FIG. 40A shows an example in which an inner edge 22*x* and an outer edge 22*y* of the flange portion 22 each linearly extend from one corner 22*c* to the other corner 22*c*, the present invention is not limited to this example. Although not shown, a depression, a protrusion, or the like may be partially formed in the inner edge 22*x* and the outer edge 22*y* of the flange portion 22 in a plan view.

Lid

The lid 30 is disposed on the first plane 221 of an upper surface of the flange portion 22 so as to cover the opening 29 of the storage portion 25 of the container 20 and joined to the first plane 221 of the flange portion 22 by the seal portion 40. In the present embodiment, the contour of the lid 30 is the same as the contour of the flange portion 22 except for the cutout portion 39 to be described later, and the lid 30 is formed in a substantially rectangular shape. The lower surface 32 of the lid 30 is configured to be capable of being joined to the first plane 221 of the flange portion 22.

As in the case of the third embodiment, the melting point of the material constituting the sealant layer 35 is preferably 120° C. or more, more preferably 130° C. or more. When the lid 30 further includes a heat softenable resin layer 37 to be described later, the melting point of the material constituting the sealant layer 35 is preferably higher than the softening temperature of the resin constituting the heat softenable resin layer 37. To be noted, the melting point of the material constituting the sealant layer 35 is lower than the melting point of the resin constituting the base material 34.

Seal Portion

The seal portion 40 joins the first plane 221 of the flange portion 22 and the lower surface 32 of the lid 30 to seal the storage portion 25 of the container 20 from the outside. As shown in FIG. 40A, the seal portion 40 is formed continuously over one circumference between the first plane 221 of the flange portion 22 and the lower surface 32 of the lid 30 so as to surround the storage portion 25 in a plan view. The seal portion 40 may be formed by at least partially melting at least one of the container 20 and the lid 30. Otherwise, the seal portion 40 may be formed of a separate constituent element from the container 20 and the lid 30, such as an adhesive. By forming the seal portion 40 between the lid 30 and the flange portion 22, the storage portion 25 of the container 20 can be sealed from the outside. Although FIG. 40B shows an example in which the seal portion 40 is formed on the lid 30 side, the present invention is not limited to this example. For example, the seal portion 40 may straddle both the lid 30 and the flange portion 22 and may be formed on the flange portion 22 side.

As shown in FIG. 40A, the seal portion 40 has a main seal portion (main line) 42 extending along the inner edge 22x or the outer edge 22y of the flange portion 22, and a protruding seal portion (protruding line) 44 disposed at the long side portion 22A of the flange portion 22 and protruding inward from the main seal portion 42. To be noted, the long side portion is a portion extending along the long side 22a of the flange portion 22. Further, a portion of the flange portion 22 extending along the short side 22b is also referred to as a short side portion 22B.

Figure 41:
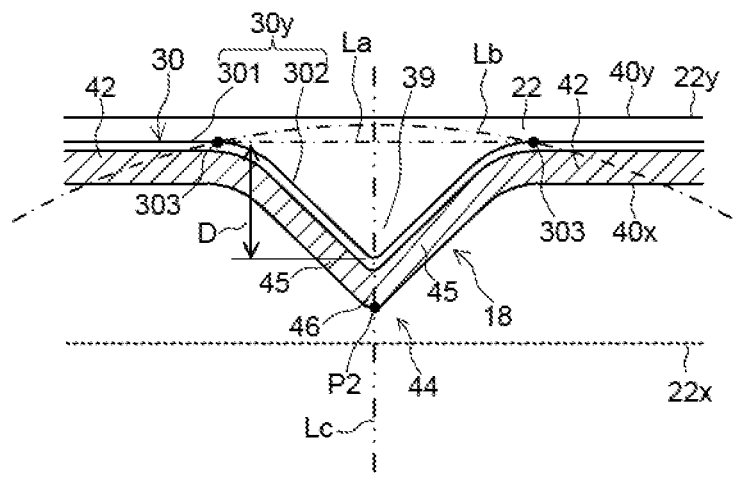
FIG. 41 is an enlarged plan view of a protruding seal portion of a joint portion shown in FIG. 40A.

FIG. 41 is an enlarged view of the protruding seal portion 44 of the seal portion 40 of the lidded container 10 shown in FIG. 40A. As shown in FIG. 41, the protruding seal portion 44 of the seal portion 40 includes a pair of first portions 45 extending inward from the main seal portion 42, and a distal end portion (second portion) 46 connecting the pair of first portions 45. Thus, the protruding seal portion 44 has a substantially triangular shape protruding inward. In this case, when the pressure in the storage portion 25 of the container 20 increases with heating, a substantially triangular distal end portion of the protruding seal portion 44, which protrudes inward, that is, the distal end portion 46 is peeled off, and at the position of the distal end portion 46, the lid 30 is peeled off from the first plane 221 of the flange portion 22.

To be noted, a specific shape of the protruding seal portion 44 is not limited as long as the protruding seal portion 44 can be peeled off from the flange portion 22 earlier than the main seal portion 42 when the contents are heated. For example, although not shown, the protruding seal portion 44 may further include a portion other than the first portion 45 and the distal end portion 46.

Steam Escape Mechanism

When the protruding seal portion 44 is peeled off from the flange portion 22, a steam hole is formed between the lid 30 and the flange portion 22, and the steam in the storage portion 25 escapes to the outside through the steam hole. Thus, in the present embodiment, the protruding seal portion 44 constitutes a steam escape mechanism 18 for discharging the steam generated in the storage portion 25 to the outside of the storage portion 25.

The steam escape mechanism 18 is preferably provided such that a distance from the center point 29c of the opening 29 is the shortest distance. For example, when the contour of the flange portion 22 is substantially rectangular, the protruding seal portion 44 of the flange portion 22 is preferably located in the middle of the long side portion 22A of the flange portion 22 in a direction in which the long side 22a extends. As a result, a distance between the center point 29c of the opening 29 and the inner edge 40x of the protruding seal portion 44 can be made the shortest, so that it is possible to further enhance force acting on the protruding seal portion 44 due to pressure generated when the contents are heated.

When the contents are heated by a microwave oven or the like, the temperature of the container 20 increases together with the temperature of the contents, so that the container 20 may deform and the flange portion 22 may warp upward or may be bent. Alternatively, if the rigidity of the container 20 is low, when the lid 30 is joined to the container 20, the container 20 may deform, and the flange portion 22 may warp upward or may be bent. When such deformation occurs, the steam hole formed between the lid 30 and the flange portion 22 is likely to be blocked. In consideration of such a problem, in the present embodiment, it is proposed to form the cutout portion 39 in the outer edge 30y of the lid 30. In the present embodiment, the cutout portion 39 of the lid 30 functions as a contact suppression mechanism 19 which prevents the upper surface of the flange portion 22 and the lower surface of the lid 30 from closely contacting each other when the contents are heated.

Cutout Portion

Hereinafter, the cutout portion 39 of the lid 30 will be described. As shown in FIGS. 39, 40A, and 41, the outer edge 30y of the lid 30 has a main line 301 extending along the inner edge 22x or the outer edge 22y of the flange portion 22 and a protruding line 302 protruding inward from the main line 301 at a boundary point 303 as a boundary. The cutout portion 39 is a portion surrounded by an extension line La obtained by virtually extending the main line 301 from the boundary point 303 along a direction in which the main line 301 extends in a plan view and the protruding line 302. In the present embodiment, the cutout portion 39 has a substantially triangular shape.

As shown in FIG. 41, in a plan view, the cutout portion 39 is located inside a virtual circle Lb indicated by a chain line. The circle Lb is a circle centered on the center point 29c of the opening 29 (storage portion 25) and passing through the boundary point 303 between the main line 301 of the outer edge 30y of the lid 30 and the protruding line 302.

As shown in FIGS. 40A and 41, preferably, the cutout portion 39 is formed in a portion of the lid 30 which is located more outside than the protruding seal portion 44 of the seal portion 40 in a plan view and overlaps with the flange portion 22. Specifically, as viewed along a direction orthogonal to a direction in which a side (long side 22a in this case) of the flange in which the steam escape mechanism 18 (protruding seal portion 44) is formed extends, the cutout portion 39 is disposed such that the cutout portion 39 of the lid 30 and the steam escape mechanism 18 (protruding seal portion 44) at least partially overlap with each other.

Preferably, the protruding line 302 constituting the cutout portion 39 of the lid 30 is closer to the center point 29c of the opening 29 (storage portion 25) of the container 20 in a plan view than the other portion (main line 301 in this case) of the outer edge 30y of the lid 30. For example, when a straight line Lc arriving at the shortest distance between the center point 29c of the opening 29 and the seal portion 40 is drawn in a plan view, the straight line Lc intersects with the protruding line 302 constituting the cutout portion 39. In the present embodiment, the straight line Lc passes through the center point 29c of the opening 29 and extends in a direction orthogonal to a direction in which a side of the flange portion 22 where the steam escape mechanism 18 is formed extends. Preferably, the seal portion 40 is configured such that the straight line Lc passes through the distal end point P2 of the protruding seal portion 44.

In FIG. 41, reference numeral D denotes the depth of the cutout portion 39. The depth D of the cutout portion 39 is defined as a maximum value of a distance between the extension line La and the protruding line 302 in a direction orthogonal to the extension line La. The depth D of the cutout portion 39 is, for example, 3 mm or more and 10 mm or less.

Figure 42:
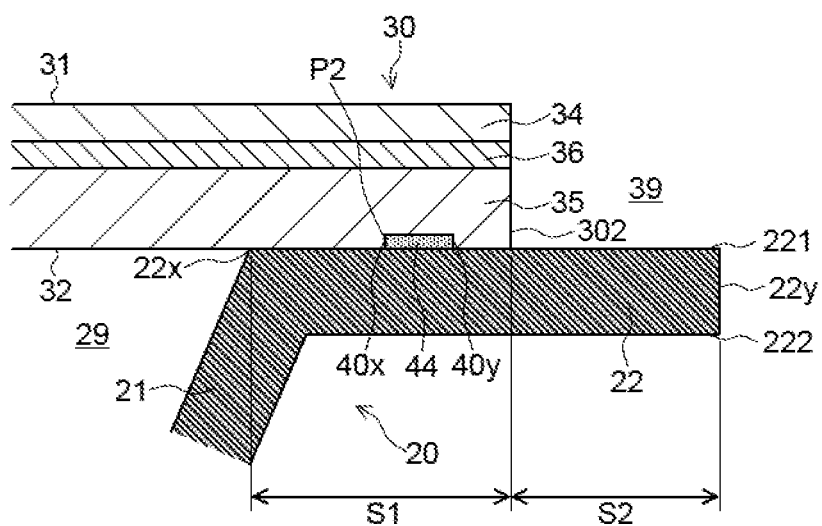
FIG. 42 is a cross-sectional view of the lidded container shown in FIG. 41 as viewed along a straight line Lc.

FIG. 42 is a cross-sectional view of the lidded container 10 shown in FIG. 41 as viewed along the line Lc. According to the present embodiment, by forming the cutout portion 39 in the outer edge 30y of the lid 30, a portion not overlapping with the lid 30 exists in the flange portion 22. In FIG. 42, reference numeral S1 denotes a dimension of a portion of the flange portion 22 overlapping with the lid 30 in a direction in which the straight line Lc connecting at the shortest distance between the center point 29c of the opening 29 (storage portion 25) and the seal portion 40 extends, and reference numeral S2 denotes a dimension of a portion of the flange portion 22 not overlapping with the lid 30. The dimension S2 is preferably 4 mm or more and 11 mm or less. The ratio of the dimension S2 to the dimension S1, that is, S2/S1, is 1 or more and 4 or less.

Although not shown, a plurality of the cutout portions 39 may be formed in the outer edge 30y of the lid 30. The shape of the cutout portion 39 is not limited to a triangle, and various shapes such as a semicircular shape and a quadrangular shape can be adopted.

Method of Manufacturing Lidded Container

Next, an example of a method of manufacturing the lidded container 10 will be described.

First, the container 20 having the body portion 21 and the flange portion 22 integrally formed is produced by an injection molding method using a thermoplastic resin such as polypropylene. In addition, the lid 30 having the cutout portion 39 formed in the outer edge 30y is prepared. Then, contents are filled in the storage portion 25 of the container 20. Thereafter, the lid 30 is placed on the upper surface of the flange portion 22 of the container 20. Then, a portion of the lid 30 where the seal portion 40 is to be formed is heated from an upper surface 31 side using a hot plate or the like to melt the sealant layer 35 of the lid 30. Thereby, it is possible to form the seal portion 40 which fixes the lower surface 32 of the lid 30 to the first plane 221 of the flange portion 22 of the container 20. In this way, it is possible to obtain the lidded container 10 including the container 20 and the lid 30 joined to the first plane 221 of the flange portion 22 of the container 20 through the seal portion 40.

Method of Heating Contents

Figure 43A:
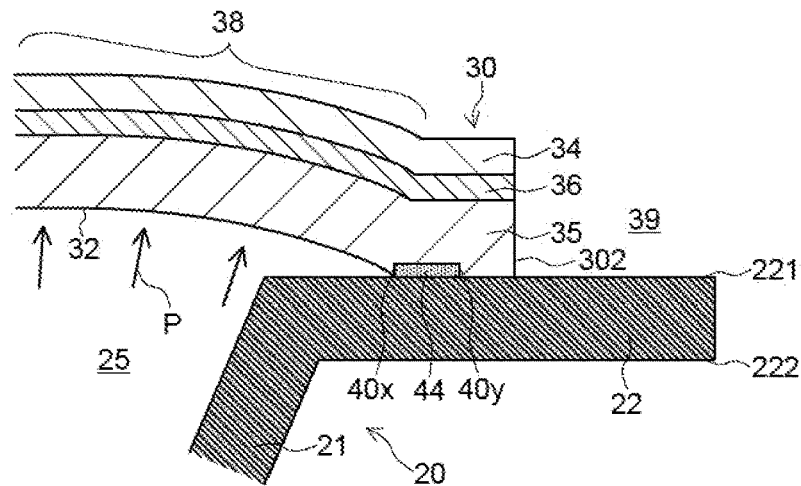
FIG. 43A is a view showing a state in which the lid bulges.
Figure 43B:
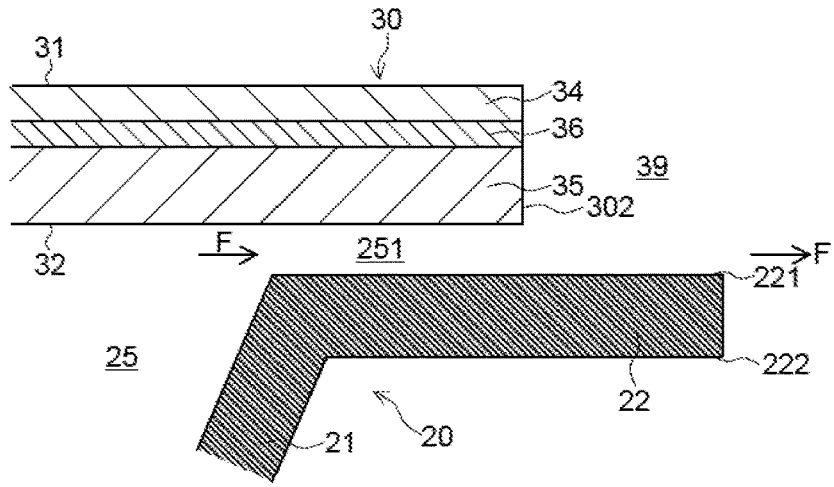
FIG. 43B is a view showing a state in which the lid peels off from the flange portion and steam escapes to the outside.
Figure 43C:
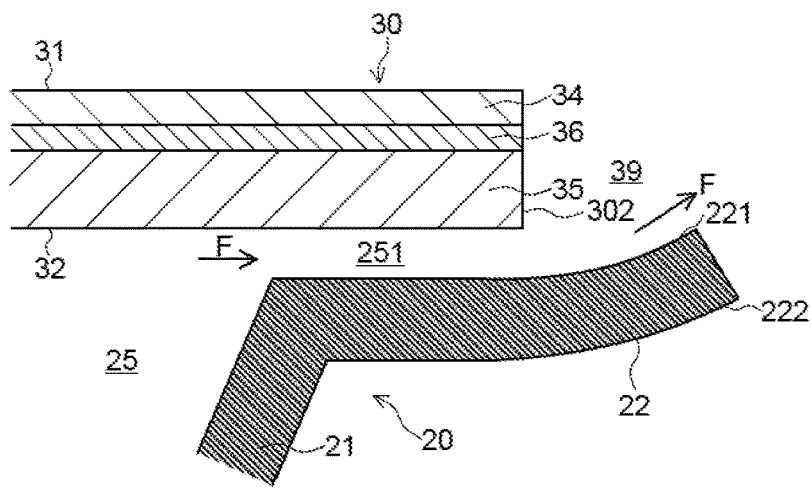
FIG. 43C is a view showing a state in which the flange portion deforms.

Next, an example of a method of heating the contents stored in the storage portion 25 of the container 20 of the lidded container 10 will be described with reference to FIGS. 43A to 43C. FIGS. 43A to 43C are each cross-sectional views of the lidded container 10 when the contents are being heated as viewed along the straight line Lc shown in FIG. 40A.

First, the lidded container 10 with a bottom portion 211 of the container 20 facing downward is placed inside a microwave oven. Then, the contents are heated using the microwave oven. As a result, the temperature of the contents rises, and accordingly moisture contained in the contents evaporates to increase the pressure in the storage portion 25. Thus, as shown in FIG. 43A, a portion of the lower surface 32 of the lid 30, which is in contact with the storage portion 25, is pushed by pressure P of the steam, and a bulging portion 38 bulging upward is formed in the lid 30.

When the pressure in the storage portion 25 further increases with heating, the bulging portion 38 of the lid 30 further extends and reaches the protruding seal portion 44 of the seal portion 40 as shown in FIG. 43A. When the force with which the lid 30 is pulled upward becomes larger than the joining force of the protruding seal portion 44 at a place where the protruding seal portion 44 is formed, the lid 30 is peeled off from the flange portion 22.

When the lid 30 is peeled off from the flange portion 22, a steam hole 251 through which steam F inside the storage portion 25 escapes to the outside is formed between the lower surface 32 of the lid 30 and the first plane 221 of the flange portion 22 as shown in FIG. 43B. Here, according to the present embodiment, the cutout portion 39 is formed in the outer edge 30y of the lid 30 on the outside of the protruding seal portion 44. Thus, as shown in FIG. 43C, even when the flange portion 22 deforms upward, it is possible to prevent the lid 30 from closely contacting the flange portion 22, whereby the steam hole 251 can be prevented from being blocked. Thus, the steam F in the storage portion 25 can be caused to stably escape to the outside through the steam hole 251. This makes it possible to lower the pressure in the storage portion 25. This makes it possible to heat the contents using a microwave oven while suppressing rupture or the like of the lid 30.

To be noted, various modifications can be made to the above embodiments. Hereinafter, modifications will be described. In the below description and the drawings used in the below description, a component that can be configured similarly to each of the above embodiments is indicated by the same reference number as that of the above embodiment, and overlapped description is omitted. When it is obvious that the operations and effects obtained in the above embodiments can also be obtained in the modifications, its description may be omitted.

First Modification

Figure 44:
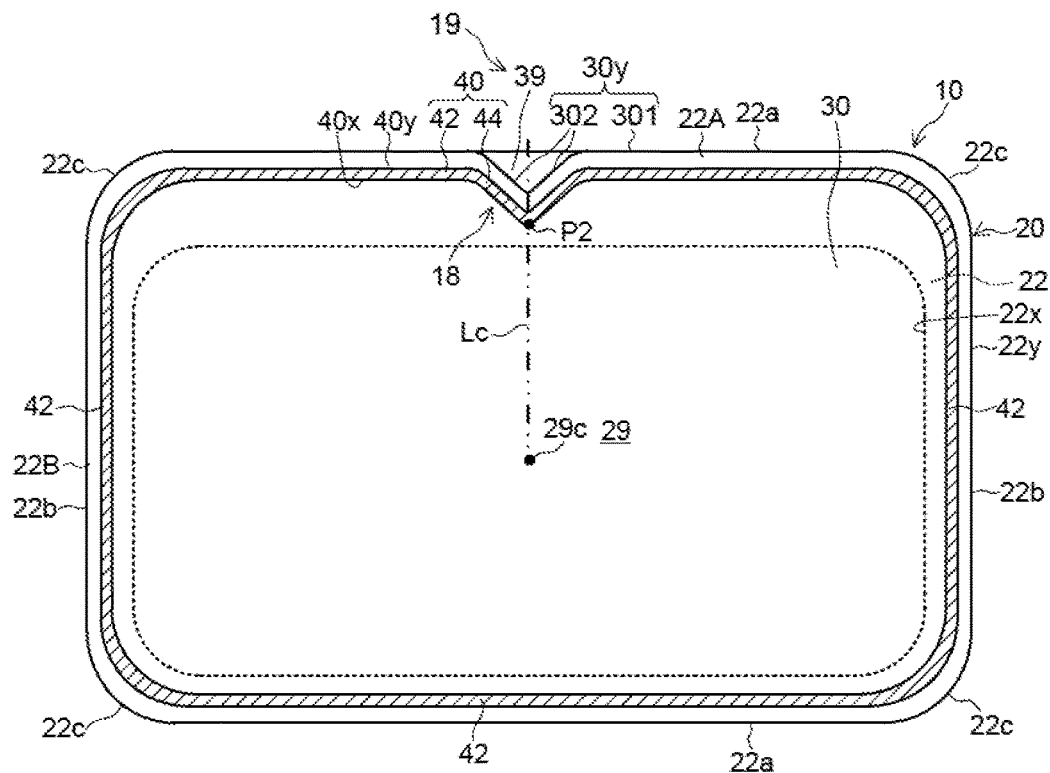
FIG. 44 is a plan view showing a lidded container according to a first modification of the fourth embodiment.

In the above embodiment, the main line 301 of the outer edge 30y of the lid 30 is located more inside than the outer edge 22y of the flange portion 22 of the container 20. However, the present invention is not limited to this example, and as shown in FIG. 44, the main line 301 of the outer edge 30y of the lid 30 may coincide with the outer edge 22y of the flange portion 22 of the container 20.

Second Modification

Figure 45:
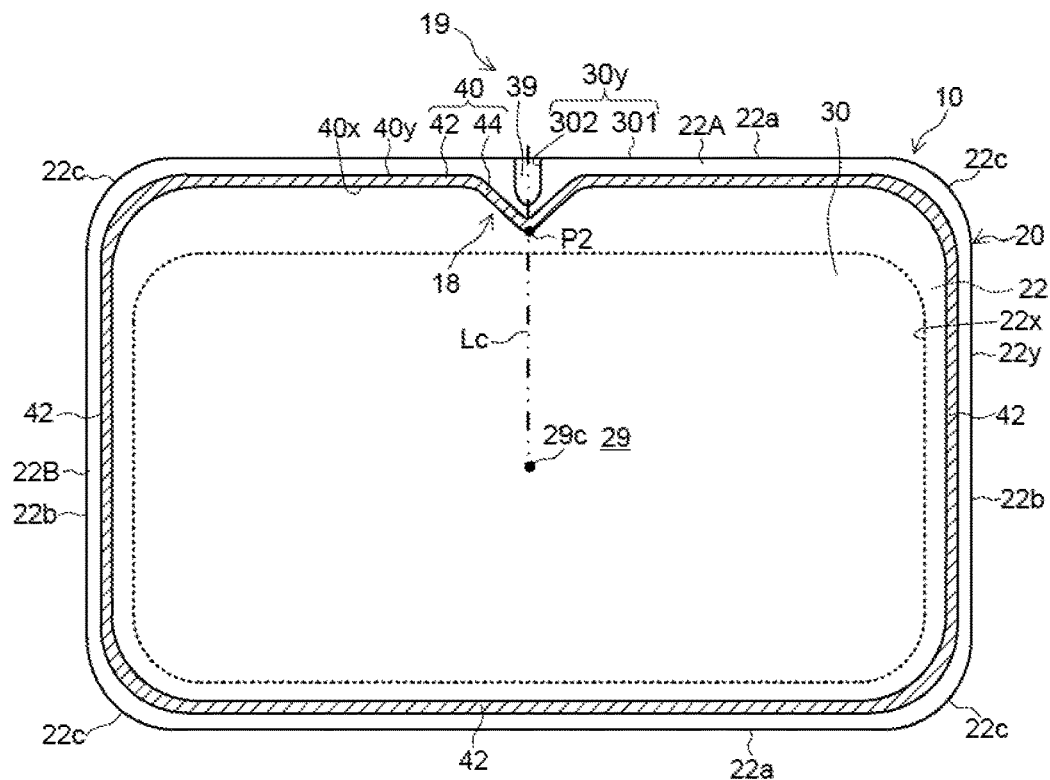
FIG. 45 is a plan view showing a lidded container according to a second modification of the fourth embodiment.

The above embodiment shows an example in which the cutout portion 39 of the lid 30 has the same shape as the protruding seal portion 44 of the seal portion 40, for example, an example in which the cutout portion 39 has a substantially triangular shape. However, the present invention is not limited to this example, and as shown in FIG. 45, the cutout portion 39 of the lid 30 may have a shape different from that of the protruding seal portion 44 of the seal portion 40. For example, when the protruding seal portion 44 of the seal portion 40 has a substantially triangular shape, the cutout portion 39 of the lid 30 may have a semi-elliptical shape.

To be noted, FIG. 45 shows an example in which the main line 301 of the outer edge 30y of the lid 30 coincides with the outer edge 22y of the flange portion 22 of the container 20 as in the case of the first modification described above. However, the present invention is not limited to this example. In the present modification as well, the main line 301 of the outer edge 30y of the lid 30 may be located more inside than the outer edge 22y of the flange portion 22 of the container 20.

Third Modification

Figure 46:
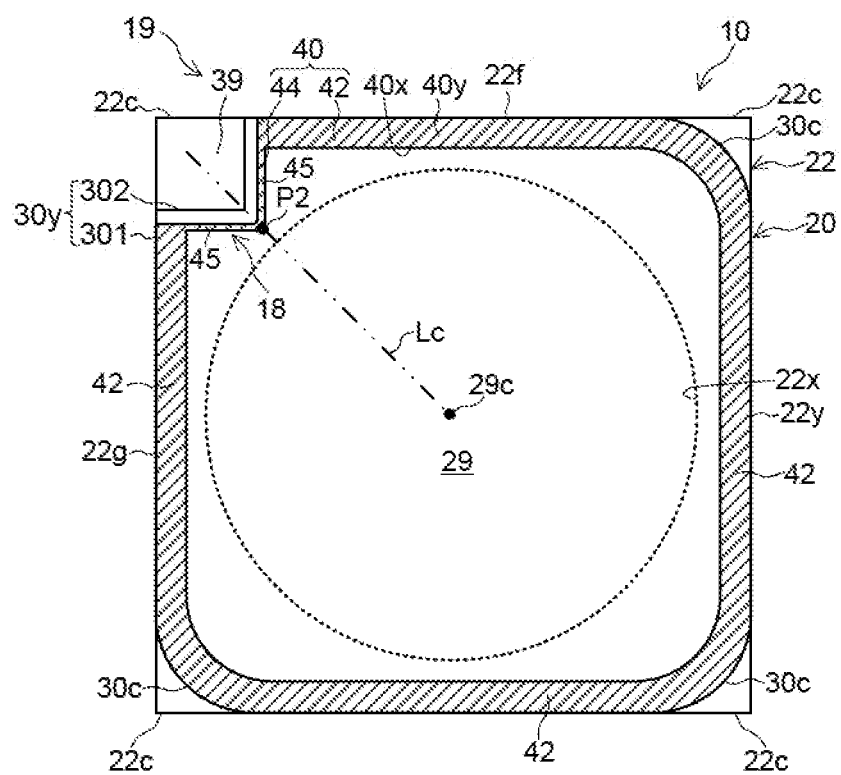
FIG. 46 is a plan view showing a lidded container according to a third modification of the fourth embodiment.

In the above embodiment, the flange portion 22 of the container 20 has a substantially square (substantially rectangular) contour including the pair of long sides 22a and the pair of short sides 22b. However, the present invention is not limited to this example, and as shown in FIG. 46, the flange portion 22 may have a substantially square contour including four sides of equal length. In this case, the protruding seal portion 44 of the seal portion 40 may be formed at a portion of the corner 22c of the flange portion 22. For example, the protruding seal portion 44 includes one first portion 45 which is connected to the main seal portion 42 extending along a first side 22f of the flange portion 22, and the other first portion 45 which is connected to the main seal portion 42 extending along a second side 22g connected to the first side 22f of the flange portion 22. An angle formed by one first portion 45 and the other first portion 45 is, for example, 90°.

In the present modification as well, the cutout portion 39 is formed in a portion of the lid 30 which is located more outside than the protruding seal portion 44 of the seal portion 40 in a plan view and overlaps with the flange portion 22. For example, in the present modification as well, when the straight line Lc arriving at the shortest distance between the center point 29c of the opening 29 and the seal portion 40 is drawn in a plan view, the straight line Lc intersects with the protruding line 302 constituting the cutout portion 39. When the cutout portion 39 is thus formed in the lid 30, in the present modification as well, it is possible to prevent the lid 30 from closely contacting the flange portion 22 of the modified container 20, whereby the steam hole 251 can be prevented from being blocked.

In FIG. 46, at the three corners 22c of the flange portion 22 other than the corner 22c where the steam escape mechanism 18 is formed, a corner 30c of the lid 30 is located more inside than the corner 22c of the flange portion 22. However, the present invention is not limited to this example. Although not shown, at the three corners 22c of the flange portion 22 other than the corner 22c where the steam escape mechanism 18 is formed, the position of the corner 30c of the lid 30 and the corner 22c of the flange portion 22 may coincide with each other.

Fourth Modification

Next, a fourth modification will be described with reference to FIGS. 47 to 49C. In the fourth modification, the steam escape mechanism 18 is configured by providing the heat softenable resin layer 37 in the lid 30. In the fourth modification, the same parts as those of the above embodiments are denoted with the same reference numerals, and the detailed descriptions are omitted. When it is obvious that the operations and effects obtained in the above embodiments can also be obtained in the present embodiment, its description may be omitted.

Figure 47:
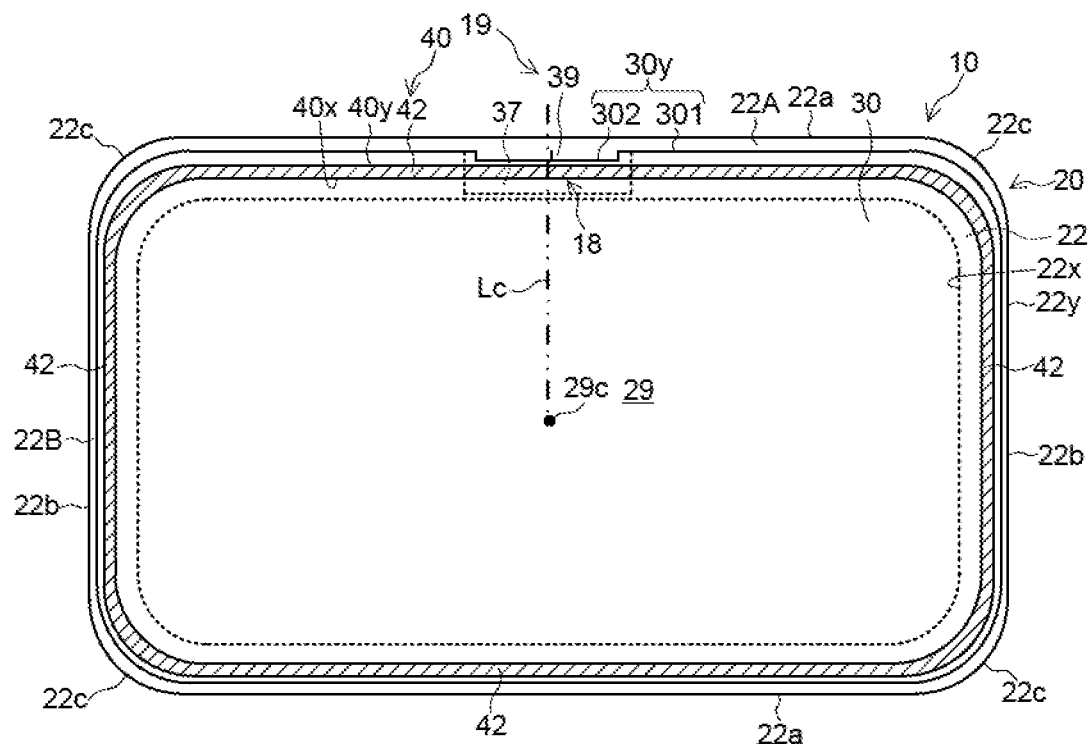
FIG. 47 is a plan view showing a lidded container according to a fourth modification of the fourth embodiment.
Figure 48:
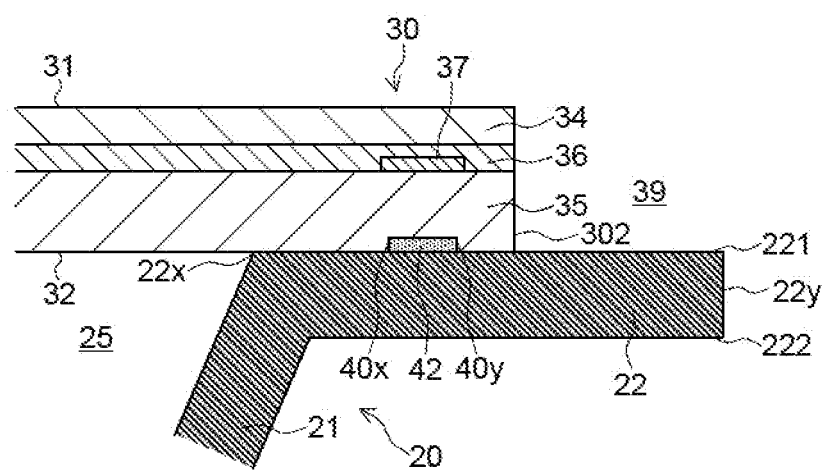
FIG. 48 is a cross-sectional view of the lidded container shown in FIG. 47 as viewed along a straight line Lc.

FIG. 47 is a plan view showing the lidded container 10 according to the present modification. FIG. 48 is a cross-sectional view of the lidded container 10 shown in FIG. 47 as viewed along the straight line Lc. In the present modification as well, the straight line Lc is the straight line arriving at the shortest distance between the center point 29c of the opening 29 and the seal portion 40 in a plan view.

As shown in FIG. 48, the lid 30 further includes the heat softenable resin layer 37 located between the base material 34 and the sealant layer 35, in addition to the base material 34, the sealant layer 35, and an adhesive layer 36. The heat softenable resin layer 37 is located between the adhesive layer 36 in contact with the base material 34 and the sealant layer 35. Although not shown, the heat softenable resin layer 37 may be located between the adhesive layer 36 in contact with the sealant layer 35 and the base material 34. When the lid 30 includes a support, the heat softenable resin layer 37 may be located between the base material 34 and the support or between the support and the sealant layer 35.

As shown in FIGS. 47 and 48, the heat softenable resin layer 37 spreads so as to reach at least the outer edge 40y of the main seal portion 42 from the inner edge 40x of the main seal portion 42 of the seal portion 40. When the heat softenable resin layer 37 is thus provided, as will be described later, softening of the heat softenable resin layer 37 can promote peeling off of the main seal portion 42 by utilizing voids 37a generated in the lid 30. In the present modification, a portion of the lid 30 overlapping with the heat softenable resin layer 37 constitutes the steam escape mechanism 18.

In the present modification as well, preferably, the steam escape mechanism 18 is provided such that the distance from the center point 29c of the opening 29 (storage portion 25) is the shortest distance. For example, when the contour of the flange portion 22 is substantially rectangular, the heat softenable resin layer 37 is provided so as to include a middle of the long side portion 22A of the flange portion 22 in the direction in which the long side 22a extends.

In the present modification as well, as shown in FIG. 47, the cutout portion 39 is formed in a portion of the lid 30 which is located more outside than the heat softenable resin layer 37 (steam escape mechanism 18) in a plan view and overlaps with the flange portion 22.

The heat softenable resin layer 37 is formed of a resin or a resin composition having a softening temperature of 60° C. or more and 110° C. or less. Examples of the resin constituting the heat softenable resin layer 37 include an ethylene-vinyl acetate copolymer and a resin containing polyamide, nitrocellulose, and polyethylene wax. As a resin containing polyamide, nitrocellulose, and polyethylene wax, MWOP varnish (softening temperature: 105° C.) manufactured by DIC Graphics Corporation, or the like can be used.

The thickness of the heat softenable resin layer 37 is preferably 1 μm or more and 5 μm or less. If the thickness of the heat softenable resin layer is less than 1 μm, when the lidded container 10 is heated by a microwave oven, the void 37a is unlikely to be generated between the base material 34 and the sealant layer 35. If the thickness of the heat softenable resin layer 37 exceeds 5 μm, depending on the pattern of the heat softenable resin layer 37, there occurs a disadvantage that when a laminated film constituting the lid 30 is wound in a roll shape, it partially swells, the film at that portion stretches.

Preferably, adhesive strength of a portion of the lid 30 in which the heat softenable resin layer 37 is provided is 700 (g/15 mm) or more in a first temperature range of 25° C. or less, and is 300 (g/15 mm) or less in a second temperature range of 80° C. or more. This can suppress peeling off between the heat softenable resin layer 37 and the base material 34 or between the adhesive layer 36 and the sealant layer 35 due to handling, transportation, storage, etc. at room temperature or during freezing. Upon heating with a microwave oven, voids 37a are likely to be generated between the base material 34 and the sealant layer 35. To be noted, sealing strength is an average value when measured by peeling at 180° with a tensile rate of 300 mm/min using a Tensilon tensile tester (RTC-1310A, manufactured by Orientec Corporation).

The heat softenable resin layer 37 can be formed by a coating method such as a gravure printing method.

Method of Heating Contents

Figure 49A:
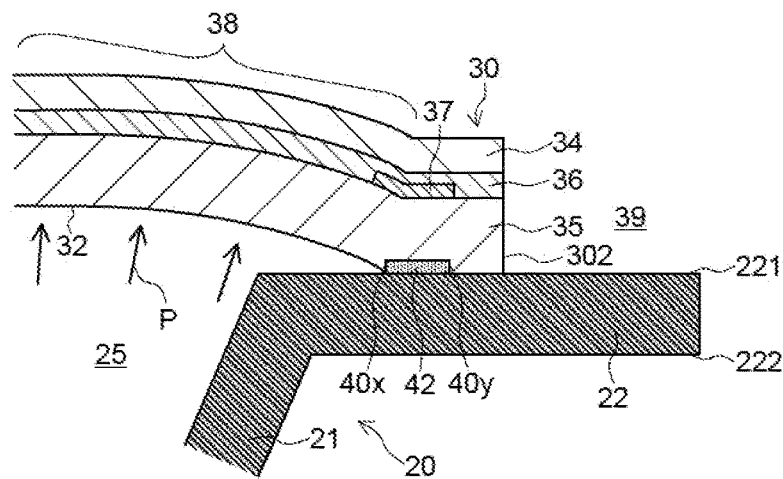
FIG. 49A is a view showing a state in which the lid bulges.
Figure 49B:
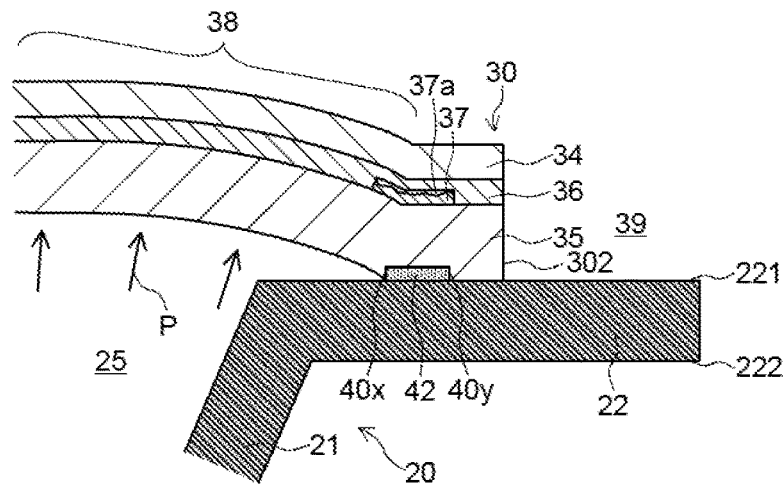
FIG. 49B is a view showing a state in which a heat softenable resin layer softens.
Figure 49C:
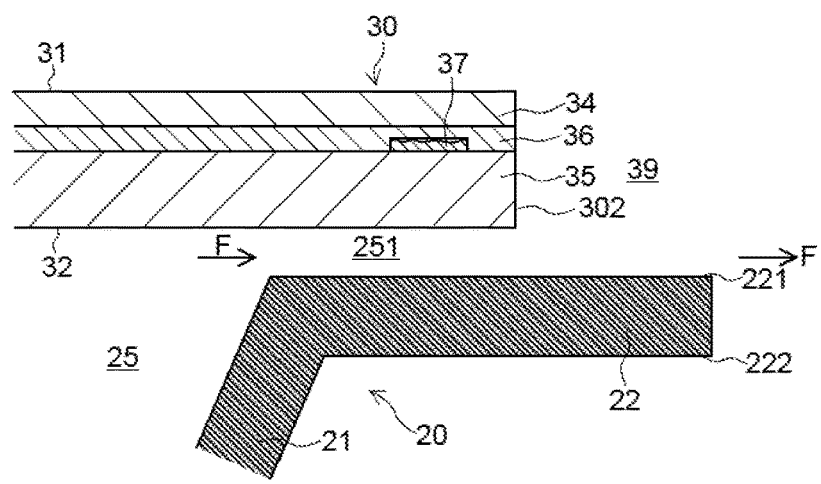
FIG. 49C is a view showing a state in which the lid peels off from the flange portion and steam escapes to the outside.

Next, an example of a method of heating the contents stored in the storage portion 25 of the container 20 of the lidded container 10 will be described with reference to FIGS. 49A to 49C. FIGS. 49A to 49C are each cross-sectional views of the lidded container 10 when the contents are being heated as viewed along the straight line Lc shown in FIG. 47.

As moisture contained in the contents evaporates and the pressure in the storage portion 25 increases, as shown in FIG. 49A, a portion of the lower surface 32 of the lid 30, which is in contact with the storage portion 25, is pushed by the pressure P of the steam, and the bulging portion 38 bulging upward is formed in the lid 30. In addition, the lid 30 is heated, and the temperature of each layer of the lid 30 rises.

Here, in the present modification, the lid 30 includes the heat softenable resin layer 37. For this reason, as shown in FIG. 49B, the heat softenable resin layer 37 softens and deforms, so that the heat softenable resin layer 37 cohesively peels off, and the voids 37a are generated between the base material 34 and the sealant layer 35. As a result, the sealant layer 35 tends to stretch easily at a portion where the heat softenable resin layer 37 is provided, and the lid 30 tends to swell upward easily. Thus, to a portion of the main seal portion 42 of the seal portion 40, which overlaps with the heat softenable resin layer 37, a force pulling the lid 30 upward is applied more strongly as compared with other portions of the main seal portion 42 of the seal portion 40. When the force pulling the lid 30 upward becomes larger than the joining force of the protruding seal portion 44, the lid 30 is peeled off from the flange portion 22 to form the steam hole 251, as shown in FIG. 49C.

In the present modification as well, by forming the cutout portion 39 in the outer edge 30y of the lid 30 on the outside of the heat softenable resin layer 37 constituting the steam escape mechanism 18, it is possible to prevent the lid 30 from closely contacting the flange portion 22 of the modified container 20. Thereby, the steam hole 251 can be prevented from being blocked. Thus, the steam F in the storage portion 25 can be caused to stably escape to the outside through the steam hole 251.

Fifth Modification

Next, a fifth modification will be described with reference to FIGS. 50 to 52. In the above embodiment and modifications, an example in which the cutout portion 39 is formed in the outer edge 30y of the lid 30 is shown. In the fifth modification, an example in which a cutout portion 23 is formed also in the outer edge 22y of the flange portion 22 will be described. In the fifth modification, the same parts as those of the above embodiments and modifications are denoted with the same reference numerals, and the detailed descriptions are omitted. When it is obvious that the operations and effects obtained in the above embodiments and modifications can also be obtained in the present modification, its description may be omitted.

Figure 50:
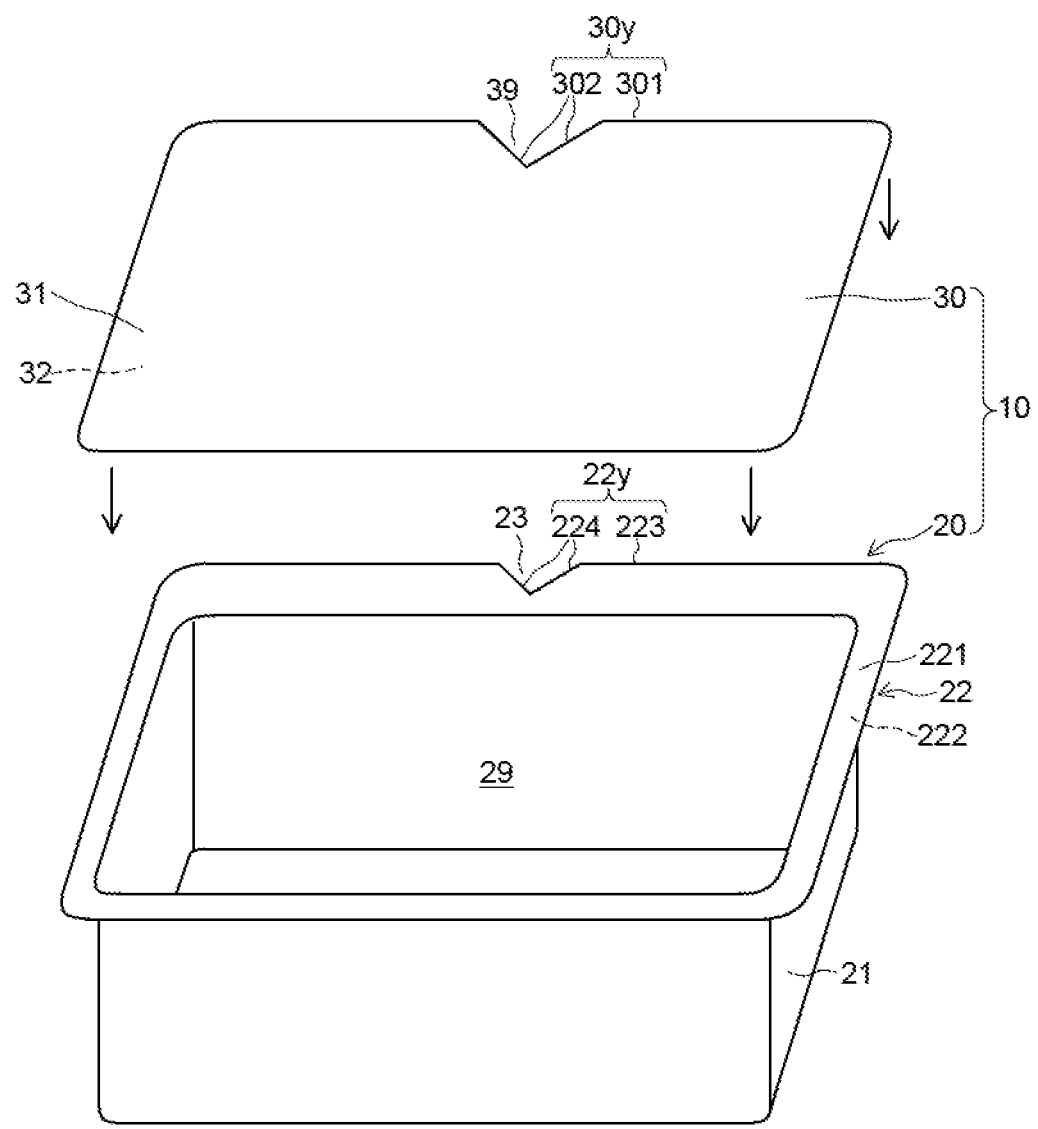
FIG. 50 is an exploded view of members constituting a lidded container according to a fifth modification of the fourth embodiment.
Figure 51:
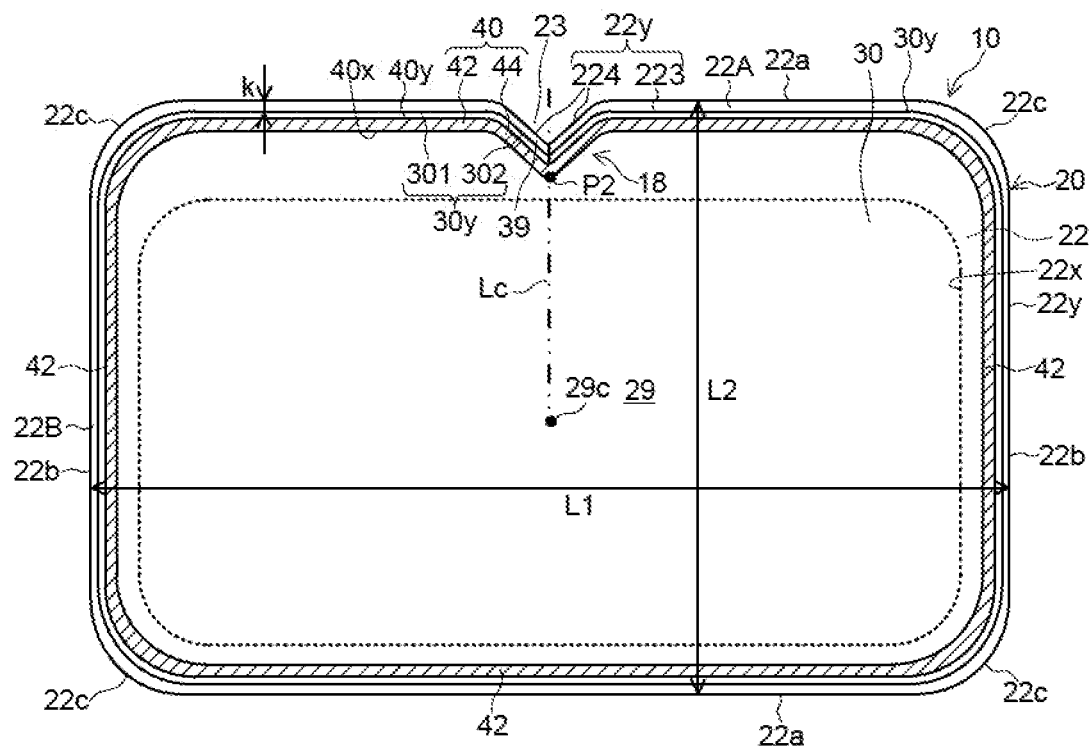
FIG. 51 is a plan view showing a lidded container according to a fifth modification of the fourth embodiment.

FIG. 50 is an exploded view of members constituting the lidded container 10 according to the present modification, and FIG. 51 is a plan view of the lidded container 10. FIG. 52 is a cross-sectional view of the lidded container 10 shown in FIG. 51 as viewed along the straight line Lc. In the present modification as well, the straight line Lc is the straight line arriving at the shortest distance between the center point 29c of the opening 29 (storage portion 25) and the seal portion 40 in a plan view.

As shown in FIGS. 50 and 51, the cutout portion 23 is formed in the outer edge 22y of the flange portion 22 of the container 20. Specifically, the outer edge 22y of the flange portion 22 has a main line 223 extending along the inner edge 22x of the flange portion 22 in a plan view and a protruding line 224 protruding inward from the main line 223. As in the case of the cutout portion 39 of the lid 30, the cutout portion 23 is defined as a portion surrounded by an extension line obtained by virtually extending the main line 223 along a direction in which the main line 223 extends in a plan view and the protruding line 224. In the present modification, the cutout portion 23 has a substantially triangular shape.

Figure 52:
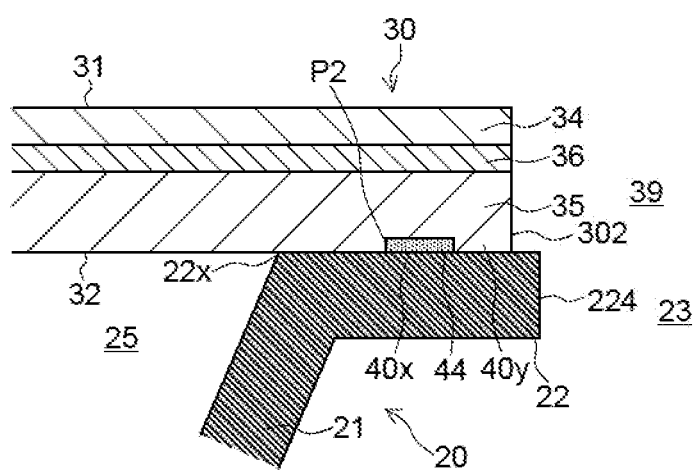
FIG. 52 is a cross-sectional view of the lidded container shown in FIG. 51 as viewed along a straight line Lc.

As shown in FIGS. 51 and 52, the cutout portion 23 is formed in a portion of the flange portion 22 which is located more outside than the protruding seal portion 44 of the seal portion 40 in a plan view. Specifically, as viewed along a direction orthogonal to a direction in which a side (the main line 223 of the long side 22a in this case) of the flange in which the steam escape mechanism 18 (protruding seal portion 44) is formed extends, the cutout portion 23 is disposed such that the cutout portion 23 of the flange portion 22 and the steam escape mechanism 18 (protruding seal portion 44) at least partially overlap with each other.

Preferably, the protruding line 224 constituting the cutout portion 23 of the flange portion 22 is closer to the center point 29c of the opening 29 (storage portion 25) of the container 20 in a plan view than the other portion (main line 223 in this case) of the outer edge 22y of the flange portion 22. For example, the straight line Lc arriving at the shortest distance between the center point 29c of the opening 29 and the seal portion 40 in a plan view intersects with the protruding line 224 constituting the cutout portion 23.

In the present modification, the cutout portion 23 of the flange portion 22 is formed so as to be located more outside than the cutout portion 39 of the lid 30 in a plan view. In other words, the protruding line 224 of the outer edge 22y of the flange portion 22 is located more outside than the protruding line 302 of the outer edge 30y of the lid 30, as shown in FIGS. 51 and 52. As viewed along the direction orthogonal to the direction in which the side (the main line 223 of the long side 22a in this case) of the flange in which the steam escape mechanism 18 (protruding seal portion 44) is formed extends, the cutout portion 23 is disposed such that the cutout portion 23 of the flange portion 22 and the cutout portion 39 of the lid 30 at least partially overlap with each other. FIG. 51 shows an example in which an interval k between the outer edge 22y of the flange portion 22 and the outer edge 30y of the lid 30 is constant over the entire region, that is, in both the main line 223 and the protruding line 224.

A method of forming the cutout portion 23 of the flange portion 22 and the cutout portion 39 of the lid 30 is not particularly limited. For example, a process of forming the cutout portion 23 in the flange portion 22 and a process of forming the cutout portion 39 in the lid 30 may be performed separately. After the lid 30 is jointed to the flange portion 22 of the container 20, the flange portion 22 and the lid 30 are punched out with a predetermined mold, and the cutout portion 23 of the flange portion 22 and the cutout portion 39 of the lid 30 may be formed simultaneously. In this case, at least a portion of the cutout portion 23 and the cutout portion 39, the above-described interval k becomes zero.

In addition to forming the cutout portion 39 in the lid 30, when the cutout portion 23 is formed in the flange portion 22, according to the present modification, it is possible to further prevent the lid 30 from closely contacting the flange portion 22 of the modified container 20, whereby the steam hole 251 can be prevented from being blocked.

In the present modification as well, as in the case of the fourth modification described above, the steam escape mechanism 18 may be configured by providing the heat softenable resin layer 37 in the lid 30.

Each of the above embodiments and modifications thereof may be appropriately combined with other embodiments and modifications thereof.

REFERENCE SIGNS LIST

10 Lidded container
18 Steam escape mechanism
19 Contact suppression mechanism
20 Container
21 Body portion
211 Bottom portion (bottom wall, bottom surface)
212 Raised portion (protrusion)
213 Side portion (side wall, side surface)
214 First portion
215 Second portion
22 Flange portion
22a Long side
22b Short side
22c Corner
22A Long side portion
22B Short side portion
22C Corner portion
22x Inner edge
22y Outer edge
221 First plane
222 Lower surface
23 Cutout portion
24 Stepped portion
241 Flange wall portion
242 Second plane
25 Storage portion
251 Steam hole
26 Protrusion
29 Opening
30 Lid (lid member)
30y Outer edge
301 Main line
302 Protruding line
31 Upper surface
32 Lower surface
34 Base material
35 Sealant layer
36 Adhesive layer
37 Heat softenable resin layer
37a Void
38 Bulging portion
39 Cutout portion
40 Seal portion (joint portion)
42 Main seal portion (main line)
44 Protruding seal portion (protruding line)
44A First protruding seal portion
44B Second protruding seal portion
L1 Length in longitudinal direction of flange portion
L2 Length in lateral direction of flange portion
H1 Height of container
h1 Interval between lower edge of lid and upper edge of second plane

The invention claimed is:

1. A lidded container comprising:
a container having an opening; and
a lid which covers the opening and is joined to the container,
wherein the container comprises a bottom portion, a side portion standing upright from the bottom portion, and a flange portion which is continuously connected to an upper portion of the side portion and comprises a first plane,
a circumferential seal portion is formed between the lid and the first plane of the flange portion,
the seal portion comprises a main seal portion and a protruding seal portion protruding inward with respect to the main seal portion,
at least one of the flange portion and the lid comprises a contact suppression mechanism for suppressing a contact between the flange portion and the lid, which is provided outside the protruding seal portion at a position corresponding to at least the protruding seal portion, and wherein the side portion includes a first portion corresponding to the protruding seal portion and second portions located on both sides of the first portion, the first portion constituting the same plane or the same curved surface continuous with second portions.

2. The lidded container according to claim 1, wherein the contact suppression mechanism comprises a protrusion formed on the first plane of the flange portion outside the protruding seal portion and protruding upward from the first plane.

3. The lidded container according to claim 2, wherein the contact suppression mechanism comprises at least two of the protrusions, which are arranged with a gap therebetween, and
the at least two protrusions are arranged so as to pass through a center point of the opening and the gap in a plan view and draw a straight line reaching an outer edge of the flange portion without intersecting with the protrusion.

4. The lidded container according to claim 1, wherein the contact suppression mechanism comprises a cutout portion formed in the lid outside the protruding seal portion.

5. The lidded container according to claim 1, wherein the seal portion includes a connection portion where the main seal portion and the protruding seal portion are connected, the connection portion including an inner edge, and
wherein a first shortest distance from the contact suppression mechanism to the opening in a plan view is shorter than a second shortest distance from the inner edge of the connection portion of the seal portion to the opening in a plan view.

6. A lidded container comprising:
a container having an opening; and
a lid which covers the opening and is joined to the container,
wherein the container comprises a bottom portion, a side portion standing upright from the bottom portion, and a flange portion which is continuously connected to an upper portion of the side portion and comprises a first plane,
a circumferential seal portion is formed between the lid and the first plane of the flange portion,
the seal portion comprises a main seal portion and a protruding seal portion protruding inward with respect to the main seal portion,
at least one of the flange portion and the lid comprises a contact suppression mechanism for suppressing a contact between the flange portion and the lid, which is provided outside the protruding seal portion at a position corresponding to at least the protruding seal portion, and wherein the contact suppression mechanism comprises a cutout portion formed in the flange portion outside the protruding seal portion.

7. The lidded container according to claim 6, wherein the protruding seal portion includes an outer edge, the outer edge being in contact with the cutout portion of the flange portion.

8. A lidded container comprising:
a container having an opening; and
a lid which covers the opening and is joined to the container,
wherein the container comprises a bottom portion, a side portion standing upright from the bottom portion, and a flange portion which is continuously connected to an upper portion of the side portion and comprises a first plane,
a circumferential seal portion is formed between the lid and the first plane of the flange portion,
the seal portion comprises a main seal portion and a protruding seal portion protruding inward with respect to the main seal portion,
at least one of the flange portion and the lid comprises a contact suppression mechanism for suppressing a contact between the flange portion and the lid, which is provided outside the protruding seal portion at a position corresponding to at least the protruding seal portion, and wherein the contact suppression mechanism comprises a stepped portion formed in the flange portion outside the protruding seal portion, and
the stepped portion comprises at least a flange wall portion which is continuously connected to the first plane and extends downward from the first plane.

9. The lidded container according to claim 8, wherein the protruding seal portion includes an outer edge, the outer edge being in contact with the stepped portion of the flange portion.

10. A lidded container comprising:
a container having an opening; and
a lid which covers the opening and is joined to the container,
wherein the container comprises a bottom portion, a side portion standing upright from the bottom portion, and a flange portion which is continuously connected to an upper portion of the side portion and comprises a first plane,
a circumferential seal portion is formed between the lid and the first plane of the flange portion,
the seal portion comprises a main seal portion and a protruding seal portion protruding inward with respect to the main seal portion,
at least one of the flange portion and the lid comprises a contact suppression mechanism for suppressing a contact between the flange portion and the lid, which is provided outside the protruding seal portion at a position corresponding to at least the protruding seal portion, and wherein when, of a straight line extending to pass through a distal end point of the protruding seal portion and the center point of the opening, a portion connecting two intersection points with an outer edge of the seal portion is referred to as a first line segment and, of a straight line extending to be orthogonal to the first line segment and pass through the center point of the opening, a portion connecting two intersection points with the outer edge of the seal portion is referred to as a second line segment, the first line segment is shorter than the second line segment.

11. A lidded container comprising:
a container having an opening; and
a lid which covers the opening and is joined to the container,
wherein the container comprises a bottom portion, a side portion standing upright from the bottom portion, and a flange portion which is continuously connected to an upper portion of the side portion and comprises a first plane,
a circumferential seal portion is formed between the lid and the first plane of the flange portion,
the seal portion comprises a main seal portion and a protruding seal portion protruding inward with respect to the main seal portion,
at least one of the flange portion and the lid comprises a contact suppression mechanism for suppressing a contact between the flange portion and the lid, which is provided outside the protruding seal portion at a position corresponding to at least the protruding seal portion, and wherein the protruding seal portions are formed at two or more positions facing each other in the container.

12. A container having an opening, the container comprising:
a bottom portion; a side portion standing upright from the bottom portion; and a flange portion which is continuously connected to an upper portion of the side portion, comprises a first plane to which a lid is joined, and defines the opening,
wherein the flange portion comprises a contact suppression mechanism which suppresses a contact between the flange portion and the lid,
the contact suppression mechanism comprises a cutout portion formed at an outer edge of the flange portion, a stepped portion comprising a flange wall portion which is continuously connected to the first plane and extends downward from the first plane and a second plane which is continuously connected to the flange portion, or a protrusion protruding upward from the first plane, and
wherein the side portion includes a first portion corresponding to the contact suppression mechanism and second portions located on both sides of the first portion, the first portion constituting the same plane or the same curved surface continuous with second portions.

13. The container according to claim 7, wherein the contact suppression mechanism is located on a straight line extending so as to connect an inner edge of the flange portion and the center point of the opening with the shortest distance.

* * * * *